(12) United States Patent
Pham et al.

(10) Patent No.: US 12,711,329 B2
(45) Date of Patent: Aug. 18, 2026

(54) CONTENT TRANSLATION USER INTERFACES

(71) Applicant: Apple Inc., Cupertino, CA (US)

(72) Inventors: Ngoc H. Pham, San Francisco, CA (US); Vincent M. Lane, San Francisco, CA (US); Grant R. Paul, San Francisco, CA (US); Chen Ye, Seattle, WA (US)

(73) Assignee: Apple Inc., Cupertino, CA (US)

( * ) Notice: Subject to any disclaimer, the term of this patent is extended or adjusted under 35 U.S.C. 154(b) by 504 days.

(21) Appl. No.: 17/833,537

(22) Filed: Jun. 6, 2022

(65) Prior Publication Data

US 2022/0391603 A1 Dec. 8, 2022

Related U.S. Application Data

(60) Provisional application No. 63/197,474, filed on Jun. 6, 2021.

(51) Int. Cl.

| | |
|---|---|
| ***G06F 40/58*** | (2020.01) |
| ***G06F 3/16*** | (2006.01) |
| ***G06F 40/103*** | (2020.01) |
| ***G06F 40/169*** | (2020.01) |
| ***G06F 40/171*** | (2020.01) |
| ***G06F 40/35*** | (2020.01) |
| ***G10L 13/08*** | (2013.01) |
| ***G10L 15/00*** | (2013.01) |
| ***G10L 15/22*** | (2006.01) |
| ***G10L 15/26*** | (2006.01) |

(52) U.S. Cl.

CPC .............. *G06F 40/58* (2020.01); *G06F 3/167* (2013.01); *G06F 40/103* (2020.01); *G06F 40/169* (2020.01); *G06F 40/171* (2020.01); *G06F 40/35* (2020.01); *G10L 13/086* (2013.01); *G10L 15/005* (2013.01); *G10L 15/22* (2013.01); *G10L 15/26* (2013.01)

(58) Field of Classification Search

None

See application file for complete search history.

(56) References Cited

U.S. PATENT DOCUMENTS

| | | | | |
|---|---|---|---|---|
| 9,075,520 | B2 | 7/2015 | Park et al. | |
| 9,600,153 | B2 | 3/2017 | Roh | |
| 9,778,929 | B2 * | 10/2017 | Joo | G06F 40/47 |
| 9,953,631 | B1 * | 4/2018 | Cuthbert | G10L 15/005 |
| 10,534,475 | B2 | 1/2020 | Yoo et al. | |
| 10,572,215 | B1 | 2/2020 | Cooper et al. | |

(Continued)

FOREIGN PATENT DOCUMENTS

| | | | |
|---|---|---|---|
| CN | 101609505 | A | 12/2009 |
| CN | 103677618 | A | 3/2014 |

(Continued)

OTHER PUBLICATIONS

Corrected Notice of Allowance received for U.S. Appl. No. 17/484,714, mailed on Dec. 5, 2023, 3 pages.

(Continued)

*Primary Examiner* — Richa Sonifrank

(74) *Attorney, Agent, or Firm* — YHE Law LLP

(57) ABSTRACT

The present disclosure generally relates to user interfaces for translating content and displaying translated content.

21 Claims, 52 Drawing Sheets

(56) References Cited

U.S. PATENT DOCUMENTS 10,748,345 B2 8/2020 Zhou
10,762,716 B1 9/2020 Paul et al.
11,223,728 B2 1/2022 Kim et al.
11,900,072 B1* 2/2024 Bossio ................ G06F 3/04883
11,995,416 B2* 5/2024 Ishikawa ................ G06F 40/51
12,001,642 B2 6/2024 Paul et al.
12,118,981 B2* 10/2024 Yuan ...................... G06F 40/35
12,182,526 B2* 12/2024 Vadella .................. G06F 40/58
12,200,342 B2* 1/2025 De Vries .............. G06F 3/0481
2004/0201720 A1 10/2004 Robins et al.
2005/0171926 A1 8/2005 Thione et al.
2007/0074133 A1 3/2007 Hara et al.
2008/0253656 A1 10/2008 Schwartzberg et al.
2009/0268076 A1 10/2009 Kawamura et al.
2010/0110108 A1 5/2010 Alexandersson et al.
2010/0208999 A1 8/2010 Oh et al.
2011/0032377 A1 2/2011 Kim et al.
2011/0076003 A1 3/2011 Cho et al.
2012/0310622 A1* 12/2012 Zivkovic ................ G06F 40/58 704/E15.043
2013/0016042 A1 1/2013 Makinen et al.
2013/0093833 A1 4/2013 Al-asaaed et al.
2013/0110494 A1* 5/2013 Elgazzar ................ G06F 40/40 704/3
2013/0117025 A1 5/2013 Park et al.
2013/0268259 A1* 10/2013 Kim ....................... G10L 15/22 704/7
2013/0297287 A1* 11/2013 Yin ........................ G06F 40/58 704/2
2014/0056475 A1* 2/2014 Jang ..................... G06F 3/0488 382/103
2014/0062962 A1 3/2014 Jang et al.
2014/0109004 A1 4/2014 Sadhvani et al.
2014/0117076 A1 5/2014 Eberlein
2014/0156412 A1 6/2014 Tse
2014/0192217 A1 7/2014 Kim et al.
2014/0267796 A1 9/2014 Jang et al.
2015/0051898 A1* 2/2015 Cuthbert .............. G06F 40/263 704/3
2015/0146925 A1 5/2015 Son et al.
2015/0227509 A1* 8/2015 Landau .................. G06F 40/58 704/2
2015/0309997 A1* 10/2015 Lee ...................... G06F 1/1694 704/3
2016/0005189 A1 1/2016 Gray et al.
2016/0048287 A1 2/2016 Lee et al.
2016/0063339 A1 3/2016 Kwon et al.
2016/0275057 A1* 9/2016 Dendi .................... H04L 67/02
2016/0378277 A1 12/2016 Cho
2017/0052939 A1 2/2017 Seol et al.
2017/0090693 A1 3/2017 Ku et al.
2017/0091174 A1* 3/2017 Rubin .................... G06F 40/51
2017/0134605 A1 5/2017 Ju et al.
2017/0199870 A1* 7/2017 Zheng .................. G06F 40/263
2017/0336926 A1 11/2017 Chaudhri et al.
2017/0336960 A1 11/2017 Chaudhri et al.
2018/0011842 A1* 1/2018 Waibel ................... G10L 13/00
2018/0276203 A1* 9/2018 Cuthbert ................ G10L 25/48
2018/0284892 A1 10/2018 Kwon et al.
2018/0302568 A1 10/2018 Kim et al.
2018/0350144 A1 12/2018 Rathod
2019/0025999 A1 1/2019 Murphy et al.
2019/0102382 A1* 4/2019 Rosart .................... G06F 40/58
2019/0121522 A1 4/2019 Davis et al.
2019/0213212 A1 7/2019 Adato et al.
2019/0324546 A1 10/2019 Lee et al.
2019/0347144 A1 11/2019 Chen et al.
2020/0050906 A1 2/2020 Mathai
2020/0106965 A1 4/2020 Malia et al.
2020/0184478 A1 6/2020 Peled et al.
2020/0267267 A1 8/2020 Kim et al.
2020/0302135 A1 9/2020 Nirmala
2021/0208741 A1 7/2021 Yang et al.
2021/0279409 A1 9/2021 Karunamuni et al.
2022/0078294 A1 3/2022 Kim et al.
2022/0150345 A1 5/2022 Woo et al.
2022/0334683 A1 10/2022 Paul et al.
2022/0334693 A1 10/2022 De Vries et al.
2022/0337741 A1 10/2022 Paul et al.
2023/0082876 A1 3/2023 Guzman et al.
2023/0229279 A1 7/2023 Paul et al.
2023/0393865 A1 12/2023 Fleizach et al.
2024/0037350 A1* 2/2024 Du ..................... G06F 3/04842
2024/0078375 A1 3/2024 Karunamuni et al.
2024/0256100 A1 8/2024 Paul et al.
2024/0340371 A1 10/2024 Hua et al.
2024/0406304 A1 12/2024 Foss et al.
2025/0113095 A1 4/2025 Alonso et al.
2025/0341936 A1 11/2025 Paul et al.

FOREIGN PATENT DOCUMENTS

CN 105654532 A 6/2016
CN 111860479 A 10/2020
CN 115914824 A 4/2023
EP 4089521 A1 11/2022
JP 2013-541107 A 11/2013
JP 2015-228009 A 12/2015
JP 2016-519377 A 6/2016
JP 2017-513143 A 5/2017
JP 2018-128955 A 8/2018
JP 2020-57204 A 4/2020
KR 10-2015-0135844 A 12/2015
KR 10-2016-0019760 A 2/2016
KR 10-2020-0127928 A 11/2020
WO 2014/159998 A1 10/2014
WO 2019/054999 A1 3/2019
WO 2023/116418 A1 6/2023

OTHER PUBLICATIONS

Notice of Allowance received for Korean Patent Application No. 10-2023-7033711, mailed on Nov. 29, 2023, 9 pages (2 pages of English Translation and 7 pages of Official Copy).

Applicant-Initiated Interview Summary received for U.S. Appl. No. 17/484,856, mailed on Oct. 25, 2023, 5 pages.

International Preliminary Report on Patentability received for PCT Patent Application No. PCT/US2022/025096, mailed on Nov. 2, 2023, 14 pages.

Notice of Allowance received for U.S. Appl. No. 17/484,714, mailed on Oct. 31, 2023, 7 pages.

Examiner-Initiated Interview Summary received for U.S. Appl. No. 17/484,856, mailed on Sep. 6, 2023, 4 pages.

Non-Final Office Action received for U.S. Appl. No. 18/125,070, mailed on Sep. 14, 2023, 13 pages.

Non-Final Office Action received for U.S. Appl. No. 17/484,856, mailed on Sep. 21, 2023, 32 pages.

Corrected Notice of Allowance received for U.S. Appl. No. 18/125,070, mailed on Apr. 29, 2024, 2 pages.

Notice of Allowance received for U.S. Appl. No. 18/125,070, mailed on Apr. 23, 2024, 6 pages.

Notice of Acceptance received for Australian Patent Application No. 2022261717, mailed on Dec. 20, 2023, 4 pages.

101609505, CN, A, Chinese Patent Office in an Office Action for related Patent Application No. 202311577936.6 on May 23, 2024.

105654532, CN, A, Chinese Patent Office in an Office Action for related Patent Application No. 202311577936.6 on May 23, 2024.

10-2015-0135844, KR, A, Chinese Patent Office in an Office Action for related Patent Application No. 202311577936.6 on May 23, 2024.

Aprio Editorial Department, "[Line] Useful ways to use the OCR feature, and how to easily copy and translate text within images", Available online at: <https://appllio.com/line-how-to-use-ocr>, May 15, 2019, 14 pages. Japanese Patent Office in an Office Action for related Patent Application No. 2023-560220 on Mar. 1, 2024.

Smahoto.JP, "An application for capturing unreadable characters in books and signboards with a camera?", Available Online at: <https://www.kitamura.jp/smahoto/pholothe/app/items/205.html>, Oct. 15,

(56) References Cited

OTHER PUBLICATIONS 2015, 8 pages, Japanese Patent Office in an Office Action for related Patent Application No. 2023-560220 on Mar. 1, 2024.
Takafumi, Yamazoe, "Development of character recognition technology that achieves highly accurate recognition", Technology Reports, NTT DOCOMO Technical Journal, vol. 20, No. 1, Telecommunications Association, Apr. 1, 2012, pp. 40-43, Japanese Patent Office in an Office Action for related Patent Application No. 2023-560220 on Mar. 1, 2024.
Final Office Action received for U.S. Appl. No. 17/484,856, mailed on Nov. 16, 2023, 29 pages.
Office Action received for Australian Patent Application No. 2022261717, mailed on Nov. 6, 2023, 3 pages.
Notice of Allowance received for U.S. Appl. No. 18/125,070, mailed on Feb. 6, 2024, 7 pages.
Applicant-Initiated Interview Summary received for U.S. Appl. No. 17/484,714, mailed on Apr. 28, 2022, 2 pages.
Applicant-Initiated Interview Summary received for U.S. Appl. No. 17/484,714, mailed on Nov. 10, 2022, 2 pages.
Applicant-Initiated Interview Summary received for U.S. Appl. No. 17/484,856, mailed on Apr. 24, 2023, 4 pages.
Applicant-Initiated Interview Summary received for U.S. Appl. No. 17/484,856, mailed on Jul. 27, 2022, 7 pages.
Applicant-Initiated Interview Summary received for U.S. Appl. No. 17/484,856, mailed on Mar. 10, 2022, 3 pages.
Ex Parte Quayle Action received for U.S. Appl. No. 17/484,844, mailed on Sep. 8, 2022, 8 pages.
Final Office Action received for U.S. Appl. No. 17/484,714, mailed on May 23, 2022, 22 pages.
Final Office Action received for U.S. Appl. No. 17/484,856, mailed on Jun. 1, 2023, 31 pages.
Final Office Action received for U.S. Appl. No. 17/484,856, mailed on Mar. 30, 2022, 26 pages.
International Search Report and Written Opinion received for PCT Patent Application No. PCT/US2022/025096, mailed on Sep. 26, 2022, 19 pages.
Invitation to Pay Additional Fees received for PCT Patent Application No. PCT/US2022/025096, mailed on Aug. 1, 2022, 11 pages.
Non-Final Office Action received for U.S. Appl. No. 17/484,714, mailed on Dec. 1, 2021, 19 pages.
Non-Final Office Action received for U.S. Appl. No. 17/484,714, mailed on Mar. 30, 2023, 19 pages.
Non-Final Office Action received for U.S. Appl. No. 17/484,856, mailed on Dec. 8, 2021, 24 pages.
Non-Final Office Action received for U.S. Appl. No. 17/484,856, mailed on Feb. 22, 2023, 26 pages.
Notice of Allowance received for U.S. Appl. No. 17/484,714, mailed on May 30, 2023, 6 pages.
Notice of Allowance received for U.S. Appl. No. 17/484,844, mailed on Jan. 17, 2023, 10 pages.
Intention to Grant received for European Patent Application No. 22720880.8, mailed on Sep. 30, 2024, 10 pages.
Aprio Editorial Department, "[Line] Useful ways to use the OCR feature, and how to easily copy and translate text within images", Available online at: <https://appllio.com/line-how-to-use-ocr>, May 15, 2019, 14 pages (Official Copy Only) {See Communication Under Rule 37 CFR § 1.98(a) (3)}.
Notice of Allowance received for Japanese Patent Application No. 2023-560220, mailed on Mar. 1, 2024, 4 pages (1 page of English Translation and 3 pages of Official Copy).
Office Action received for Chinese Patent Application No. 202311577936.6, mailed on May 23, 2024, 20 pages (10 pages of English Translation and 10 pages of Official Copy).
Smahoto.JP, "An application for capturing unreadable characters in books and signboards with a camera!", Available Online at: <https://www.kitamura.jp/smahoto/photolife/app/items/205.html>, Oct. 15, 2015, 8 pages (Official Copy Only) {See Communication Under Rule 37 CFR § 1.98(a) (3)}.
Takafumi, Yamazoe, "Development of character recognition technology that achieves highly accurate recognition", Technology Reports, NTT DOCOMO Technical Journal, vol. 20, No. 1, Telecommunications Association, Apr. 1, 2012, pp. 40-43 (Official Copy Only) {See Communication Under Rule 37 CFR § 1.98(a) (3)).
Notice of Acceptance received for Australian Patent Application No. 2024201515, mailed on Oct. 16, 2025, 4 pages.
Office Action received for Korean Patent Application No. 10-2024-7003524, mailed on Sep. 26, 2025, 17 pages (7 pages of English Translation and 10 pages of Official Copy).
Corrected Notice of Allowance received for U.S. Appl. No. 17/484,856, mailed on Nov. 6, 2024, 2 pages.
Corrected Notice of Allowance received for U.S. Appl. No. 18/611,216, mailed on Aug. 11, 2025, 2 pages.
Corrected Notice of Allowance received for U.S. Appl. No. 18/611,216, mailed on Jul. 31, 2025, 5 pages.
Corrected Notice of Allowance received for U.S. Appl. No. 18/611,216, mailed on Jun. 24, 2025, 2 pages.
Decision to Grant received for European Patent Application No. 22720880.8, mailed on Mar. 27, 2025, 4 pages.
Extended European Search Report received for European Patent Application No. 25164608.9, mailed on Jul. 4, 2025, 9 pages.
Intention to Grant received for European Patent Application No. 22720880.8, mailed on Nov. 20, 2024, 11 pages.
International Search Report and Written Opinion received for PCT Patent Application No. PCT/US2024/048985, mailed on Feb. 13, 2025, 19 pages.
Invitation to Pay Additional Fees and Partial International Search Report received for PCT Patent Application No. PCT/US2024/048985, mailed on Dec. 23, 2024, 13 pages.
Notice of Allowance received for Chinese Patent Application No. 202311577936.6, mailed on Jan. 22, 2025, 4 pages (1 page of English Translation and 3 pages of Official Copy).
Notice of Allowance received for Japanese Patent Application No. 2024-049961, mailed on Apr. 7, 2025, 4 pages (1 page of English Translation and 3 pages of Official Copy).
Notice of Allowance received for U.S. Appl. No. 17/484,856, mailed on Oct. 30, 2024, 9 pages.
Notice of Allowance received for U.S. Appl. No. 18/611,216, mailed on May 12, 2025, 8 pages.
Office Action received for Australian Patent Application No. 2024201515, mailed on Dec. 11, 2024, 3 pages.
Office Action received for Australian Patent Application No. 2024201515, mailed on May 28, 2025, 3 pages.
Office Action received for Japanese Patent Application No. 2024-049961, mailed on Feb. 28, 2025, 8 pages (4 pages of English Translation and 4 pages of Official Copy).
"Translate with Google Pixel Buds", Online available at: https://support.google.com/googlepixelbuds/answer/7573100?hl=en, Retrieved on Feb. 2025, 2 pages.
Timekettle, "Timekettle for ESL Students", Online available at: https://www.timekettle.co/, Retrieved on Feb. 2025, 11 pages.

* cited by examiner

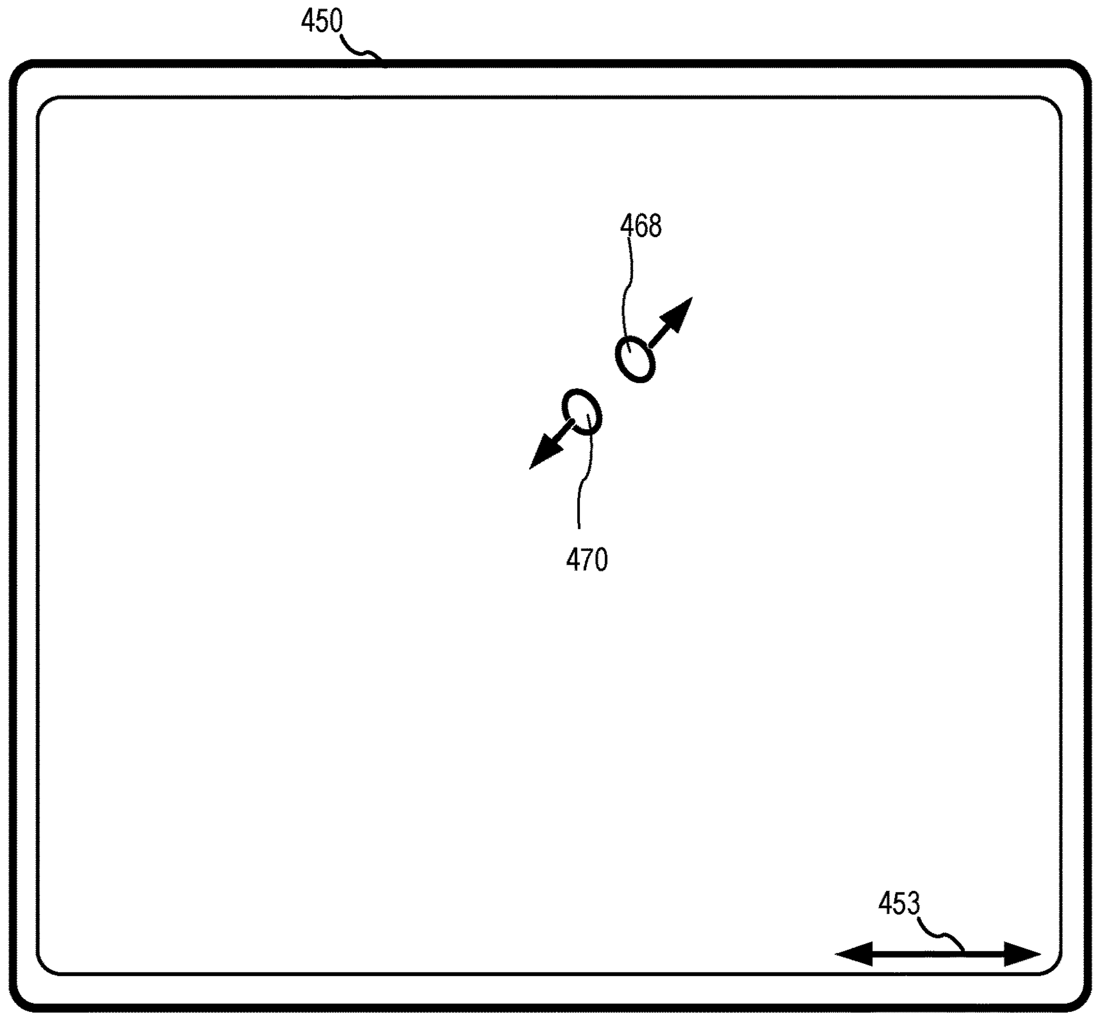
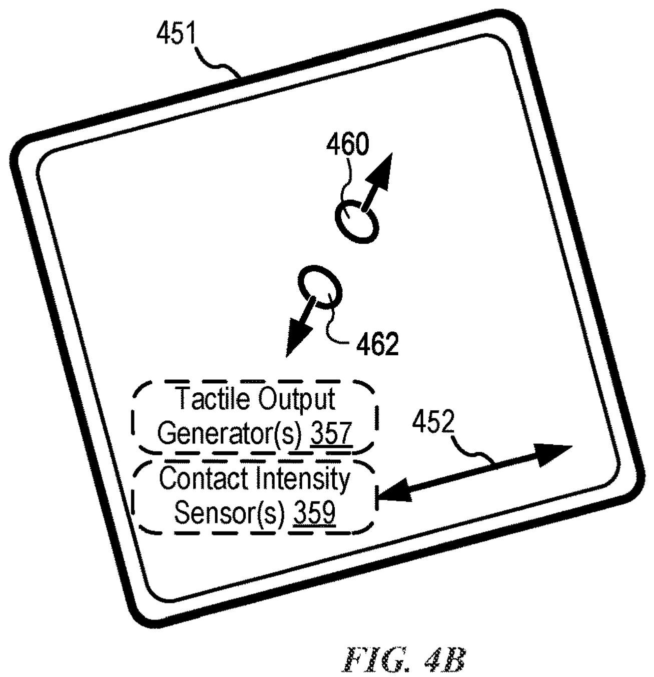
FIG. 4B

Figure 7A:
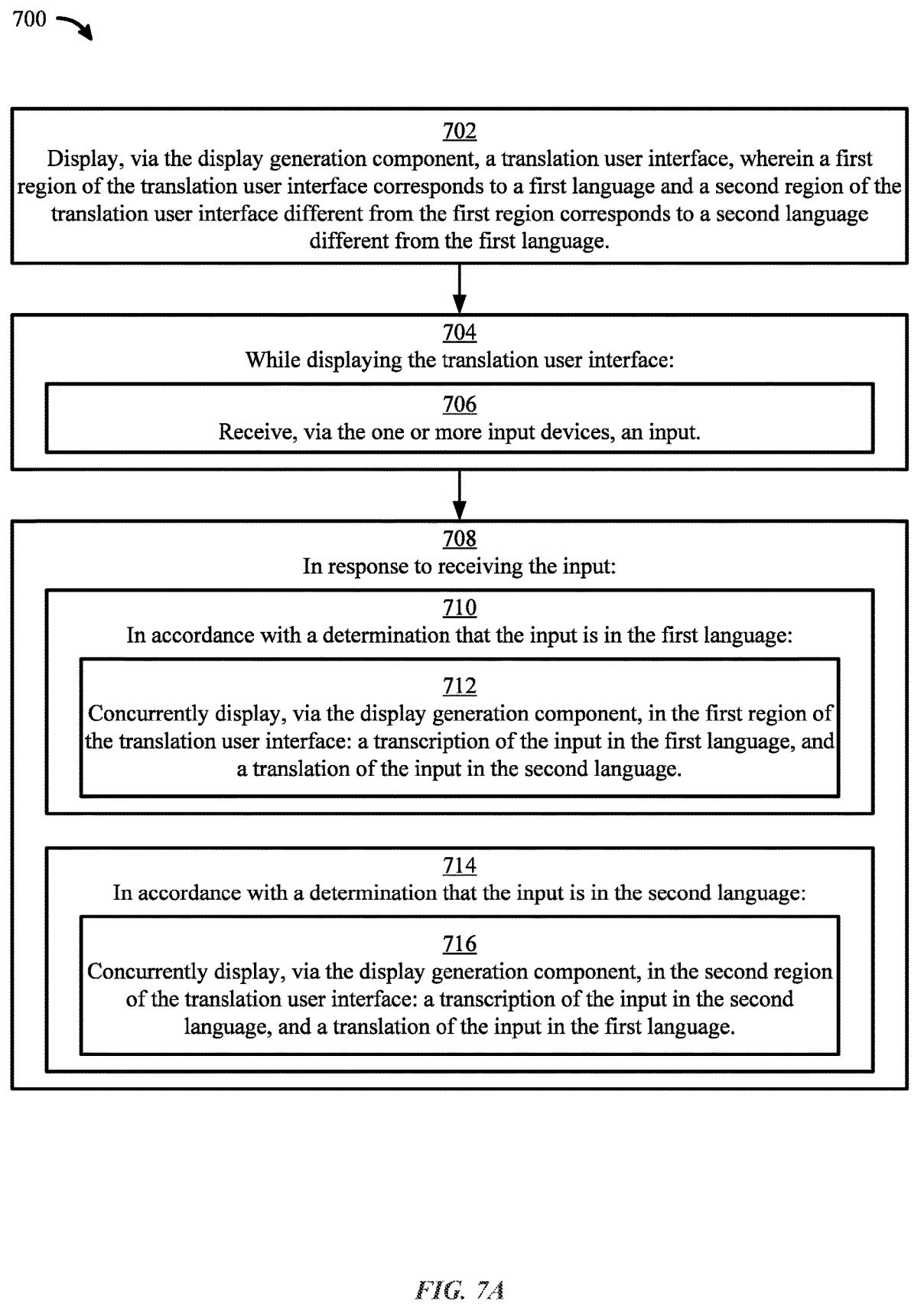

700

702
Display, via the display generation component, a translation user interface, wherein a first region of the translation user interface corresponds to a first language and a second region of the translation user interface different from the first region corresponds to a second language different from the first language.

704
While displaying the translation user interface:

706
Receive, via the one or more input devices, an input.

708
In response to receiving the input:

710
In accordance with a determination that the input is in the first language:

712
Concurrently display, via the display generation component, in the first region of the translation user interface: a transcription of the input in the first language, and a translation of the input in the second language.

714
In accordance with a determination that the input is in the second language:

716
Concurrently display, via the display generation component, in the second region of the translation user interface: a transcription of the input in the second language, and a translation of the input in the first language.

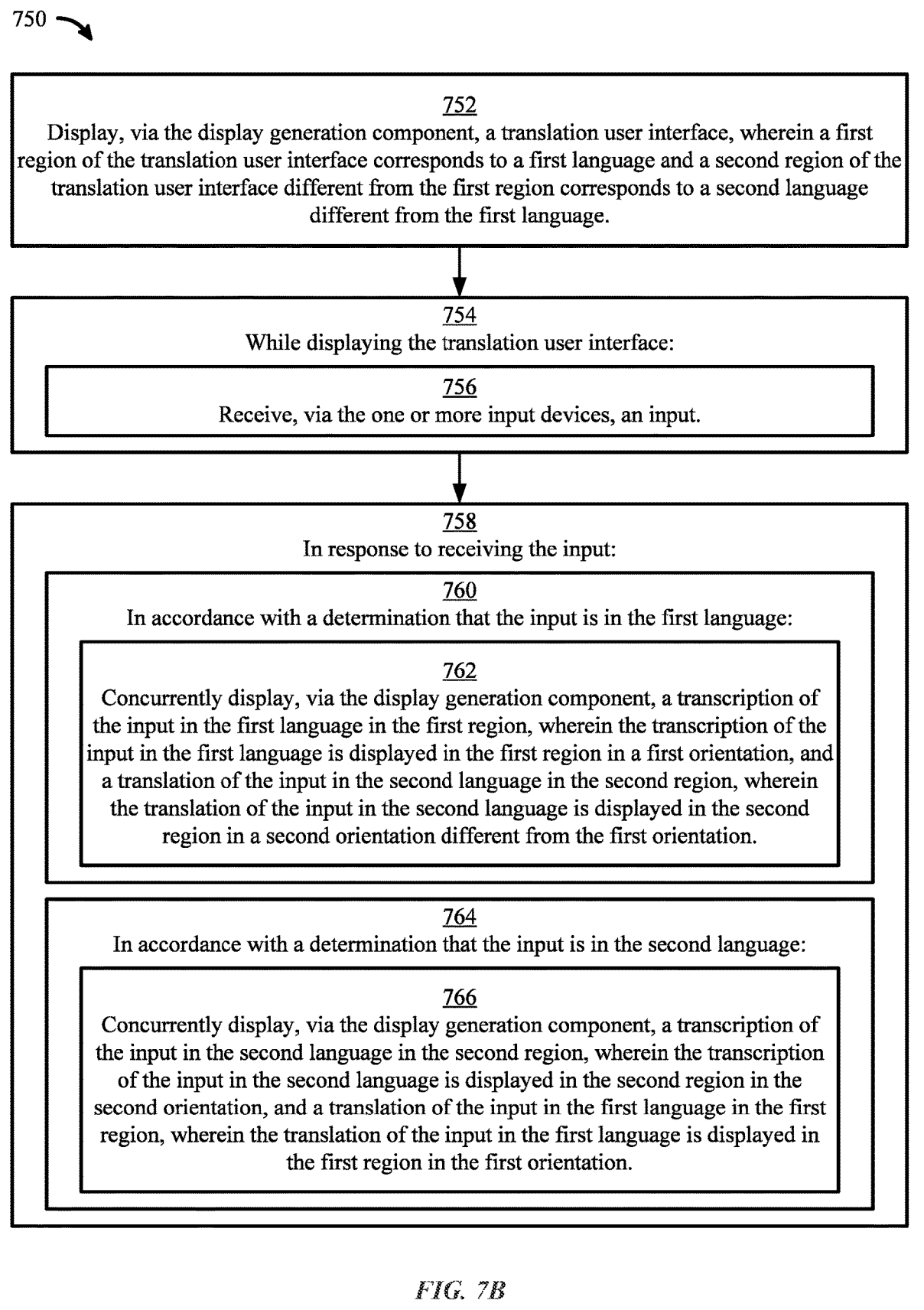

752
Display, via the display generation component, a translation user interface, wherein a first region of the translation user interface corresponds to a first language and a second region of the translation user interface different from the first region corresponds to a second language different from the first language.

754
While displaying the translation user interface:

756
Receive, via the one or more input devices, an input.

758
In response to receiving the input:

760
In accordance with a determination that the input is in the first language:

762
Concurrently display, via the display generation component, a transcription of the input in the first language in the first region, wherein the transcription of the input in the first language is displayed in the first region in a first orientation, and a translation of the input in the second language in the second region, wherein the translation of the input in the second language is displayed in the second region in a second orientation different from the first orientation.

764
In accordance with a determination that the input is in the second language:

766
Concurrently display, via the display generation component, a transcription of the input in the second language in the second region, wherein the transcription of the input in the second language is displayed in the second region in the second orientation, and a translation of the input in the first language in the first region, wherein the translation of the input in the first language is displayed in the first region in the first orientation.

*FIG. 7B*

800
802
10:09
LANGUAGES
843
844A
844B
ORIGINAL
TRANSLATION
842
ENGLISH(US)
SPANISH
FRENCH
KOREAN
ARABIC
RUSSIAN
CANTONESE
GERMAN
846A
846B
846C
846D
846E
846F
846G
846H
866
MANAGE LANGUAGES
845

850
851
864
MANAGE LANGUAGES
DONE
852A
AVAILABLE ON DEVICE
ENGLISH (US)
SPANISH
854A
854B
852B
DOWNLOAD LANGUAGES
ARABIC
CHINESE
MANDARIN, SIMPLIFIED
ENGLISH
UNITED KINGDOM
FRENCH
GERMAN
ITALIAN
JAPANESE
854C
854D
854E
854F
854G
854H
854I

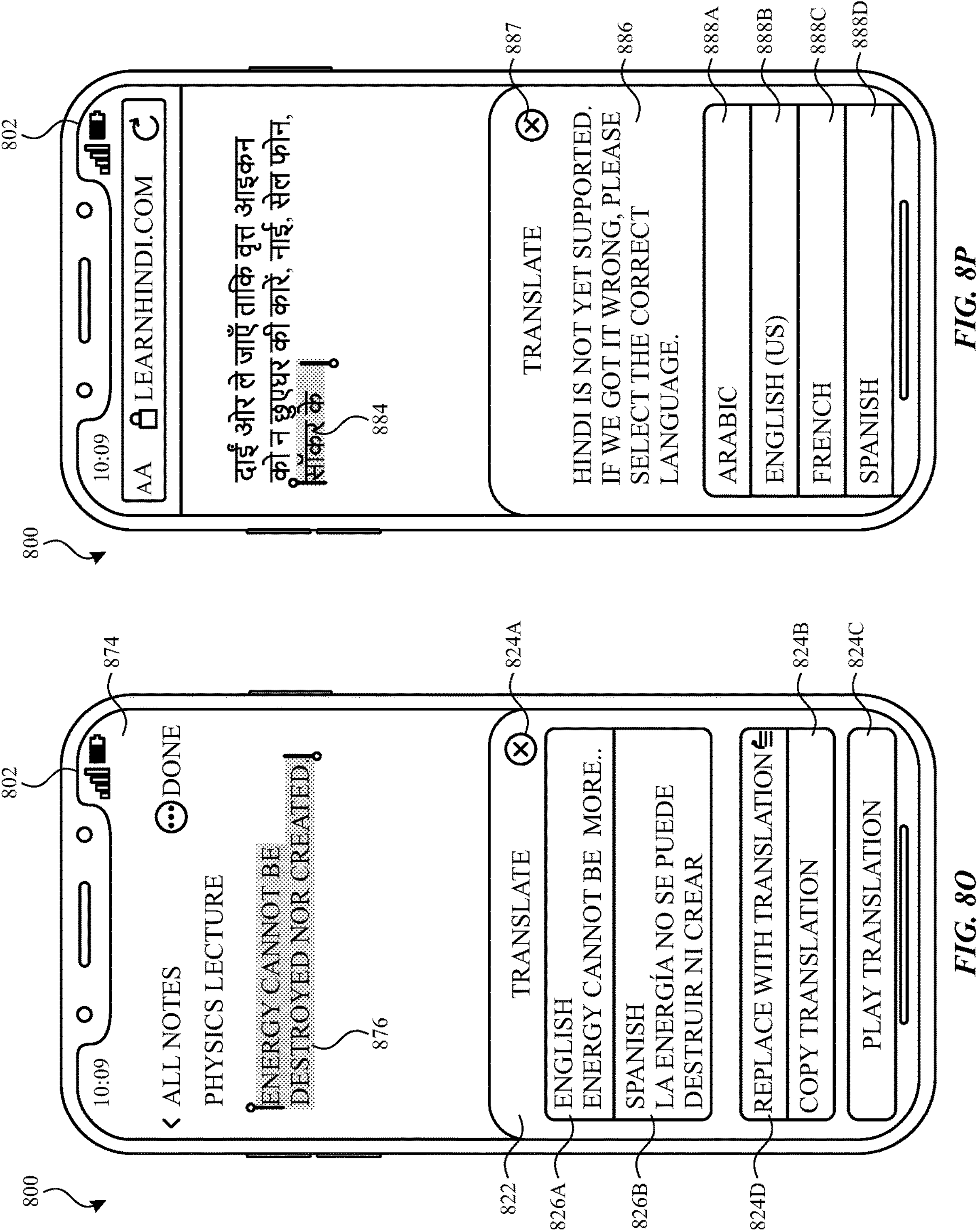
800
802
874
10:09
ALL NOTES
DONE
PHYSICS LECTURE
ENERGY CANNOT BE DESTROYED NOR CREATED
876
TRANSLATE
824A
ENGLISH
ENERGY CANNOT BE MORE...
SPANISH
LA ENERGÍA NO SE PUEDE DESTRUIR NI CREAR
REPLACE WITH TRANSLATION
COPY TRANSLATION
PLAY TRANSLATION
824B
824C
822
826A
826B
824D
FIG. 8O
800
802
10:09
AA
LEARNHINDI.COM
दाईं ओर ले जाएँ ताकि वृत्त आइकन
को न छुएपर की कारें, नाई, सेल फोन,
सोकर के
884
887
TRANSLATE
HINDI IS NOT YET SUPPORTED. IF WE GOT IT WRONG, PLEASE SELECT THE CORRECT LANGUAGE.
886
ARABIC
ENGLISH (US)
FRENCH
SPANISH
888A
888B
888C
888D
FIG. 8P

900

902
Display, via the display generation component, a first user interface comprising a set of text in a first language.

904
While displaying the first user interface:

906
Receive, via the one or more input devices, a first selection of text from the set of text.

908
In response to receiving the first selection of text:

910
Display, via the display generation component, a translation option that is selectable to display a translation of the first selection of text.

912
While displaying the translation option:

914
Detect, via the one or more input devices, a selection input corresponding to selection of the translation option.

916
In response to detecting the selection input:

918
Display, via the display generation component, a translation user interface, overlaid on the first user interface, that includes a translation of the first selection of text in a second language different from the first language.

*FIG. 9*

CONTENT TRANSLATION USER INTERFACES

CROSS-REFERENCE TO RELATED APPLICATION

This application claims priority to U.S. Provisional Patent Application No. 63/197,474, entitled "CONTENT TRANSLATION USER INTERFACES," filed on Jun. 6, 2021, the contents of which is hereby incorporated by reference in its entirety.

FIELD

The present disclosure relates generally to computer user interfaces, and more specifically to techniques for displaying translated content.

BACKGROUND

As electronic devices such as smartphones have become more widely used, their functions have grown beyond phone calls and text messaging. Providing an efficient method for using and implementing the various functions on these electronic devices can be complex and time-consuming.

BRIEF SUMMARY

Some techniques for translating content and displaying translated content using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for translating content and displaying translated content. Such methods and interfaces optionally complement or replace other methods for translating content and displaying translated content. Such methods and interfaces reduce the cognitive burden on a user and produce a more efficient human-machine interface. For battery-operated computing devices, such methods and interfaces conserve power and increase the time between battery charges.

In accordance with some embodiments, a method is described. The method comprises: at a computer system that is in communication with a display generation component and one or more input devices: displaying, via the display generation component, a translation user interface, wherein a first region of the translation user interface corresponds to a first language and a second region of the translation user interface different from the first region corresponds to a second language different from the first language; while displaying the translation user interface, receiving, via the one or more input devices, an input; and in response to receiving the input: in accordance with a determination that the input is in the first language, concurrently displaying, via the display generation component, in the first region of the translation user interface: a transcription of the input in the first language, and a translation of the input in the second language; and in accordance with a determination that the input is in the second language, concurrently displaying, via the display generation component, in the second region of the translation user interface: a transcription of the input in the second language, and a translation of the input in the first language.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: displaying, via the display generation component, a translation user interface, wherein a first region of the translation user interface corresponds to a first language and a second region of the translation user interface different from the first region corresponds to a second language different from the first language; while displaying the translation user interface, receiving, via the one or more input devices, an input; and in response to receiving the input: in accordance with a determination that the input is in the first language, concurrently displaying, via the display generation component, in the first region of the translation user interface: a transcription of the input in the first language, and a translation of the input in the second language; and in accordance with a determination that the input is in the second language, concurrently displaying, via the display generation component, in the second region of the translation user interface: a transcription of the input in the second language, and a translation of the input in the first language.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: displaying, via the display generation component, a translation user interface, wherein a first region of the translation user interface corresponds to a first language and a second region of the translation user interface different from the first region corresponds to a second language different from the first language; while displaying the translation user interface, receiving, via the one or more input devices, an input; and in response to receiving the input: in accordance with a determination that the input is in the first language, concurrently displaying, via the display generation component, in the first region of the translation user interface: a transcription of the input in the first language, and a translation of the input in the second language; and in accordance with a determination that the input is in the second language, concurrently displaying, via the display generation component, in the second region of the translation user interface: a transcription of the input in the second language, and a translation of the input in the first language.

In accordance with some embodiments, a computer system is described. The computer system is configured to communicate with a display generation component and one or more input devices, and comprises: one or more processors; and memory storing one or more programs configured to be executed by the one or more processors, the one or more programs including instructions for: displaying, via the display generation component, a translation user interface, wherein a first region of the translation user interface corresponds to a first language and a second region of the translation user interface different from the first region corresponds to a second language different from the first language; while displaying the translation user interface, receiving, via the one or more input devices, an input; and in response to receiving the input: in accordance with a determination that the input is in the first language, concurrently displaying, via the display generation component, in the first region of the translation user interface: a transcription of the input in the first language, and a translation of the input in the second language; and in accordance with a determination that the input is in the second language, concurrently displaying, via the display generation component, in the second region of the translation user interface: a transcription of the input in the second language, and a translation of the input in the first language.

In accordance with some embodiments, a computer system is described. The computer system is configured to communicate with a display generation component and one or more input devices, and comprises: means for displaying, via the display generation component, a translation user interface, wherein a first region of the translation user interface corresponds to a first language and a second region of the translation user interface different from the first region corresponds to a second language different from the first language; means for, while displaying the translation user interface, receiving, via the one or more input devices, an input; and means for, in response to receiving the input: in accordance with a determination that the input is in the first language, concurrently displaying, via the display generation component, in the first region of the translation user interface: a transcription of the input in the first language, and a translation of the input in the second language; and in accordance with a determination that the input is in the second language, concurrently displaying, via the display generation component, in the second region of the translation user interface: a transcription of the input in the second language, and a translation of the input in the first language.

In accordance with some embodiments, a computer program product is described. The computer product program comprises one or more programs configured to be executed by one or more processors of a computer system that is in communication with a display generation component and one or more input devices, the one or more programs including instructions for: displaying, via the display generation component, a translation user interface, wherein a first region of the translation user interface corresponds to a first language and a second region of the translation user interface different from the first region corresponds to a second language different from the first language; while displaying the translation user interface, receiving, via the one or more input devices, an input; and in response to receiving the input: in accordance with a determination that the input is in the first language, concurrently displaying, via the display generation component, in the first region of the translation user interface: a transcription of the input in the first language, and a translation of the input in the second language; and in accordance with a determination that the input is in the second language, concurrently displaying, via the display generation component, in the second region of the translation user interface: a transcription of the input in the second language, and a translation of the input in the first language In accordance with some embodiments, a method is described. The method comprises: at a computer system that is in communication with a display generation component and one or more input devices: displaying, via the display generation component, a translation user interface, wherein a first region of the translation user interface corresponds to a first language and a second region of the translation user interface different from the first region corresponds to a second language different from the first language; while displaying the translation user interface, receiving, via the one or more input devices, an input; and in response to receiving the input: in accordance with a determination that the input is in the first language, concurrently displaying, via the display generation component: a transcription of the input in the first language in the first region, wherein the transcription of the input in the first language is displayed in the first region in a first orientation, and a translation of the input in the second language in the second region, wherein the translation of the input in the second language is displayed in the second region in a second orientation different from the first orientation; and in accordance with a determination that the input is in the second language, concurrently displaying, via the display generation component: a transcription of the input in the second language in the second region, wherein the transcription of the input in the second language is displayed in the second region in the second orientation, and a translation of the input in the first language in the first region, wherein the translation of the input in the first language is displayed in the first region in the first orientation.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: displaying, via the display generation component, a translation user interface, wherein a first region of the translation user interface corresponds to a first language and a second region of the translation user interface different from the first region corresponds to a second language different from the first language; while displaying the translation user interface, receiving, via the one or more input devices, an input; and in response to receiving the input: in accordance with a determination that the input is in the first language, concurrently displaying, via the display generation component: a transcription of the input in the first language in the first region, wherein the transcription of the input in the first language is displayed in the first region in a first orientation, and a translation of the input in the second language in the second region, wherein the translation of the input in the second language is displayed in the second region in a second orientation different from the first orientation; and in accordance with a determination that the input is in the second language, concurrently displaying, via the display generation component: a transcription of the input in the second language in the second region, wherein the transcription of the input in the second language is displayed in the second region in the second orientation, and a translation of the input in the first language in the first region, wherein the translation of the input in the first language is displayed in the first region in the first orientation.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: displaying, via the display generation component, a translation user interface, wherein a first region of the translation user interface corresponds to a first language and a second region of the translation user interface different from the first region corresponds to a second language different from the first language; while displaying the translation user interface, receiving, via the one or more input devices, an input; and in response to receiving the input: in accordance with a determination that the input is in the first language, concurrently displaying, via the display generation component: a transcription of the input in the first language in the first region, wherein the transcription of the input in the first language is displayed in the first region in a first orientation, and a translation of the input in the second language in the second region, wherein the translation of the input in the second language is displayed in the second region in a second orientation different from the first orientation; and in accordance with a determination that the input is in the second language, concurrently displaying, via the display generation component: a transcription of the input in the second language in the second region, wherein the transcription of the input in the second language is displayed in the second region in the second orientation, and a translation of the input in the first language in the first region, wherein the translation of the input in the first language is displayed in the first region in the first orientation.

In accordance with some embodiments, a computer system is described. The computer system is configured to communicate with a display generation component and one or more input devices, and comprises: one or more processors; and memory storing one or more programs configured to be executed by the one or more processors, the one or more programs including instructions for: displaying, via the display generation component, a translation user interface, wherein a first region of the translation user interface corresponds to a first language and a second region of the translation user interface different from the first region corresponds to a second language different from the first language; while displaying the translation user interface, receiving, via the one or more input devices, an input; and in response to receiving the input: in accordance with a determination that the input is in the first language, concurrently displaying, via the display generation component: a transcription of the input in the first language in the first region, wherein the transcription of the input in the first language is displayed in the first region in a first orientation, and a translation of the input in the second language in the second region, wherein the translation of the input in the second language is displayed in the second region in a second orientation different from the first orientation; and in accordance with a determination that the input is in the second language, concurrently displaying, via the display generation component: a transcription of the input in the second language in the second region, wherein the transcription of the input in the second language is displayed in the second region in the second orientation, and a translation of the input in the first language in the first region, wherein the translation of the input in the first language is displayed in the first region in the first orientation.

In accordance with some embodiments, a computer system is described. The computer system is configured to communicate with a display generation component and one or more input devices, and comprises: means for displaying, via the display generation component, a translation user interface, wherein a first region of the translation user interface corresponds to a first language and a second region of the translation user interface different from the first region corresponds to a second language different from the first language; means for, while displaying the translation user interface, receiving, via the one or more input devices, an input; and means for, in response to receiving the input: in accordance with a determination that the input is in the first language, concurrently displaying, via the display generation component: a transcription of the input in the first language in the first region, wherein the transcription of the input in the first language is displayed in the first region in a first orientation, and a translation of the input in the second language in the second region, wherein the translation of the input in the second language is displayed in the second region in a second orientation different from the first orientation; and in accordance with a determination that the input is in the second language, concurrently displaying, via the display generation component: a transcription of the input in the second language in the second region, wherein the transcription of the input in the second language is displayed in the second region in the second orientation, and a translation of the input in the first language in the first region, wherein the translation of the input in the first language is displayed in the first region in the first orientation In accordance with some embodiments, a computer program product is described. The computer program product comprises one or more programs configured to be executed by one or more processors of a computer system that is in communication with a display generation component and one or more input devices, the one or more programs including instructions for: displaying, via the display generation component, a translation user interface, wherein a first region of the translation user interface corresponds to a first language and a second region of the translation user interface different from the first region corresponds to a second language different from the first language; while displaying the translation user interface, receiving, via the one or more input devices, an input; and in response to receiving the input: in accordance with a determination that the input is in the first language, concurrently displaying, via the display generation component: a transcription of the input in the first language in the first region, wherein the transcription of the input in the first language is displayed in the first region in a first orientation, and a translation of the input in the second language in the second region, wherein the translation of the input in the second language is displayed in the second region in a second orientation different from the first orientation; and in accordance with a determination that the input is in the second language, concurrently displaying, via the display generation component: a transcription of the input in the second language in the second region, wherein the transcription of the input in the second language is displayed in the second region in the second orientation, and a translation of the input in the first language in the first region, wherein the translation of the input in the first language is displayed in the first region in the first orientation.

In accordance with some embodiments, a method is described. The method comprises: at a computer system that is in communication with a display generation component and one or more input devices: displaying, via the display generation component, a first user interface comprising a set of text in a first language; while displaying the first user interface, receiving, via the one or more input devices, a first selection of text from the set of text; in response to receiving the first selection of text, displaying, via the display generation component, a translation option that is selectable to display a translation of the first selection of text; while displaying the translation option, detecting, via the one or more input devices, a selection input corresponding to selection of the translation option; and in response to detecting the selection input, displaying, via the display generation component, a translation user interface, overlaid on the first user interface, that includes a translation of the first selection of text in a second language different from the first language.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: displaying, via the display generation component, a first user interface comprising a set of text in a first language; while displaying the first user interface, receiving, via the one or more input devices, a first selection of text from the set of text; in response to receiving the first selection of text, displaying, via the display generation component, a translation option that is selectable to display a translation of the first selection of text; while displaying the translation option, detecting, via the one or more input devices, a selection input corresponding to selection of the translation option; and in response to detecting the selection input, displaying, via the display generation component, a translation user interface, overlaid on the first user interface, that includes a translation of the first selection of text in a second language different from the first language.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: displaying, via the display generation component, a first user interface comprising a set of text in a first language; while displaying the first user interface, receiving, via the one or more input devices, a first selection of text from the set of text; in response to receiving the first selection of text, displaying, via the display generation component, a translation option that is selectable to display a translation of the first selection of text; while displaying the translation option, detecting, via the one or more input devices, a selection input corresponding to selection of the translation option; and in response to detecting the selection input, displaying, via the display generation component, a translation user interface, overlaid on the first user interface, that includes a translation of the first selection of text in a second language different from the first language.

In accordance with some embodiments, a computer system is described. The computer system is configured to communicate with a display generation component and one or more input devices, and comprises: one or more processors; and memory storing one or more programs configured to be executed by the one or more processors, the one or more programs including instructions for: displaying, via the display generation component, a first user interface comprising a set of text in a first language; while displaying the first user interface, receiving, via the one or more input devices, a first selection of text from the set of text; in response to receiving the first selection of text, displaying, via the display generation component, a translation option that is selectable to display a translation of the first selection of text; while displaying the translation option, detecting, via the one or more input devices, a selection input corresponding to selection of the translation option; and in response to detecting the selection input, displaying, via the display generation component, a translation user interface, overlaid on the first user interface, that includes a translation of the first selection of text in a second language different from the first language.

In accordance with some embodiments, a computer system is described. The computer system is configured to communicate with a display generation component and one or more input devices, and comprises: means for displaying, via the display generation component, a first user interface comprising a set of text in a first language; means for, while displaying the first user interface, receiving, via the one or more input devices, a first selection of text from the set of text; means for, in response to receiving the first selection of text, displaying, via the display generation component, a translation option that is selectable to display a translation of the first selection of text; means for, while displaying the translation option, detecting, via the one or more input devices, a selection input corresponding to selection of the translation option; and means for, in response to detecting the selection input, displaying, via the display generation component, a translation user interface, overlaid on the first user interface, that includes a translation of the first selection of text in a second language different from the first language.

In accordance with some embodiments, a computer program product is described. The computer program product comprises one or more programs configured to be executed by one or more processors of a computer system that is in communication with a display generation component and one or more input devices, the one or more programs including instructions for: displaying, via the display generation component, a first user interface comprising a set of text in a first language; while displaying the first user interface, receiving, via the one or more input devices, a first selection of text from the set of text; in response to receiving the first selection of text, displaying, via the display generation component, a translation option that is selectable to display a translation of the first selection of text; while displaying the translation option, detecting, via the one or more input devices, a selection input corresponding to selection of the translation option; and in response to detecting the selection input, displaying, via the display generation component, a translation user interface, overlaid on the first user interface, that includes a translation of the first selection of text in a second language different from the first language.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for translating content, thereby increasing the effectiveness, efficiency, and user satisfaction with such devices. Such methods and interfaces may complement or replace other methods for translating content.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 7A illustrates a flow diagram depicting a method for displaying translated content in accordance with some embodiments.

FIG. 7B illustrates a flow diagram depicting a method for displaying translated content in accordance with some embodiments.

FIG. 9 illustrates a flow diagram depicting a method for displaying translated content in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for translating content and displaying translated content. For example, there is a need for techniques that provide a way to translate content and display translated content while minimizing unnecessary manual effort by a user to translate content and display translated content. Such techniques can reduce the cognitive burden on a user to translate content, thereby enhancing productivity. Further, such techniques can reduce processor and battery power otherwise wasted on redundant user inputs.

Figures 8A, 8B:
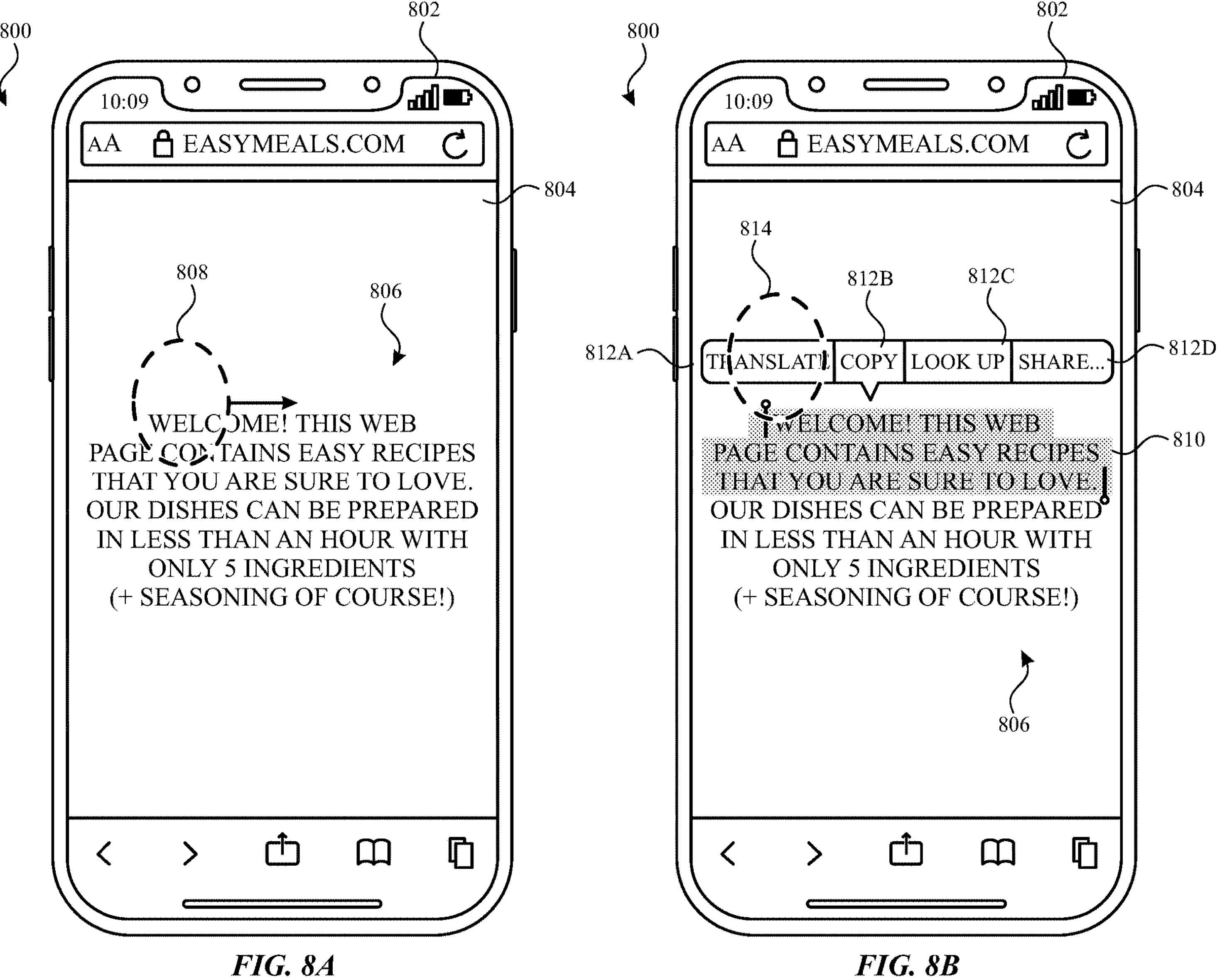
FIGS. 8A-8U illustrate exemplary user interfaces for displaying translated content in accordance with some embodiments.

Below, FIGS. 1A-1B, 2, 3, 4A-4B, and 5A-5B provide a description of exemplary devices for performing the techniques for translating content and displaying translated content. FIGS. 6A-6AC illustrate exemplary user interfaces for displaying translated content. FIG. 7A is a flow diagram illustrating methods of displaying translated content in accordance with some embodiments. FIG. 7B is a flow diagram illustrating methods of displaying translated content in accordance with some embodiments. The user interfaces in FIGS. 6A-6AC are used to illustrate the processes described below, including the processes in FIGS. 7A and 7B. FIGS. 8A-8U illustrate exemplary user interfaces for displaying translated content. FIG. 9 is a flow diagram illustrating methods of displaying translated content in accordance with some embodiments. The user interfaces in FIGS. 8A-8U are used to illustrate the processes described below, including the processes in FIG. 9.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
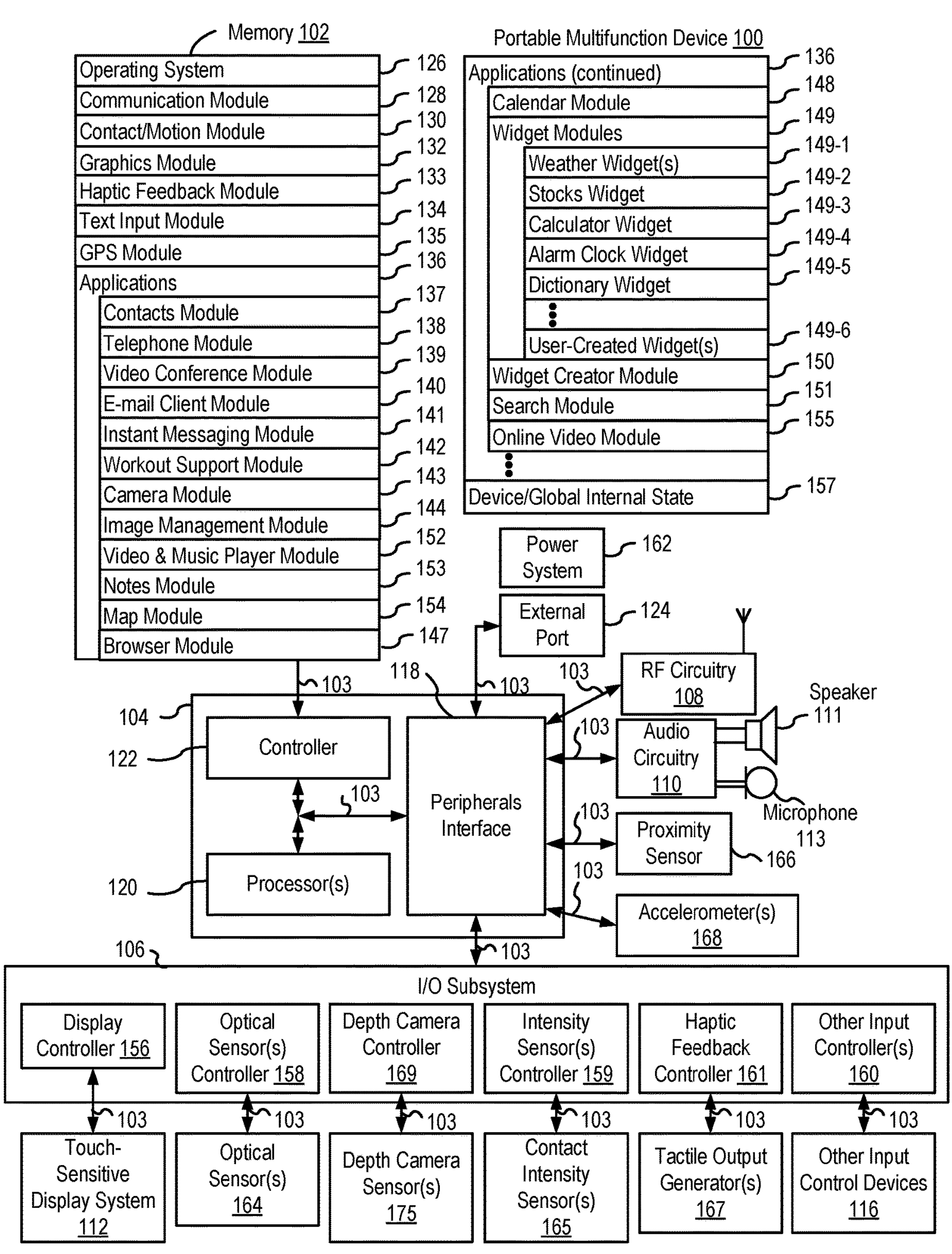
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
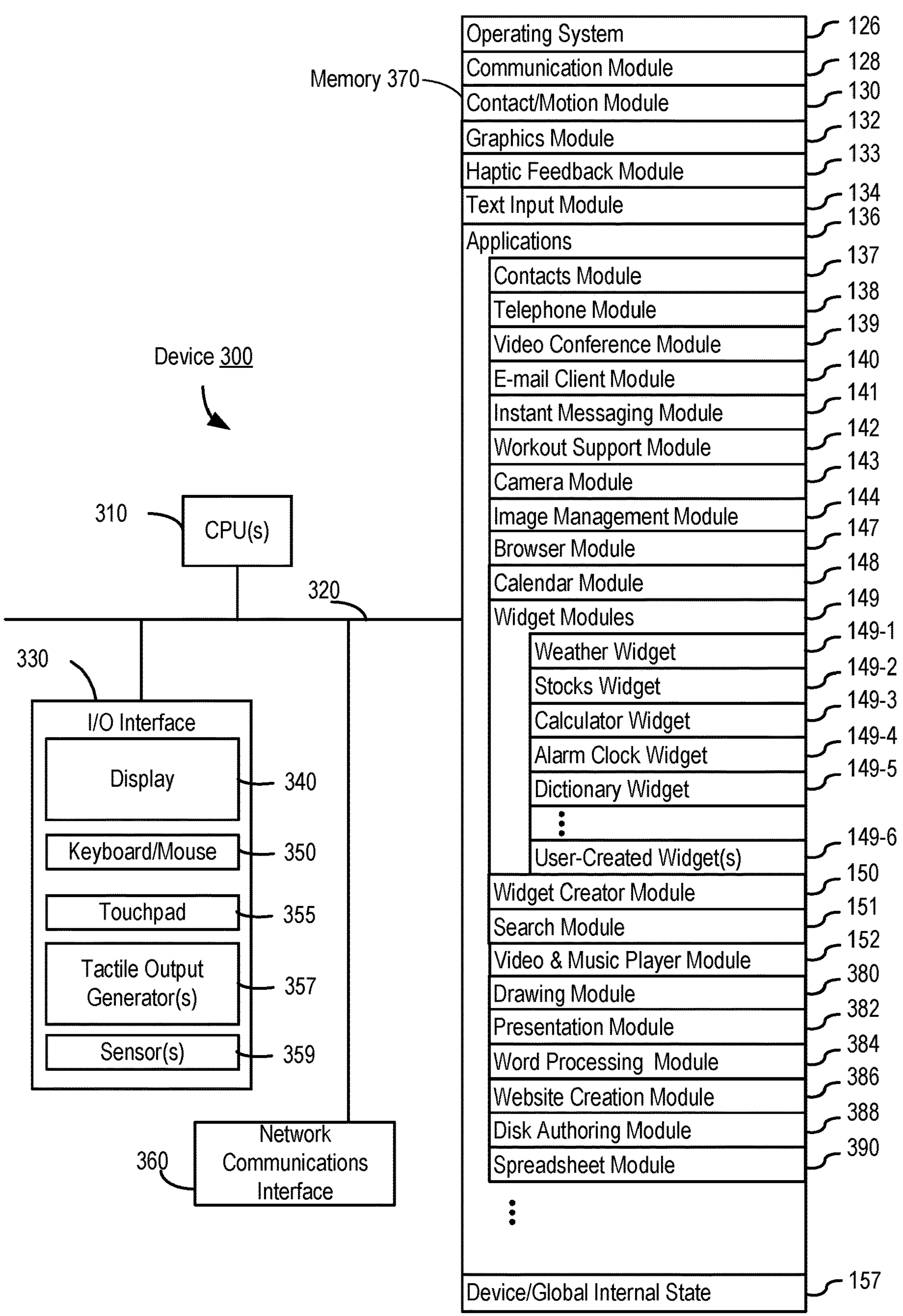
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
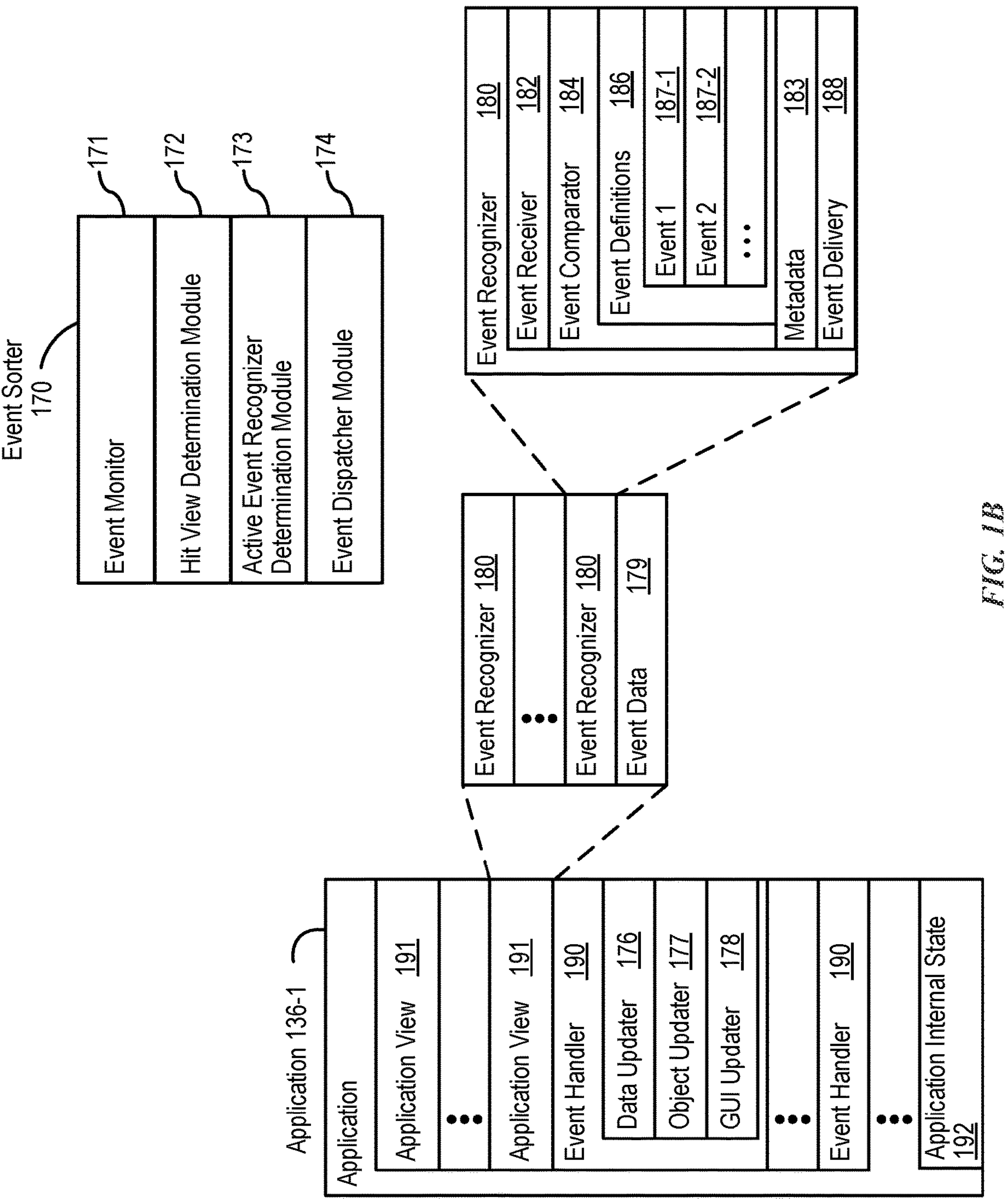
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
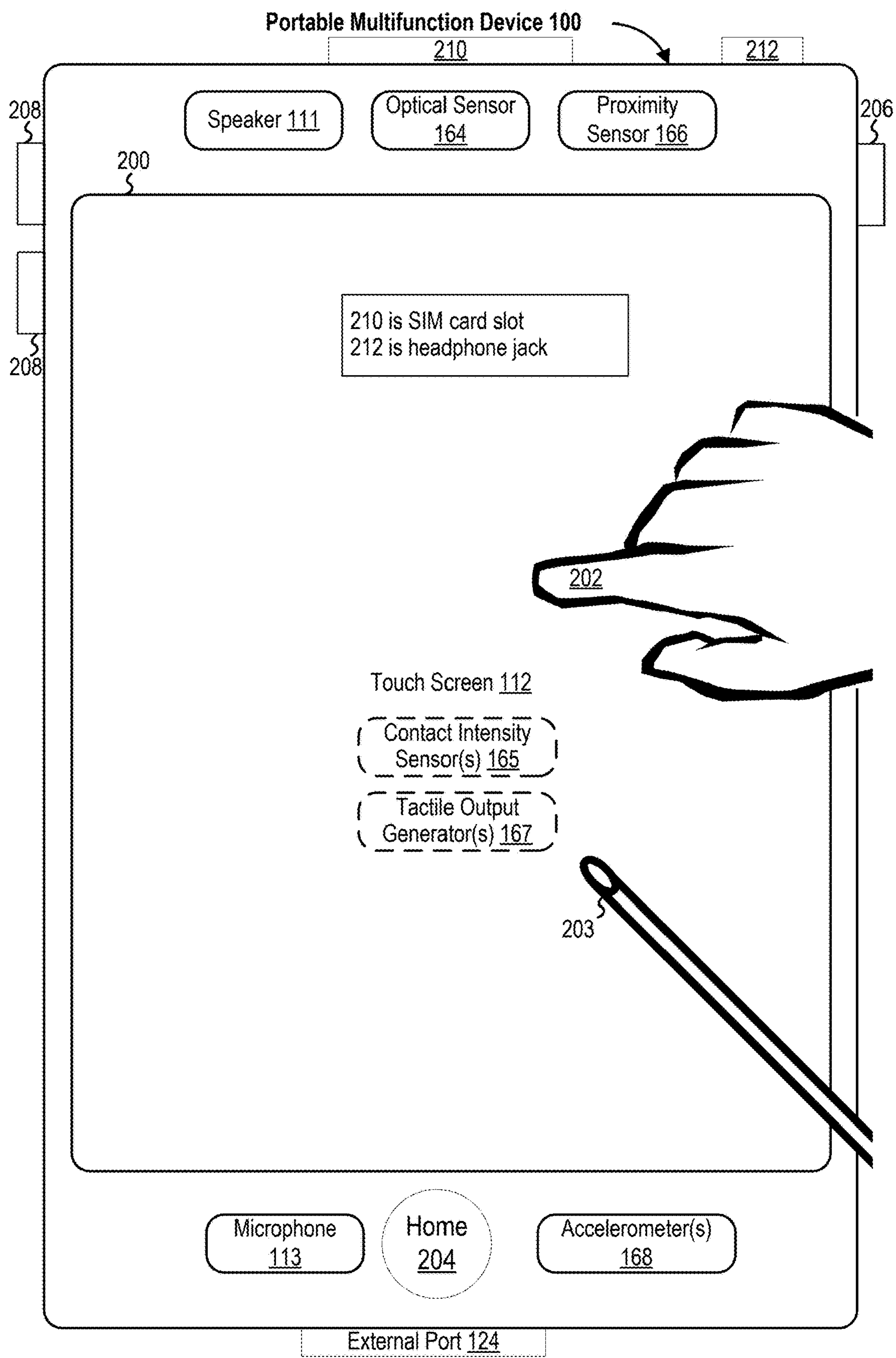
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
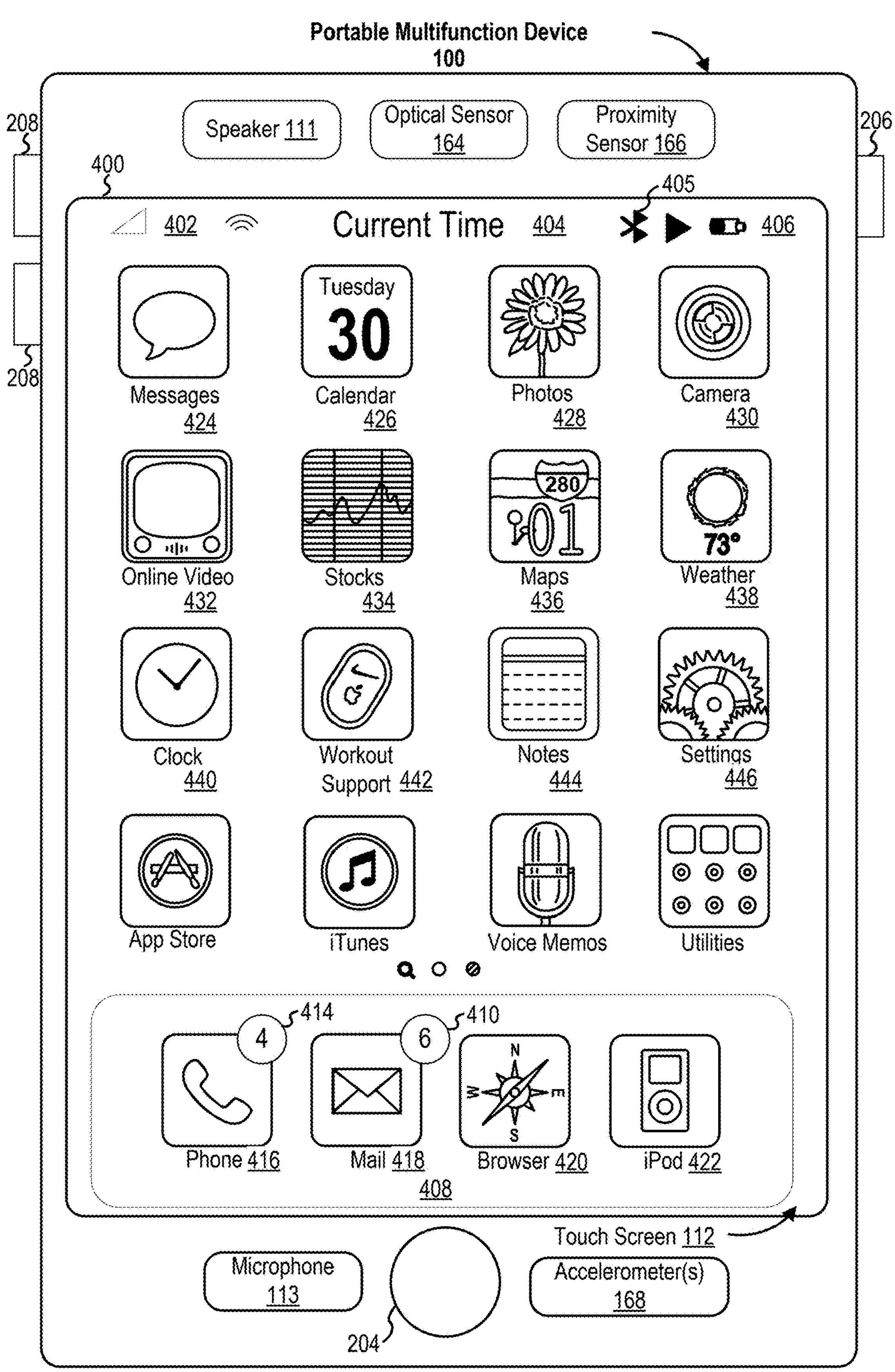
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
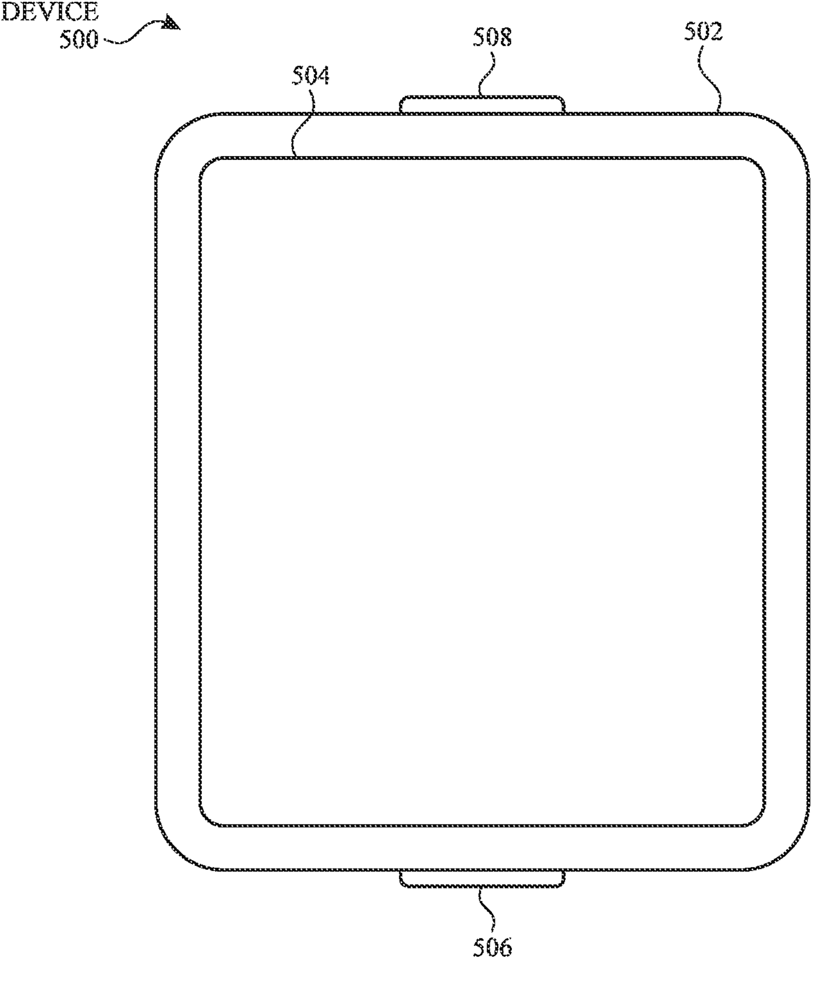
FIG. 5A illustrates a personal electronic device in accordance with some embodiments.
Figure 6A:
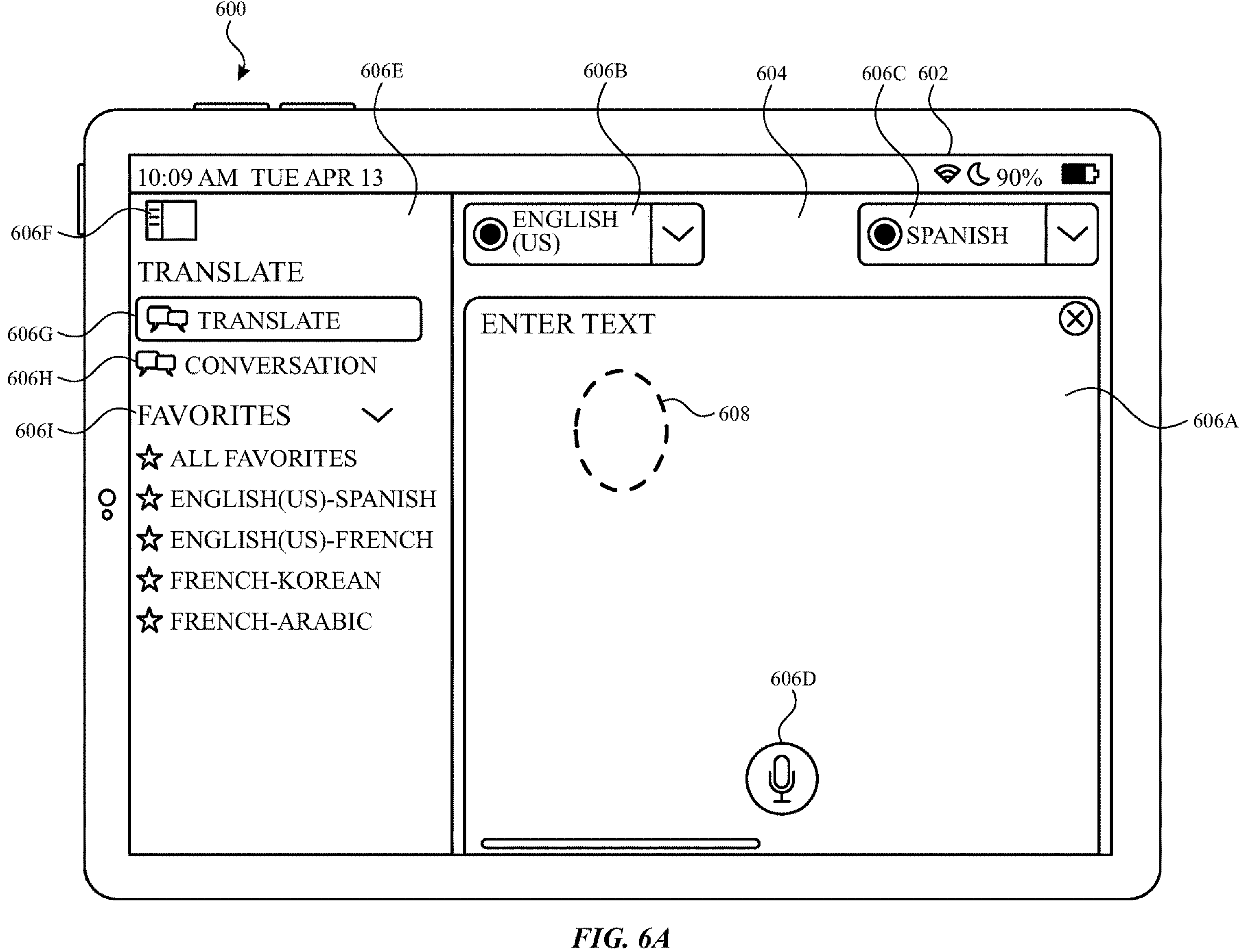
FIGS. 6A-6AC illustrate exemplary user interfaces for displaying translated content in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
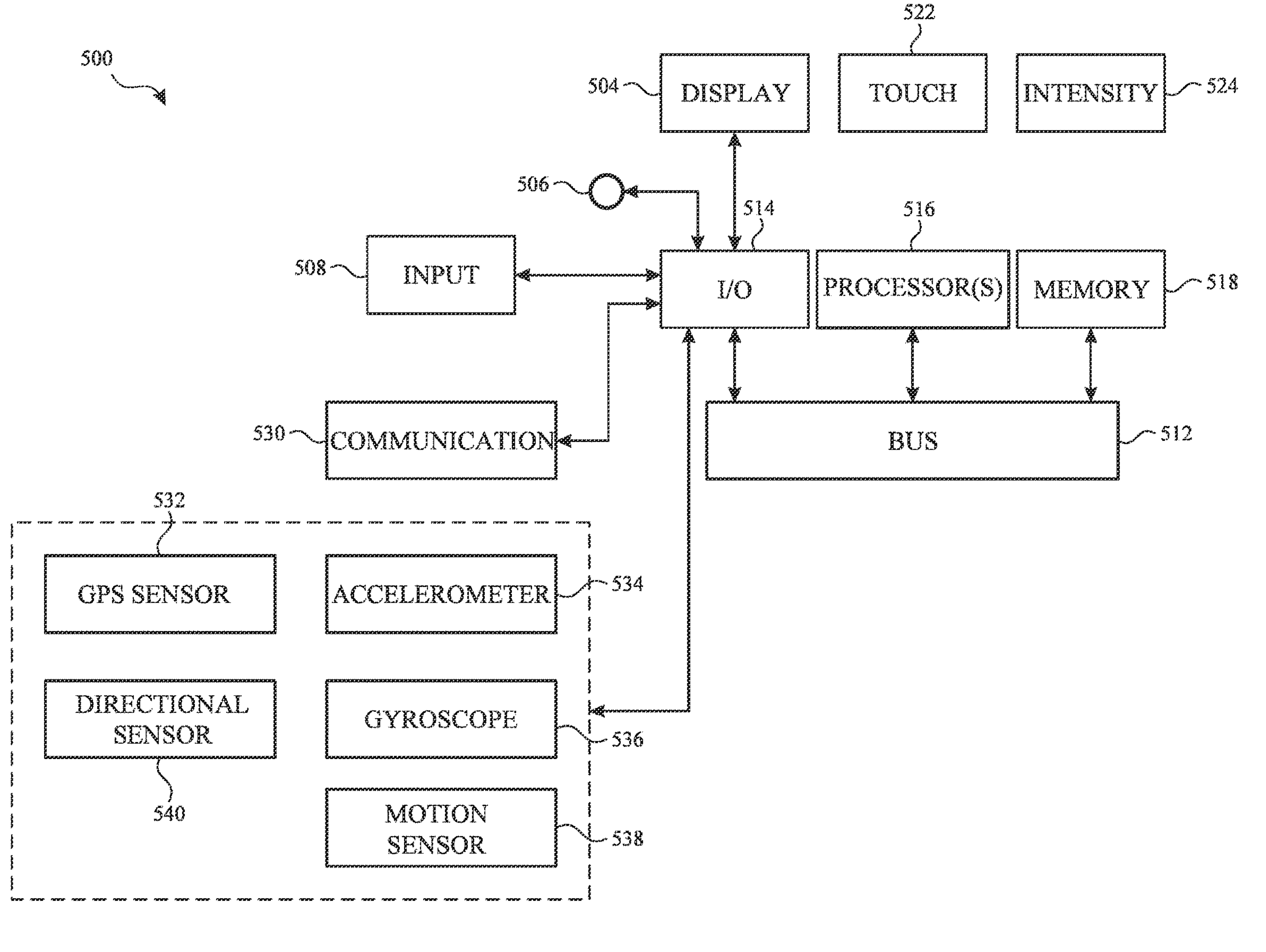
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 750, and 900 (FIGS. 7A, 7B, and 9). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6AC illustrate exemplary user interfaces for displaying translated content, in accordance with some embodiments. The user interfaces in these figures are used to illustrate the processes described below, including the processes in FIGS. 7A and 7B.

FIG. 6A depicts electronic device 600, which is a tablet with touch-sensitive display 602. In some embodiments, electronic device 600 includes one or more features of devices 100, 300, and/or 500. Electronic device 600 depicts translation user interface 604. Translation user interface 604 includes input area 606A for inputting content (e.g., text and/or handwritten letters) to be translated, option 606B that is selectable to change an input language, and option 606C that is selectable to change an output language. Translation user interface 604 also includes audio input option 606D that is selectable to provide an audio input (e.g., a spoken input) for translation. For example, in some embodiments, selection of audio input option 606D causes electronic device 600 to activate one or more microphones and prepare to receive an audio input to be translated. Translation user interface 604 also includes navigation panel 606E, which includes option 606F that is selectable to close navigation panel 606E, option 606G that is selectable to access translation user interface 604, and option 606G that is selectable to access one or more conversation user interfaces (described in greater detail below). Navigation panel 606E also includes favorites section 6061 which includes one or more translations that the user has identified as a favorite translation. For example, a favorite translation includes an input in a first language (e.g., a transcription in a first language) (e.g., a first word or set of words in a first language), and a translation of the input in a second language (e.g., a translation of the first word or set of words in the second language). At FIG. 6A, electronic device 600 detects user input 608.

Figure 6B:
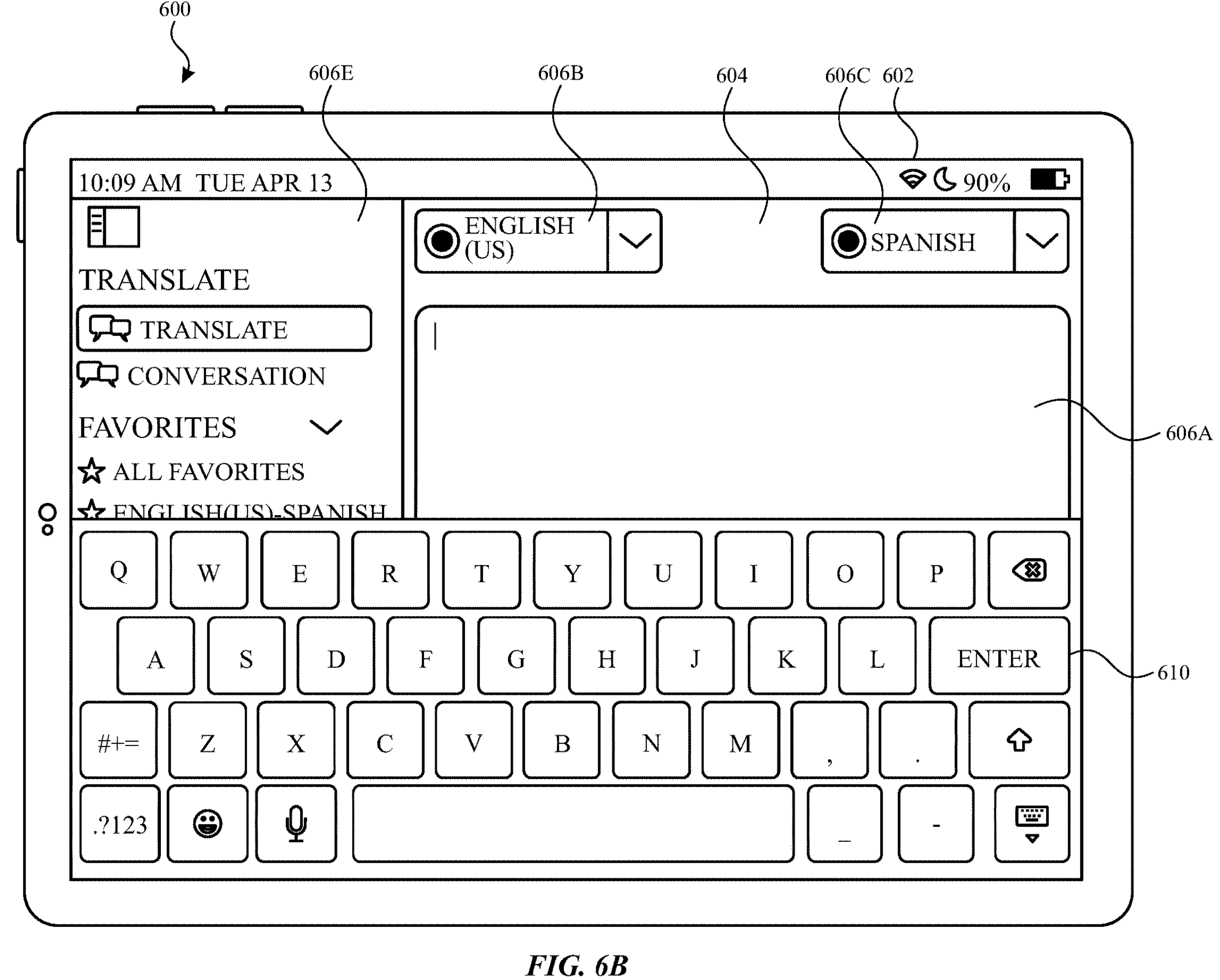

FIG. 6B depicts an example scenario in which user input 608 is a tap input. At FIG. 6B, in response to tap user input 608, electronic device 600 displays keyboard 610 for a user to provide a typed input into input area 606A to be translated from a first language (e.g., English) to a second language (e.g., Spanish).

Figure 6C:
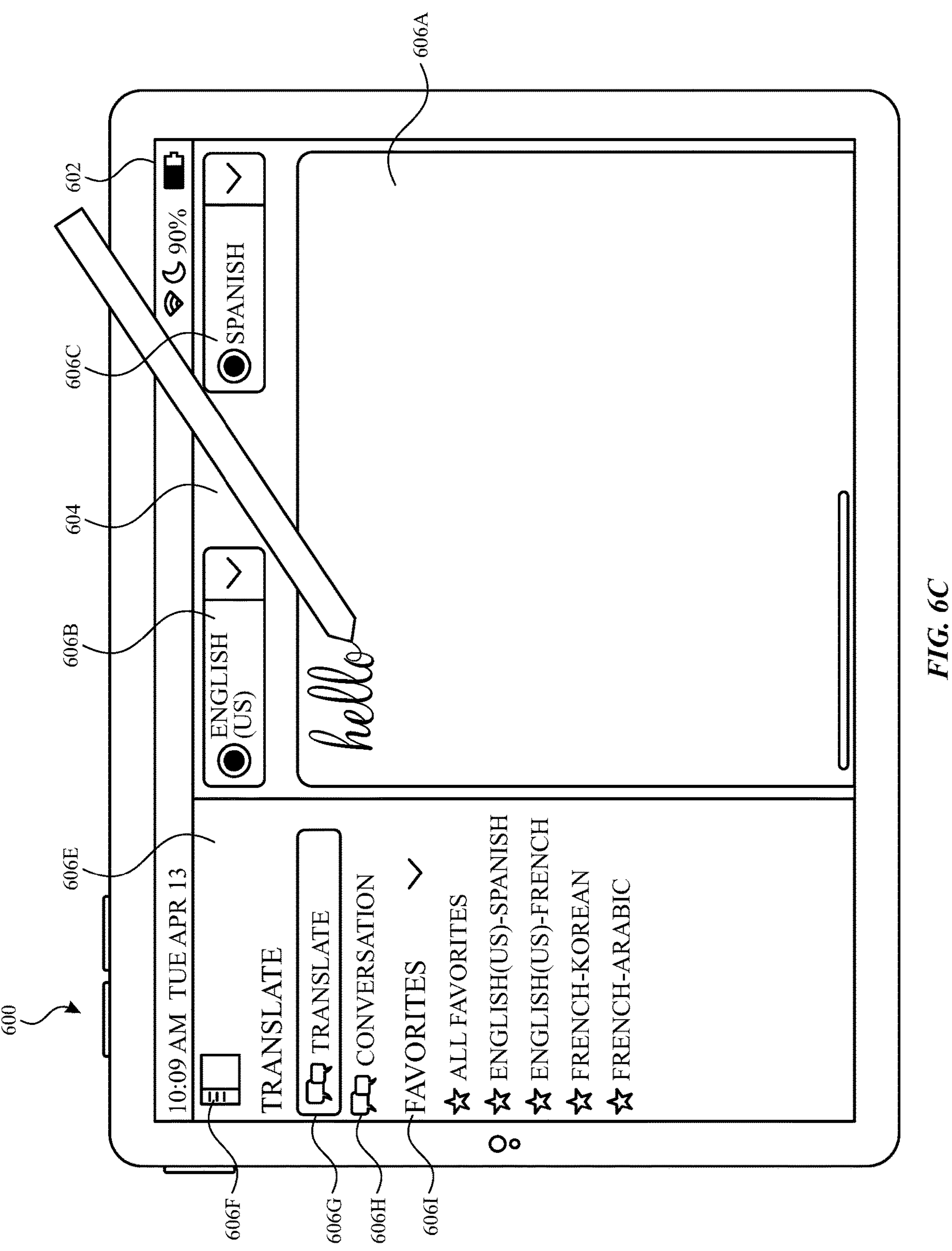

FIG. 6C depicts a different example scenario in which user input 608 is a handwriting input. At FIG. 6C, in response to handwriting user input 608, electronic device 600 displays a representation of the handwriting input.

Figure 6D:
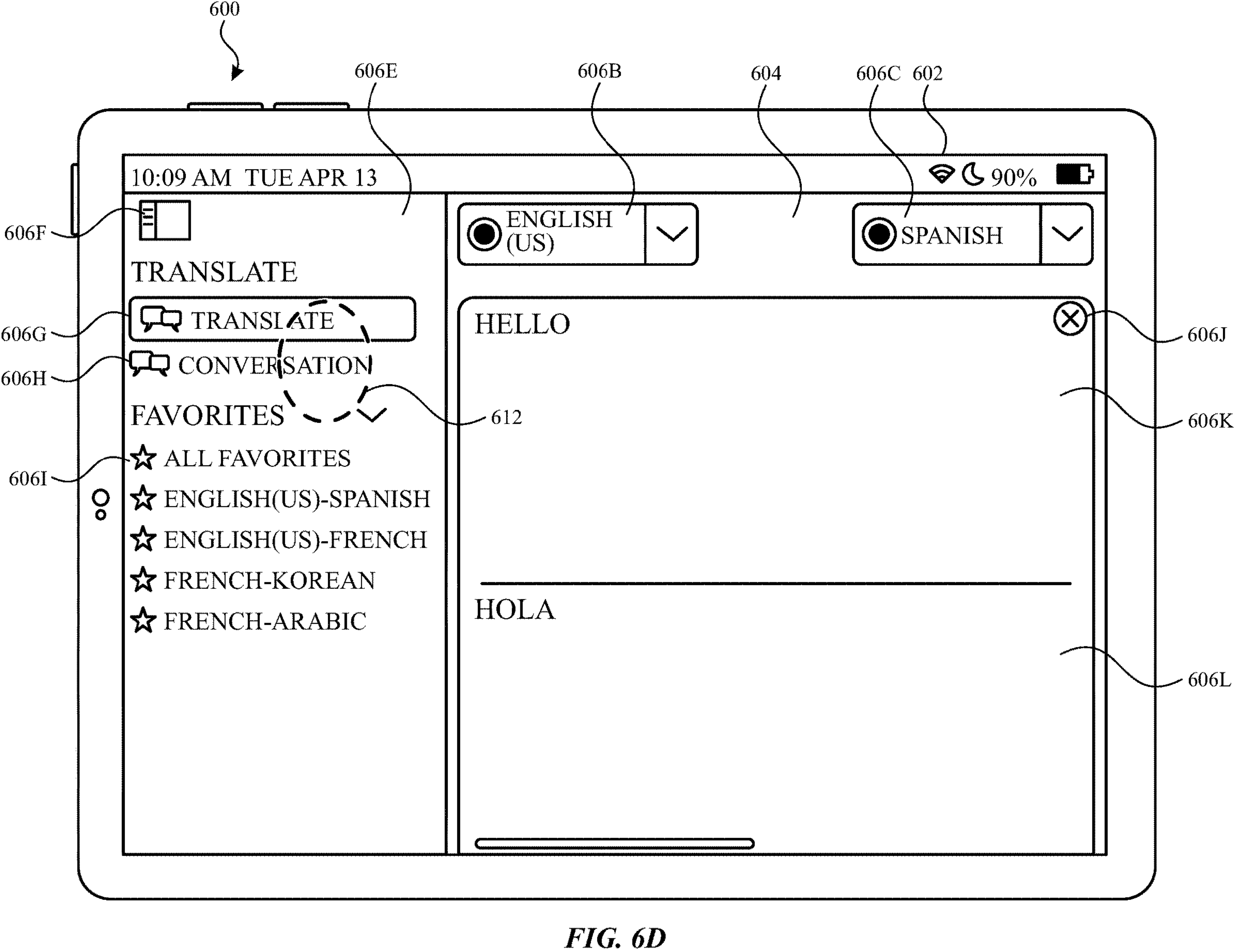

At FIG. 6D, in response to receiving the handwriting user input 608, electronic device 600 converts handwriting user input 608 into a text input, and displays text (e.g., "HELLO") corresponding to handwriting user input 608. Furthermore, in FIG. 6D, electronic device 600 translates the text in the first language (e.g., "HELLO") into text in the second language (e.g., "HOLA"), and displays the text in the first language in region 606K, and displays the translation in the second language in region 606L. At FIG. 6D, electronic device 600 detects user input 612 corresponding to selection of option 606H.

Figure 6E:
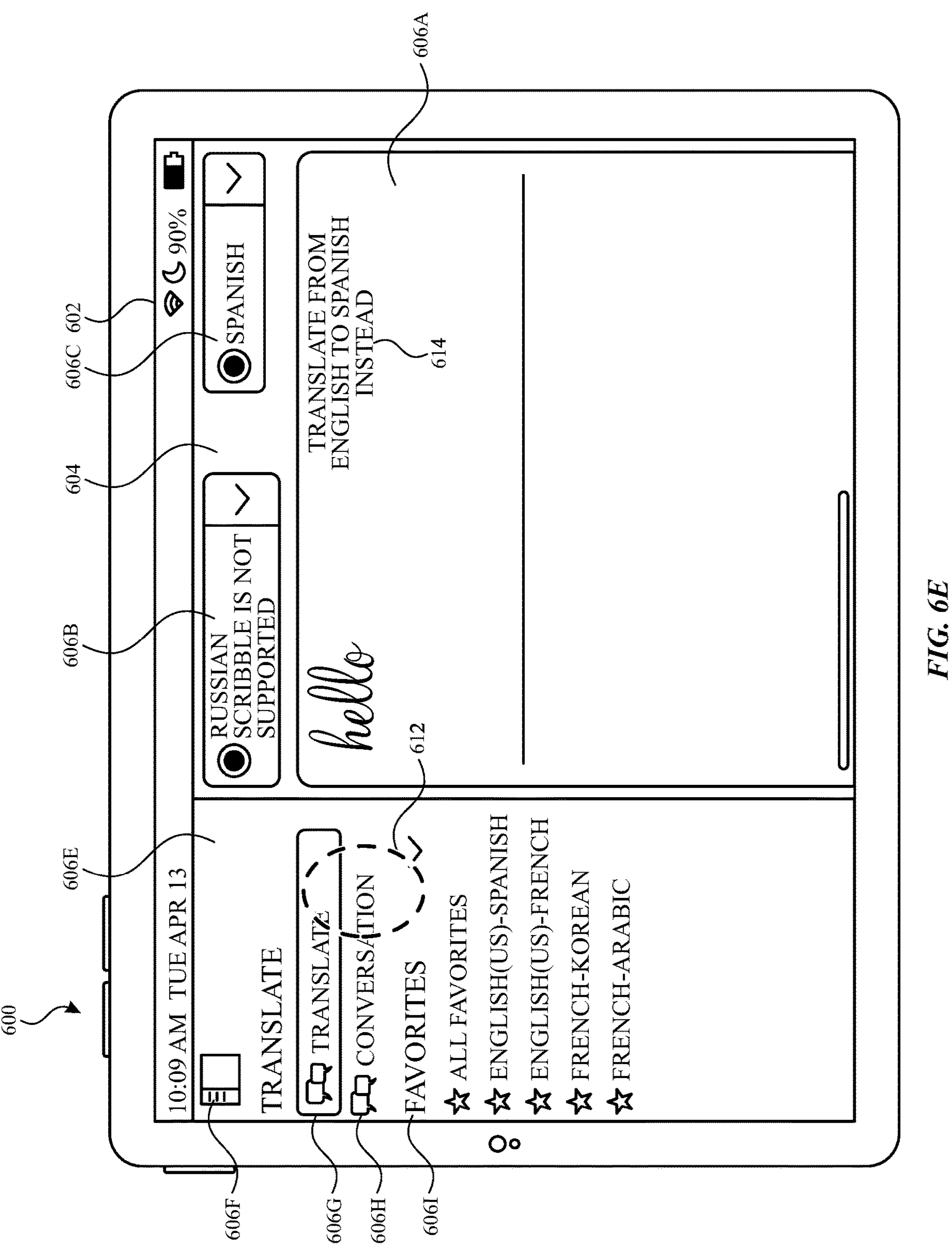

FIG. 6E illustrates an alternative example scenario. In FIG. 6E, rather than have input language 606B be set to "English," input language 606B has been set (e.g., by a user) to Russian. In the example scenario depicted in FIG. 6E, electronic device 600 is configured to receive handwriting inputs in English, but is not configured to receive handwriting inputs in Russian. In accordance with a determination that a handwriting input has been received, and that input language 606B is set to a language that does not support handwriting inputs, electronic device 600 displays a notification (e.g., "SCRIBBLE IS NOT SUPPORTED") indicating that handwriting inputs are not supported for the current input language. Furthermore, in FIG. 6E, although input language 606B is set to Russian, a determination is made by electronic device 600 that the handwriting input may be an input in English, for which handwriting inputs are supported. In accordance with this determination, electronic device 600 displays notification 614 suggesting that the user switch input language 606B to English. In some embodiments, notification 614 is selectable to cause electronic device 600 to switch input language 606B to English. At FIG. 6E, electronic device 600 detects user input 612 corresponding to selection of option 606H.

FIGS. 6C, 6D, and 6E illustrate example scenarios in which a typed input or a handwriting input is provided. In some embodiments, other types of inputs can be provided for translation. For example, in some embodiments, the input is an audio input (e.g., spoken words to be translated). In some embodiments, the input includes text that is captured using a camera. For example, in some embodiments, translation user interface 604 includes an option (e.g., an option that is revealed in response to a gesture (e.g., a long press gesture)) that is selectable to cause a camera interface to be displayed such that text for translation can be captured using a camera and the camera interface.

Figure 6F:
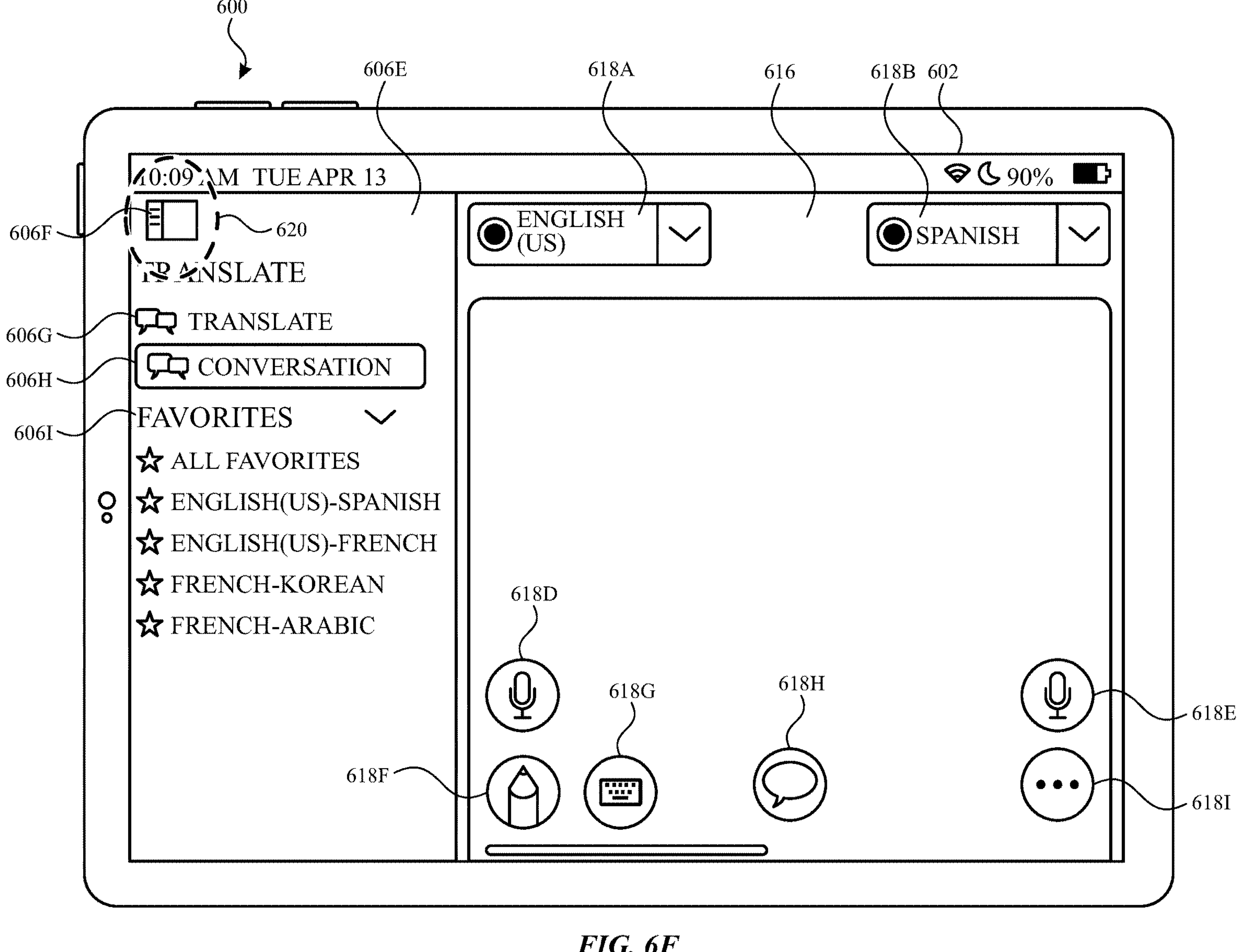

At FIG. 6F, in response to user input 612, electronic device 600 displays side-by-side conversation user interface 616. Side-by-side conversation user interface 616 includes first language picker 618A that is selectable to change a first language, and second language picker 618B that is selectable to change a second language. Side-by-side conversation user interface 616 also includes first audio input option 618D that is selectable to cause electronic device 600 to be configured to receive an audio input in the first language, and second audio input option 618E that is selectable to cause electronic device 600 to be configured to receive an audio input in the second language. Side-by-side conversation user interface 616 also includes options 618F, 618G, 618H, and 618I. Option 618F is selectable to cause electronic device 600 to be configured to receive a handwriting user input. Option 618G is selectable to cause electronic device 600 to be configured to receive a typed user input (e.g., to cause electronic device 600 to display a keyboard). Option 618H is selectable to switch between a side-by-side conversation user interface (e.g., side-by-side conversation user interface 616) and a face-to-face conversation user interface (described in greater detail below). Option 618I is selectable to display one or more options for side-by-side conversation user interface 616.

Side-by-side conversation user interface 616 allows two users who speak different languages to have a "side-by-side"

conversation using electronic device 600. As will be seen in the various example scenarios described herein, a left side of side-by-side conversation user interface 616 corresponds to inputs in the first language (in FIG. 6F, English), and a right side of side-by-side conversation user interface 616 corresponds to inputs in the second language (in FIG. 6F, Spanish). User inputs in the first language (e.g., audio inputs, text inputs, and/or handwriting inputs) result in a transcription of the user input in the first language and a translation of the user input in the second language being displayed on the left side. Similarly, user inputs in the second language result in a transcription of the user input in the second language and a translation of the user input in the first language being displayed on the right side. Further clarity will be provided by way of various example scenarios. At FIG. 6F, electronic device 600 detects user input 620 corresponding to option 606F.

Figure 6G:
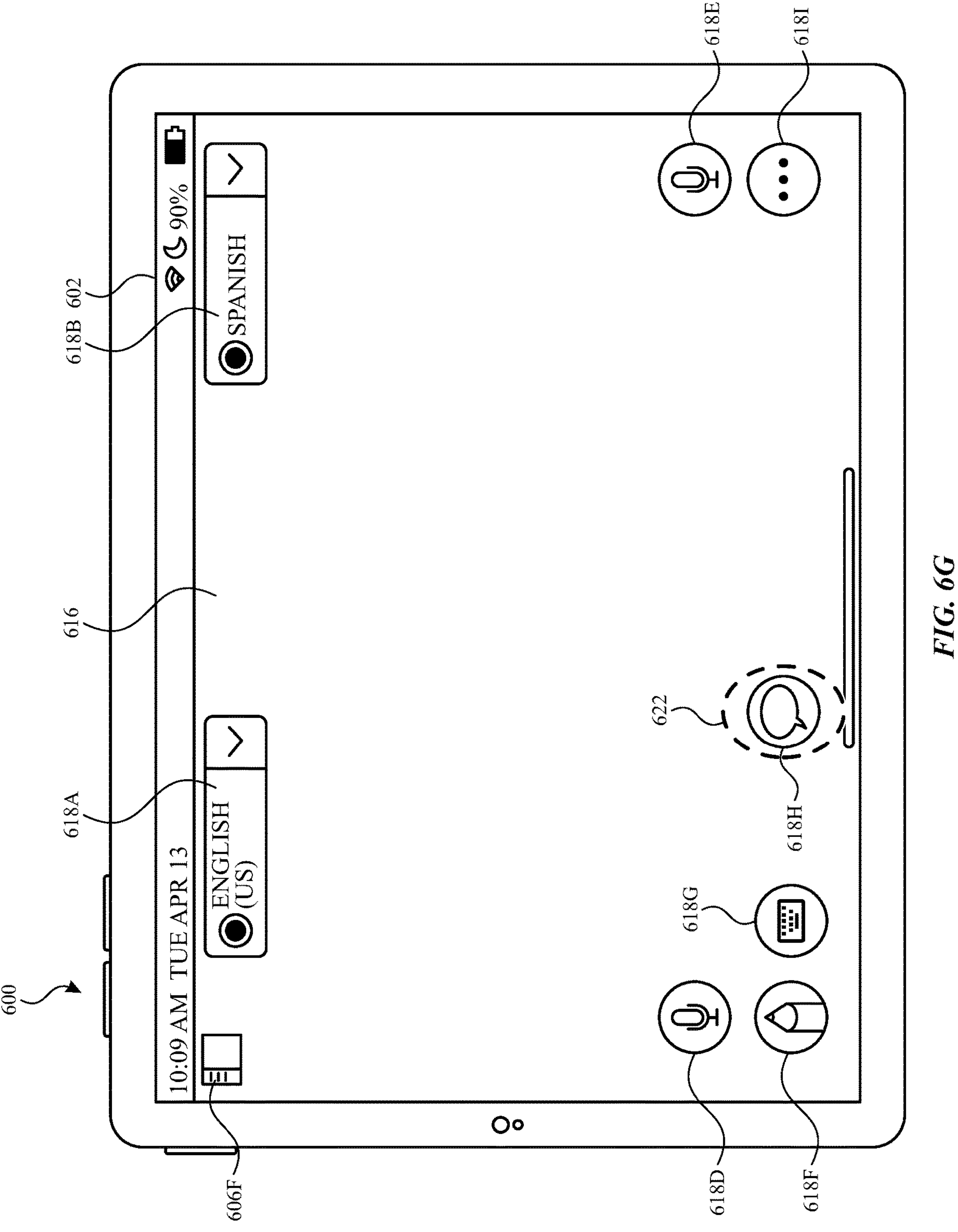

At FIG. 6G, in response to user input 620, electronic device 600 closes navigation panel 606E and displays side-by-side conversation user interface 616 in a larger format (e.g., a format that occupies more of display 602). At FIG. 6G, electronic device 600 detects user input 622 corresponding to selection of option 618H.

Figure 6H:
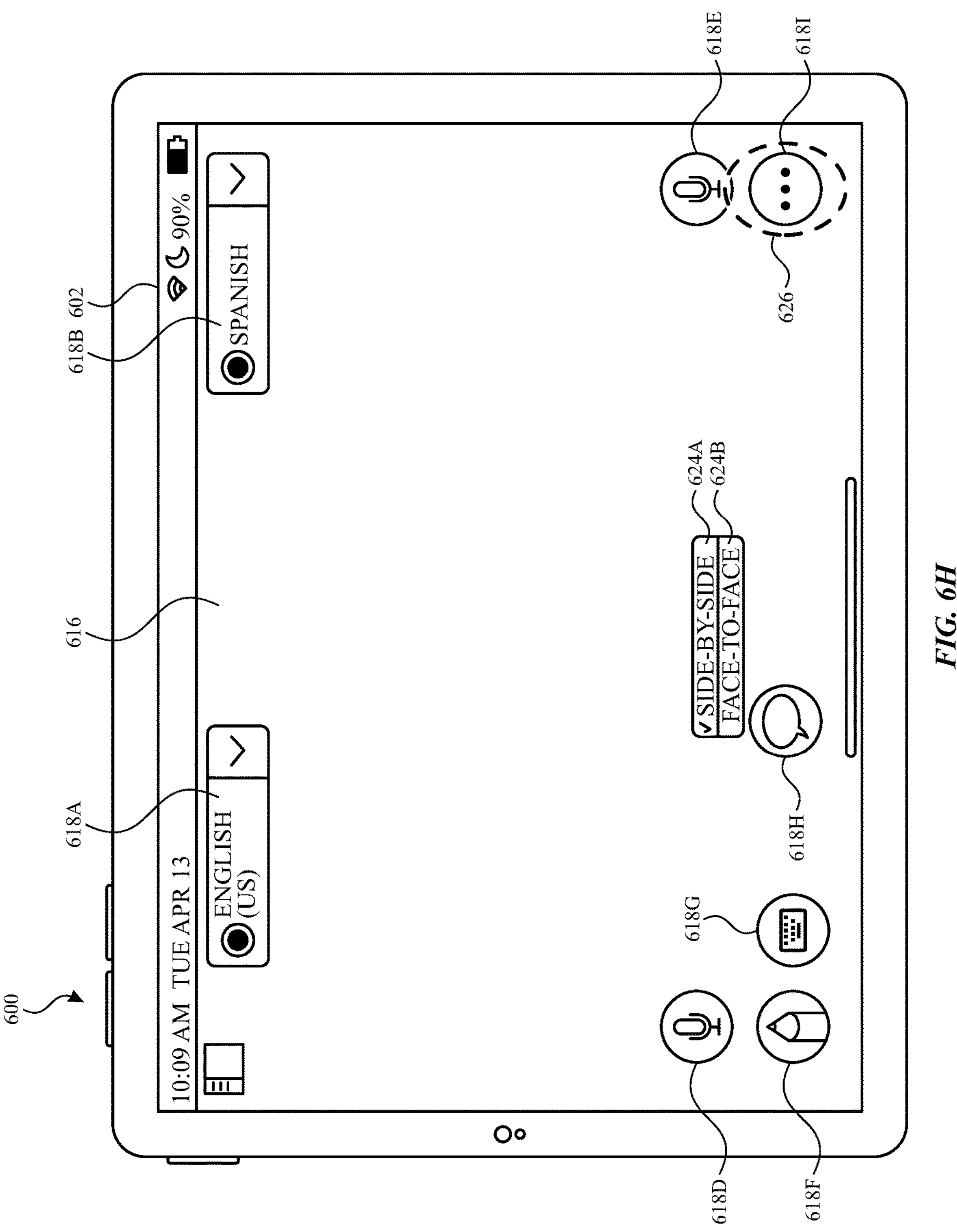

At FIG. 6H, in response to user input 622, electronic device 600 displays options 624A and 624B. Option 624A is selectable to display side-by-side conversation user interface 616. Option 624B is selectable to display a face-to-face conversation user interface, which will be described in greater detail below. At FIG. 6H, electronic device 600 detects user input 626 corresponding to selection of option 618I.

Figure 6I:
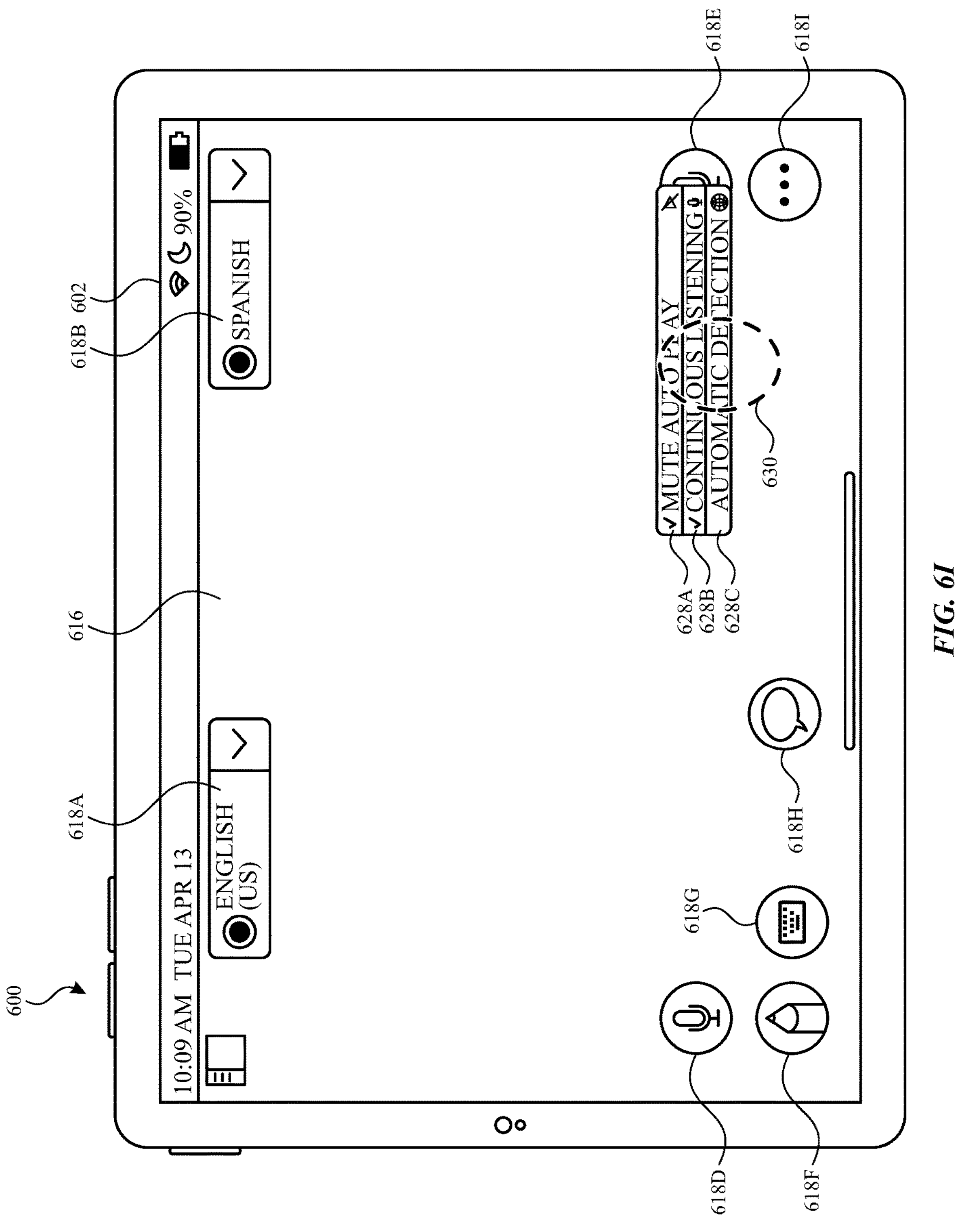

At FIG. 6I, in response to user input 626, electronic device 600 displays options 628A, 628B, and 628C. Option 628A corresponds to an autoplay setting, and can be selected to mute autoplay (e.g., disable autoplay) and/or to enable autoplay. When autoplay is enabled, when (e.g., each time) a language input (e.g., audio input, text input, and/or handwriting input) is received (e.g., in the first language and/or in the second language), a translation of the input (e.g., in the other of the second language and/or the first language) is automatically spoken aloud by electronic device 600. When autoplay is muted (as it is in FIG. 6I), translations are not automatically spoken aloud. Option 628B corresponds to a continuous listening setting, and can be selected to enable and/or disable continuous listening. When the continuous listening setting is enabled, as it is in FIG. 6I, a user input on an audio input option (e.g., audio input option 618D, or audio input option 618E) will cause electronic device 600 to continuously listen for audio inputs (e.g., to continuously remain in a listening mode) until an additional user input is provided to terminate the listening mode. When the continuous listening setting is disabled, when a user provides an input selecting an audio input option, electronic device 600 will listen for audio input, and then when electronic device 600 determines that the audio input is completed (e.g., when no audio input and/or audio input surpassing a threshold volume is not detected for a threshold period of time), electronic device 600 will automatically stop listening for audio input (e.g., will automatically deactivate one or more microphones). Option 628C corresponds to an automatic language detection setting, and is selectable to enable and/or disable the automatic language detection setting. When automatic language detection is enabled, electronic device 600 receives an audio input, and automatically determines whether the input is in the first language or in the second language. When automatic language detection is disabled, electronic device 600 assumes that all audio inputs received after an input on first audio input option 618D are in the first language (e.g., all audio inputs received during a listening session initiated based on an input on first audio input option 618D), and assumes that all audio inputs received immediately after an input on second audio input option 618E are in the second language (e.g., all audio inputs received during a listening session initiated based on an input on first audio input option 618E). In some embodiments, if automatic language detection is disabled, and a user input is received selecting first audio input option 618D, even if an audio input in the second language (Spanish) is received, electronic device 600 will process the input to try to match the phonetic sounds of the audio input to English words, rather than making the determination that the audio input is actually in Spanish. At FIG. 6I, electronic device 600 detects user input 630 corresponding to selection of option 628C.

Figure 6J:
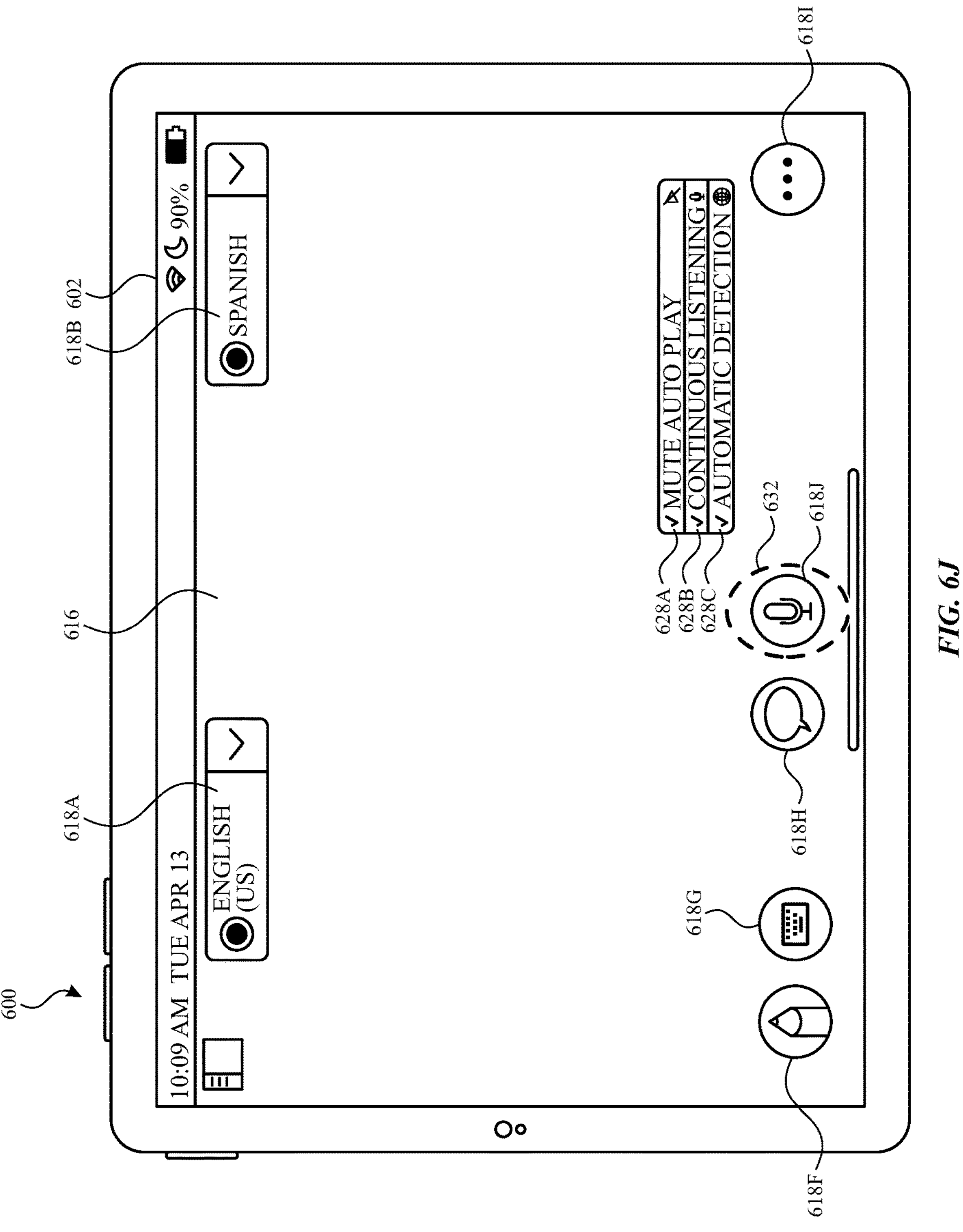

At FIG. 6J, in response to user input 630, electronic device enables the automatic detection setting. In response to the automatic detecting setting being enabled, electronic device 600 ceases displaying first audio input option 618D and second audio input option 618E, and instead displays a single audio input option 618J. At FIG. 6J, electronic device 600 detects user input 632 corresponding to selection of audio input option 618J.

Figure 6K:
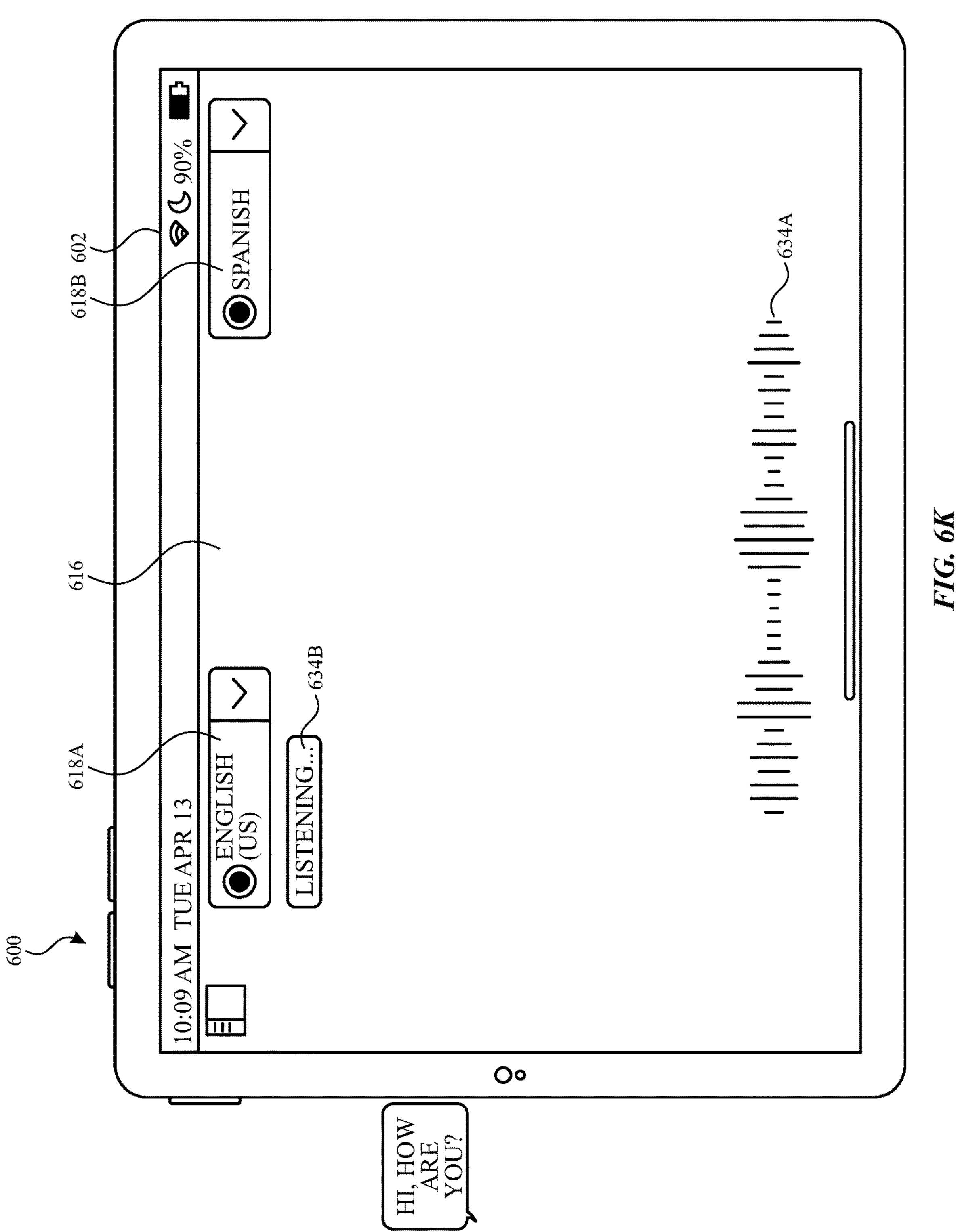

At FIG. 6K, in response to user input 632, electronic device 600 displays indication 634A and indication 634B indicating that a listening mode has been activated (e.g., that a listening session has been activated) (e.g., indicating that electronic device 600 is prepared to receive an audio input). At FIG. 6K, electronic device 600 receives an audio input of a user saying "Hi, how are you?"

Figure 6L:
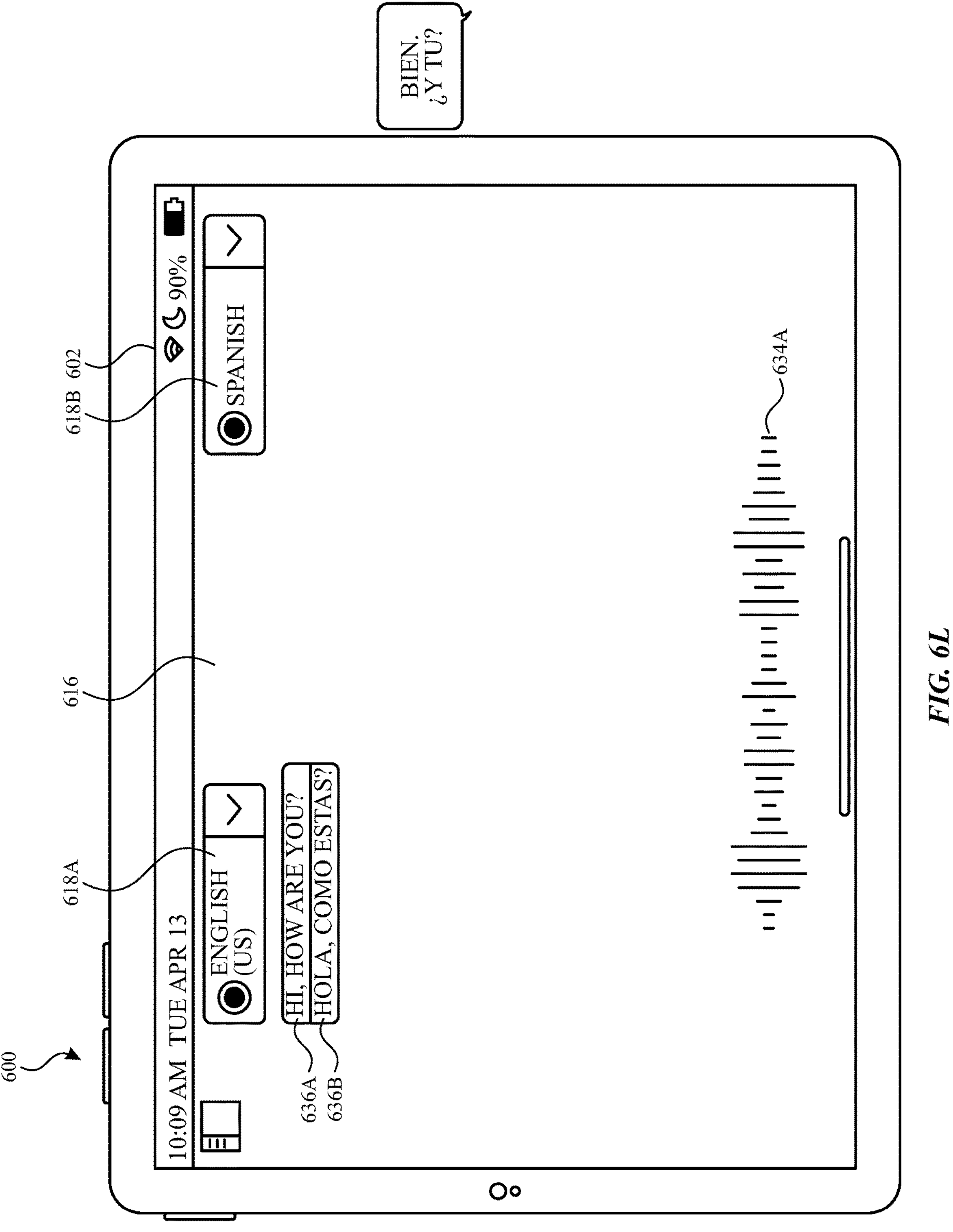

At FIG. 6L, based on the automatic detection setting being enabled, electronic device 600 determines that the audio input is in the first language (e.g., English), and displays transcription 636A of the audio input in the first language and translation 636B of the audio input in the second language on the left side of side-by-side conversation user interface 616. At FIG. 6L, because the continuous listening setting is enabled, electronic device 600 remains in the listening mode (e.g., as indicated by indication 634A), and receives audio input of a user saying "¿Bien, y to?"

Figure 6M:
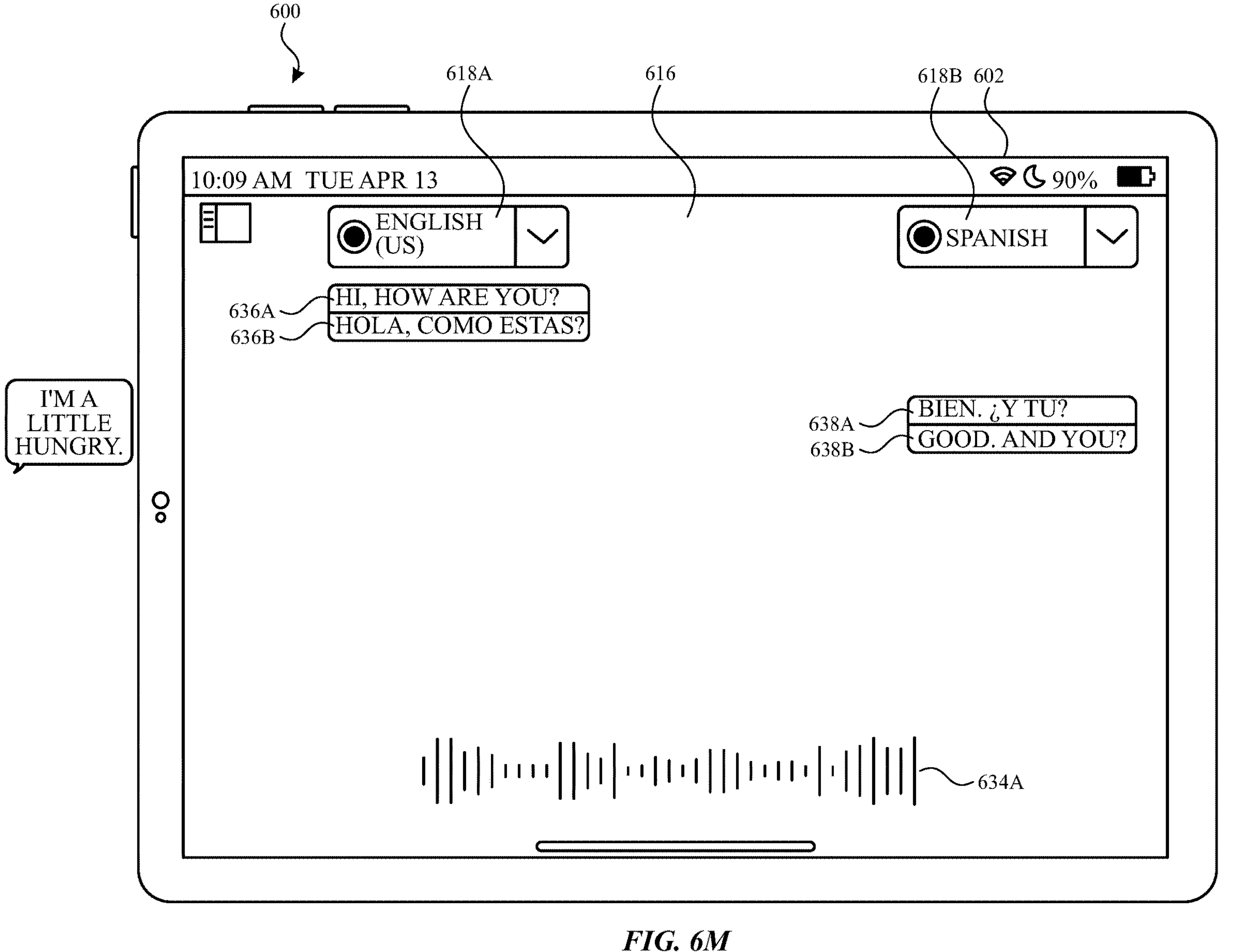

At FIG. 6M, based on the automatic detection setting being enabled, electronic device 600 determines that the audio input is in the second language (e.g., Spanish), and displays transcription 638A of the audio input in the second language and translation 638B of the audio input in the first language on the right side of side-by-side conversation user interface 616. At FIG. 6M, because the continuous listening setting is enabled, electronic device 600 remains in the listening mode (e.g., as indicated by indication 634A), and receives audio input of a user saying "I'm a little hungry."

Figure 6N:
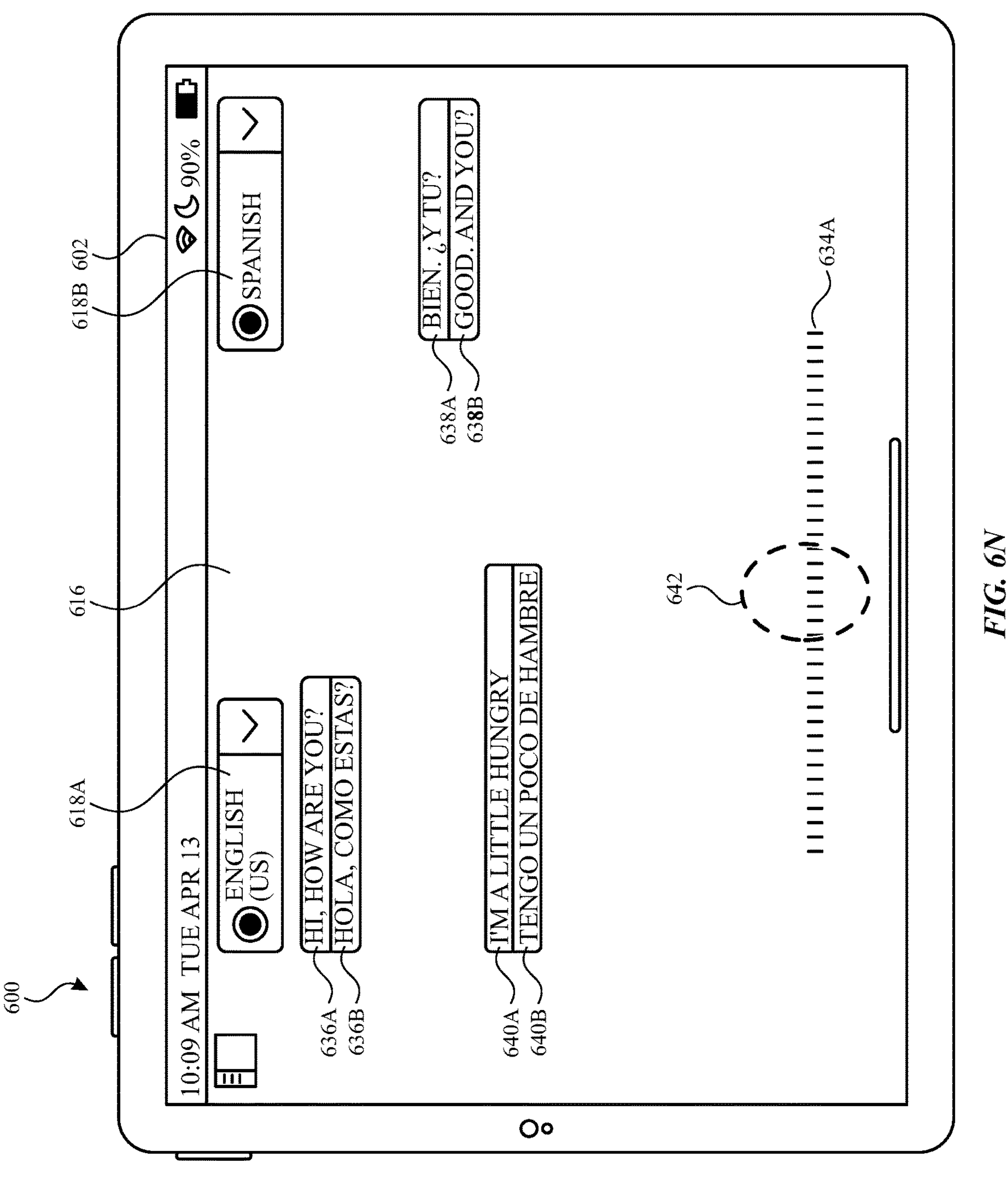

At FIG. 6N, based on the automatic detection setting being enabled, electronic device 600 determines that the audio input is in the first language (e.g., English), and displays transcription 640A of the audio input in the first language and translation 640B of the audio input in the second language on the left side of side-by-side conversation user interface 616. At FIG. 6N, electronic device 600 detects user input 642 corresponding to selection of indication 634A.

Figure 6O:
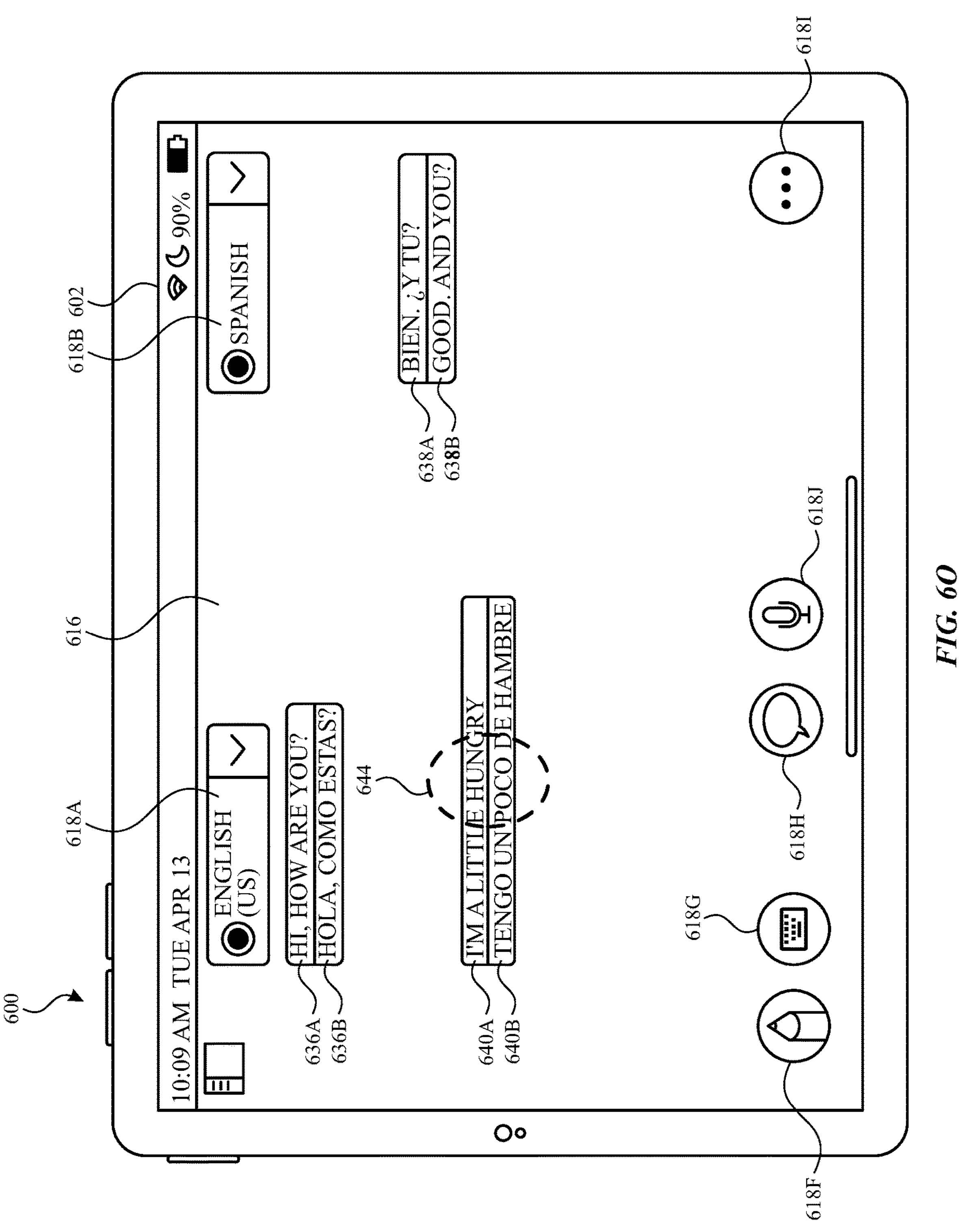

At FIG. 6O, in response to user input 642, electronic device 600 terminates and/or exits the listening mode (e.g., deactivates one or more microphones), and re-displays options 618F-618I. At FIG. 6O, electronic device 600 detects user input 644 corresponding to selection of transcription/translation pair 640A/640B.

Figure 6P:
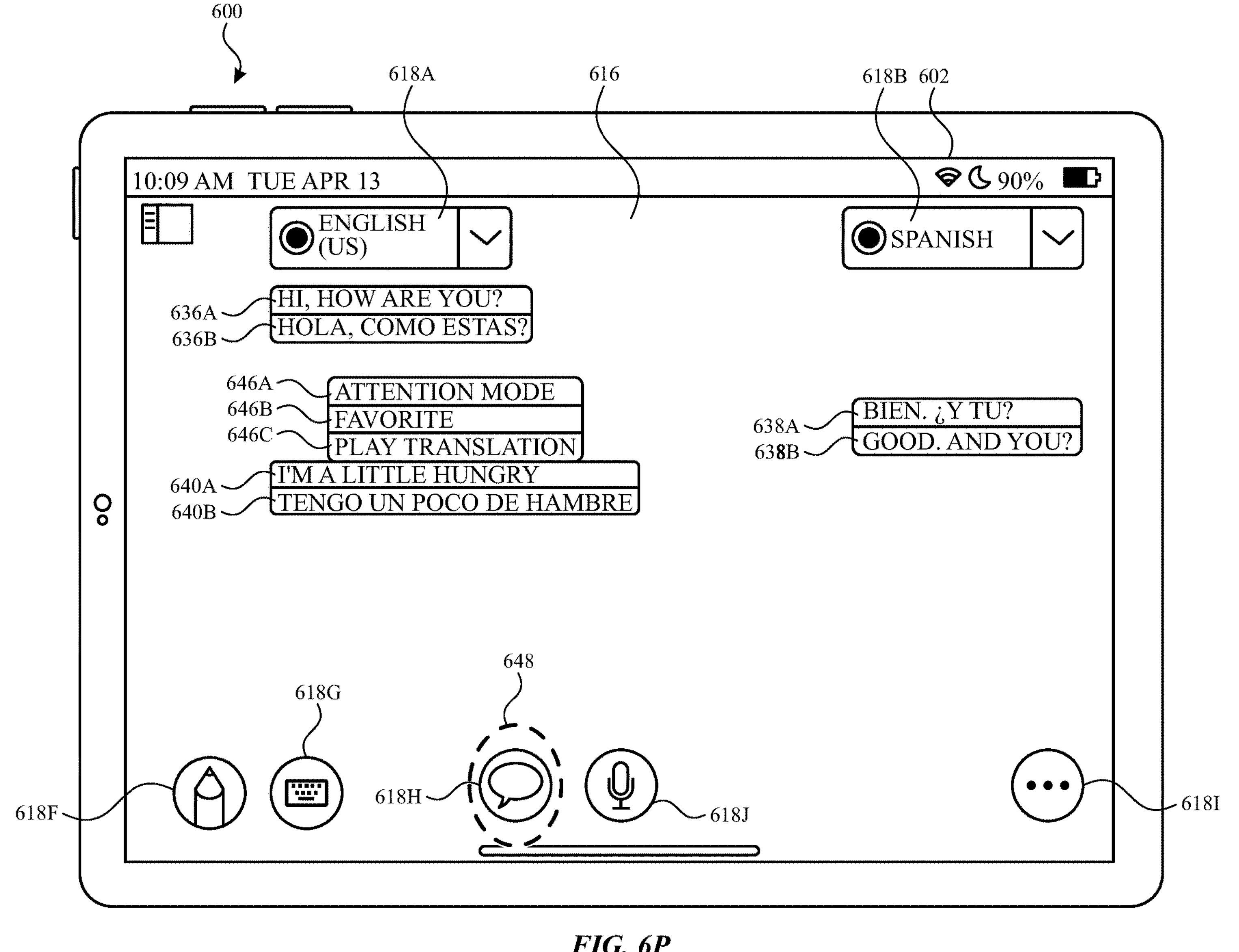

At FIG. 6P, in response to user input 644, electronic device 600 displays options 646A, 646B, and 646C. Option 646A is selectable to display transcription/translation pair 640A/640B (e.g., transcription 640A and translation 640B) in an attention mode user interface, which will be demonstrated below in FIG. 6AA. Option 646B is selectable to add transcription/translation pair 640A/640B to a set of favorite translations (e.g., favorites 6061 in FIG. 6F). Option 646C is selectable to cause electronic device 600 to output an audio output of translation 640B (e.g., to cause electronic device 600 to speak translation 640B aloud). At FIG. 6P, electronic device 600 detects user input 648 corresponding to selection of option 618H.

Figure 6Q:
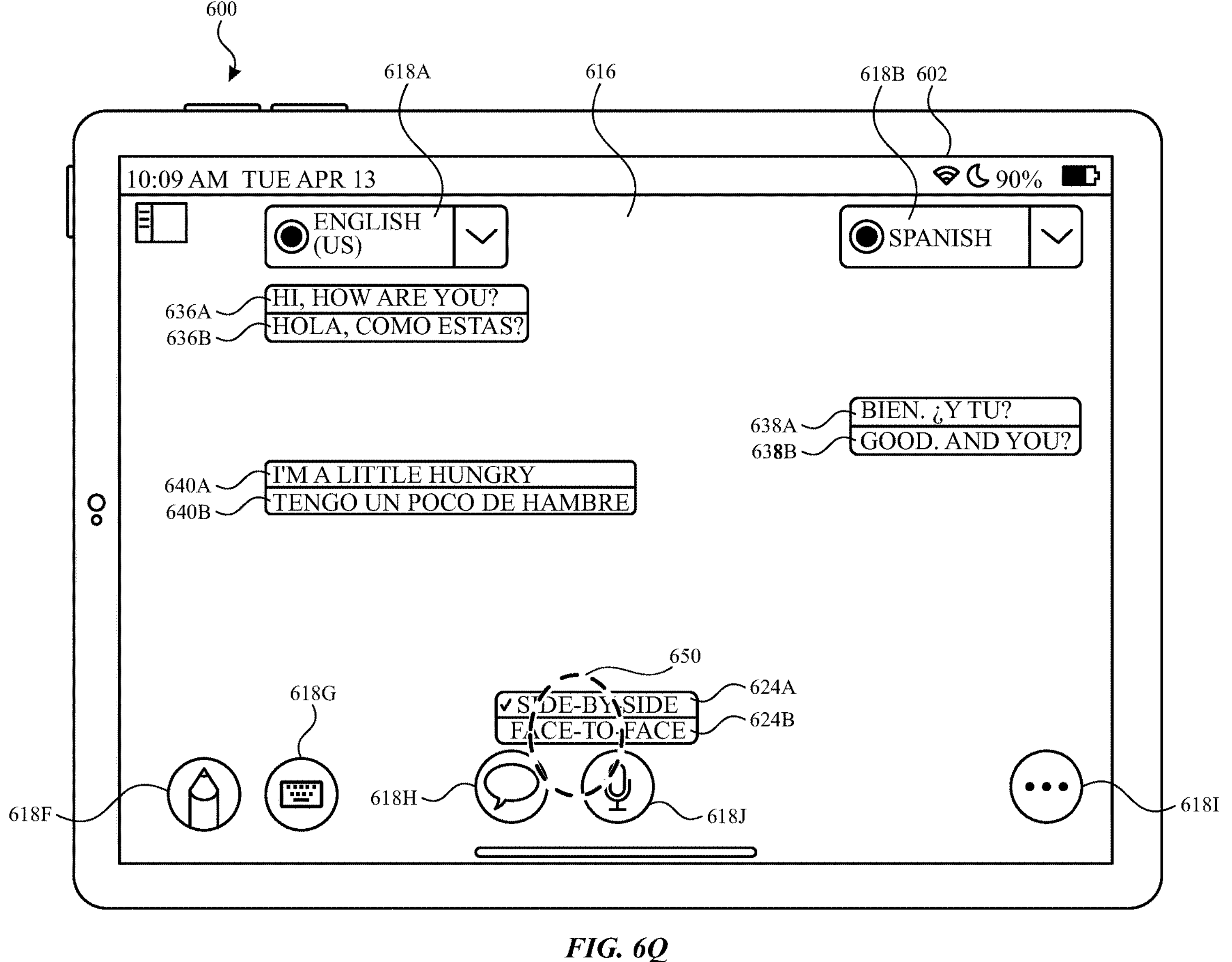

At FIG. 6Q, in response to user input 648, electronic device 600 displays options 624A and 624B. At FIG. 6Q, electronic device 600 detects user input 650 corresponding to selection of option 624B.

Figure 6R:
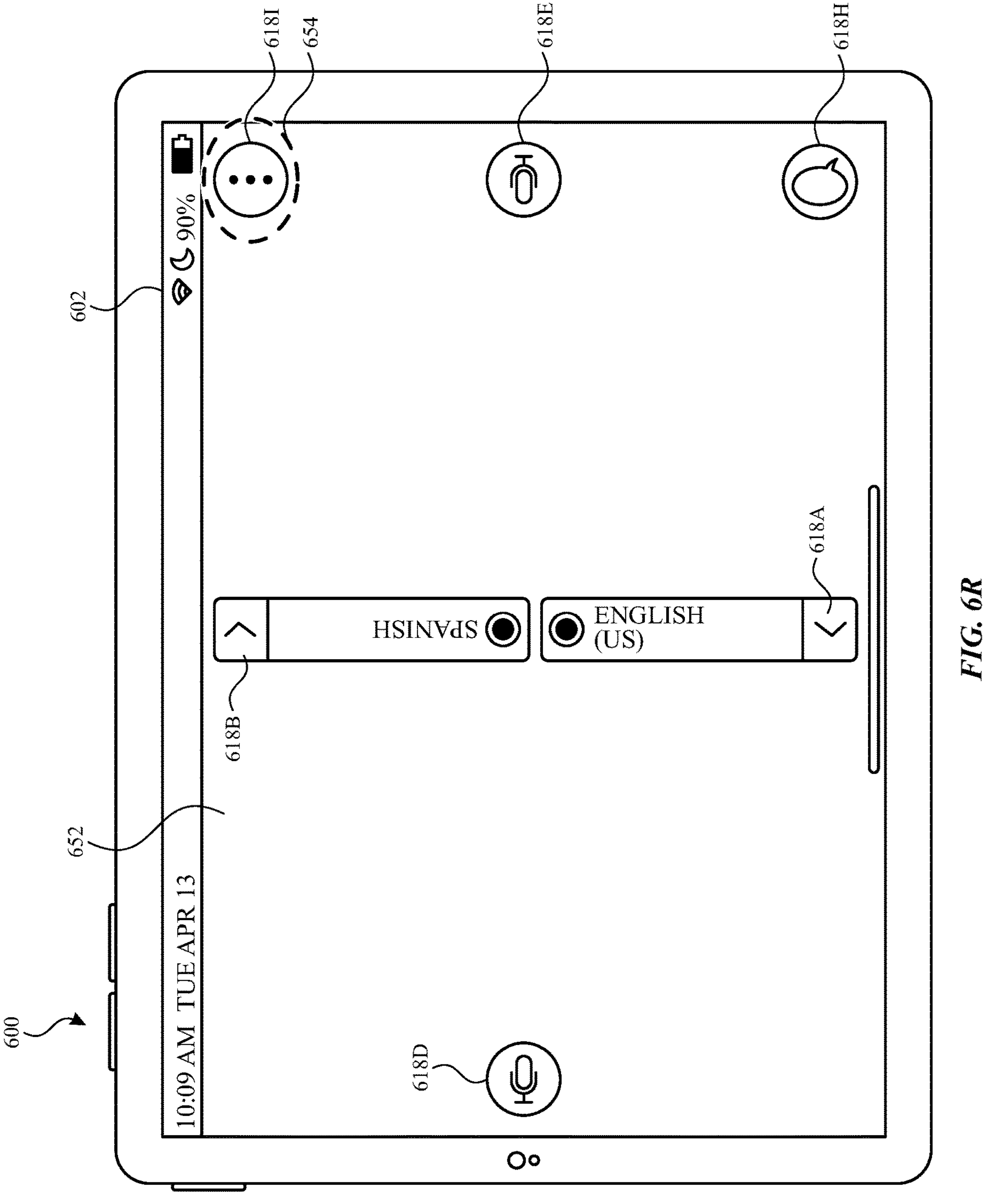

At FIG. 6R, in response to user input 650, electronic device 600 displays face-to-face conversation user interface 652. Face-to-face conversation user interface 652 includes some of the same individual components that were discussed above with reference to side-by-side conversation 616, such as first language selector 618A, second language selector 618B, first audio input option 618D, second audio input option 618E, option 618H, and 618E. However, rather than facilitating side-by-side conversations, face-to-face conversation user interface 652 has arranged these components to facilitate face-to-face conversations using electronic device 600. Accordingly, in face-to-face conversation user interface 652, components that correspond to the first language (e.g., first language selector 618A, first audio input option 618D) are displayed in a first orientation, and components that correspond to the second language (e.g., second language selector 618B, second audio input option 618E) are displayed in a second orientation (e.g., a second orientation upside down relative to the first orientation). Furthermore, in face-to-face conversation user interface 652, a first portion of face-to-face user interface 652 corresponds to the first language (in FIG. 6R, the left portion of face-to-face user interface 652), and a second portion of face-to-face user interface 652 corresponds to the second language (in FIG. 6R, the right portion of face-to-face user interface 652). Transcriptions and translations in the first language are displayed in the first portion of face-to-face user interface 652 in the first orientation, and transcriptions and translations in the second language are displayed in the second portion of face-to-face user interface 652 in the second orientation. Further clarity will be provided via various example scenarios below. At FIG. 6R, electronic device 600 detects user input 654 corresponding to selection of option 618E.

Figure 6S:
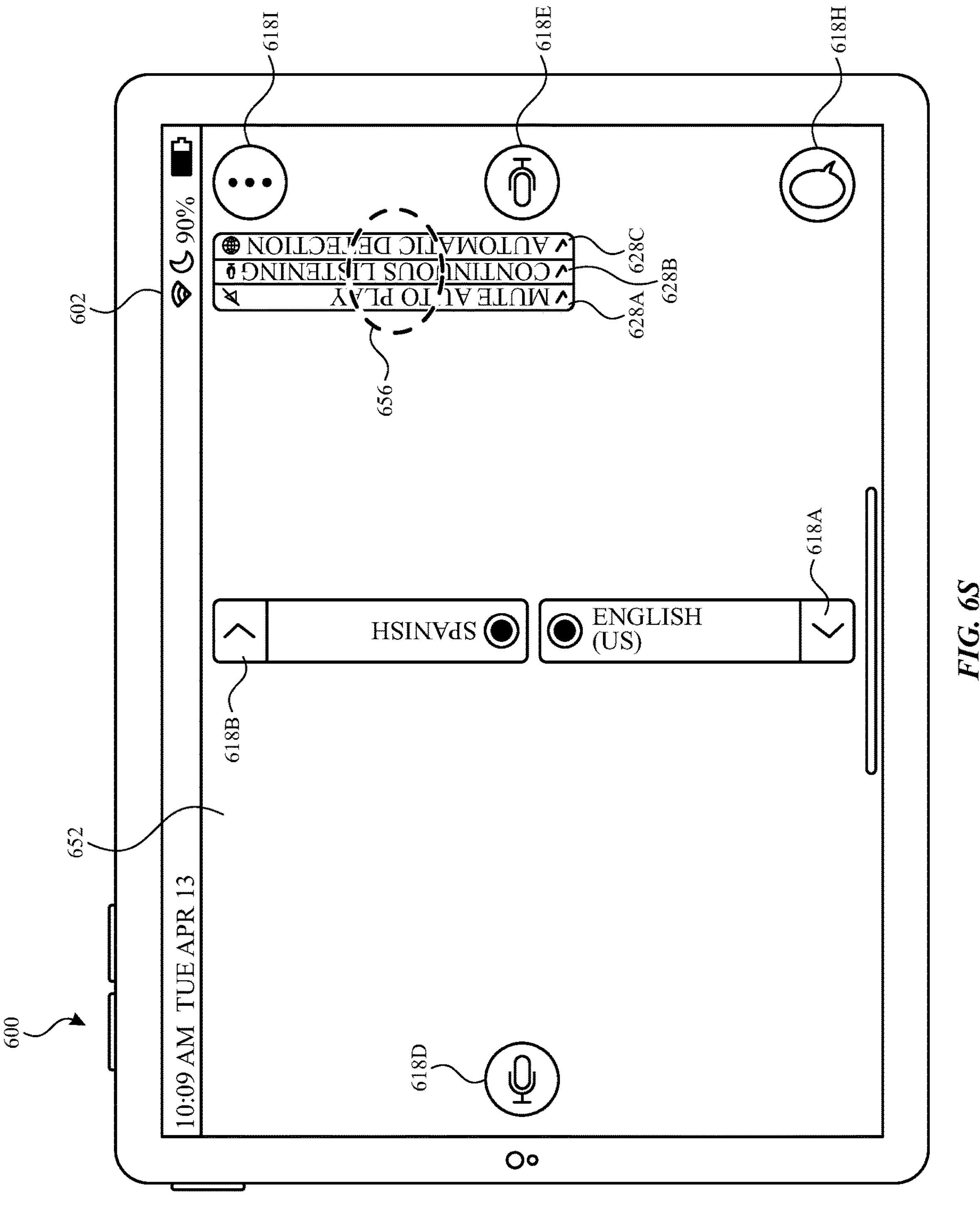

At FIG. 6S, in response to user input 654, electronic device 600 displays options 628A, 628B, and 628C. It can be seen in FIG. 6S that the automatic detection setting is enabled. In side-by-side conversation user interface 616, when automatic detection was enabled, side-by-side conversation user interface 616 displays only a single audio input option 618J. However, face-to-face conversation user interface 652 includes two audio input options 618D and 618E, even when automatic detection is enabled (e.g., so that one user does not have to reach across a table and/or across device 600 to select the audio input option). At FIG. 6S, electronic device 600 detects user input 656 corresponding to selection of option 628B.

Figure 6T:
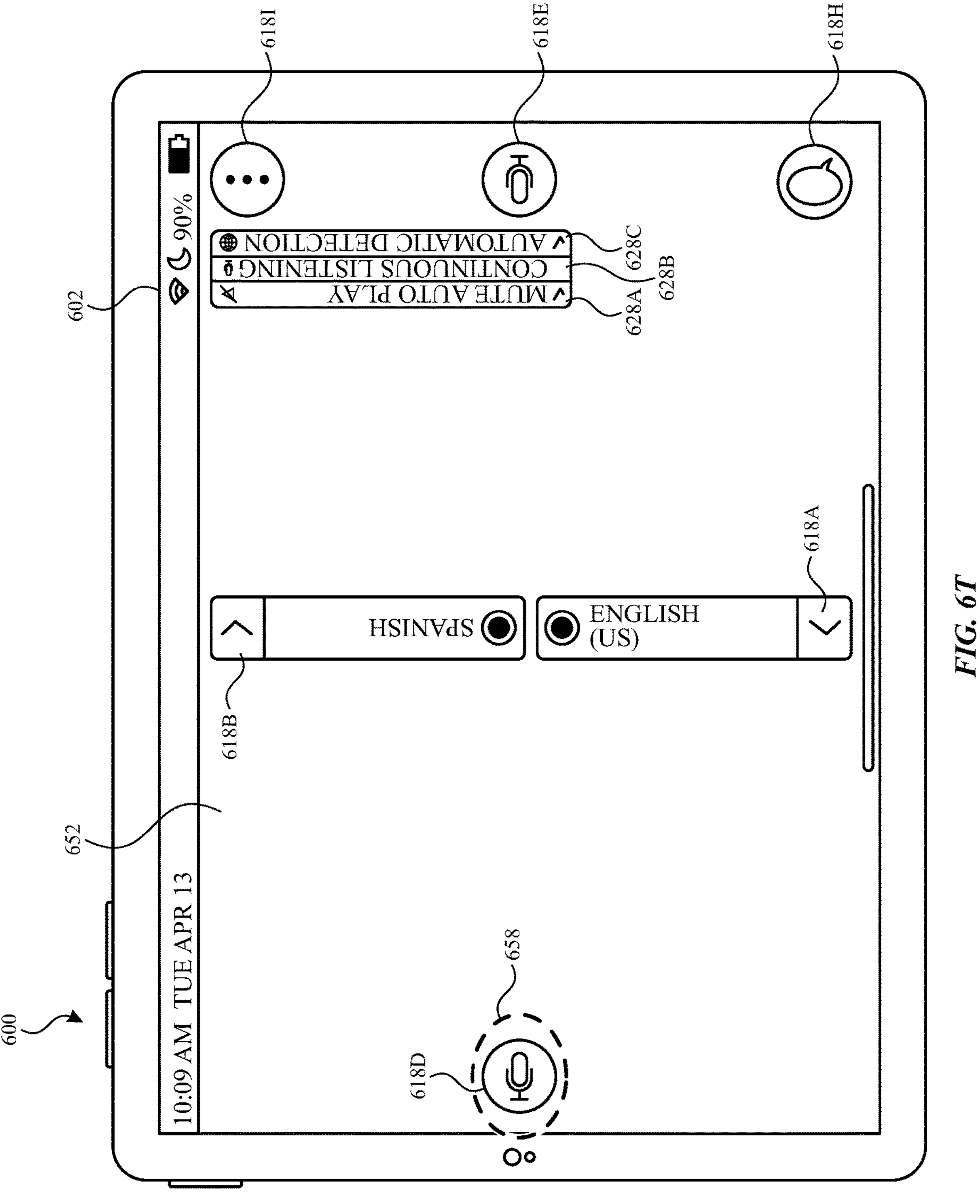

At FIG. 6T, in response to user input 656, electronic device 600 disables the continuous listening setting. At FIG. 6T, electronic device 600 detects user input 658 corresponding to selection of audio input option 618D.

Figure 6U:
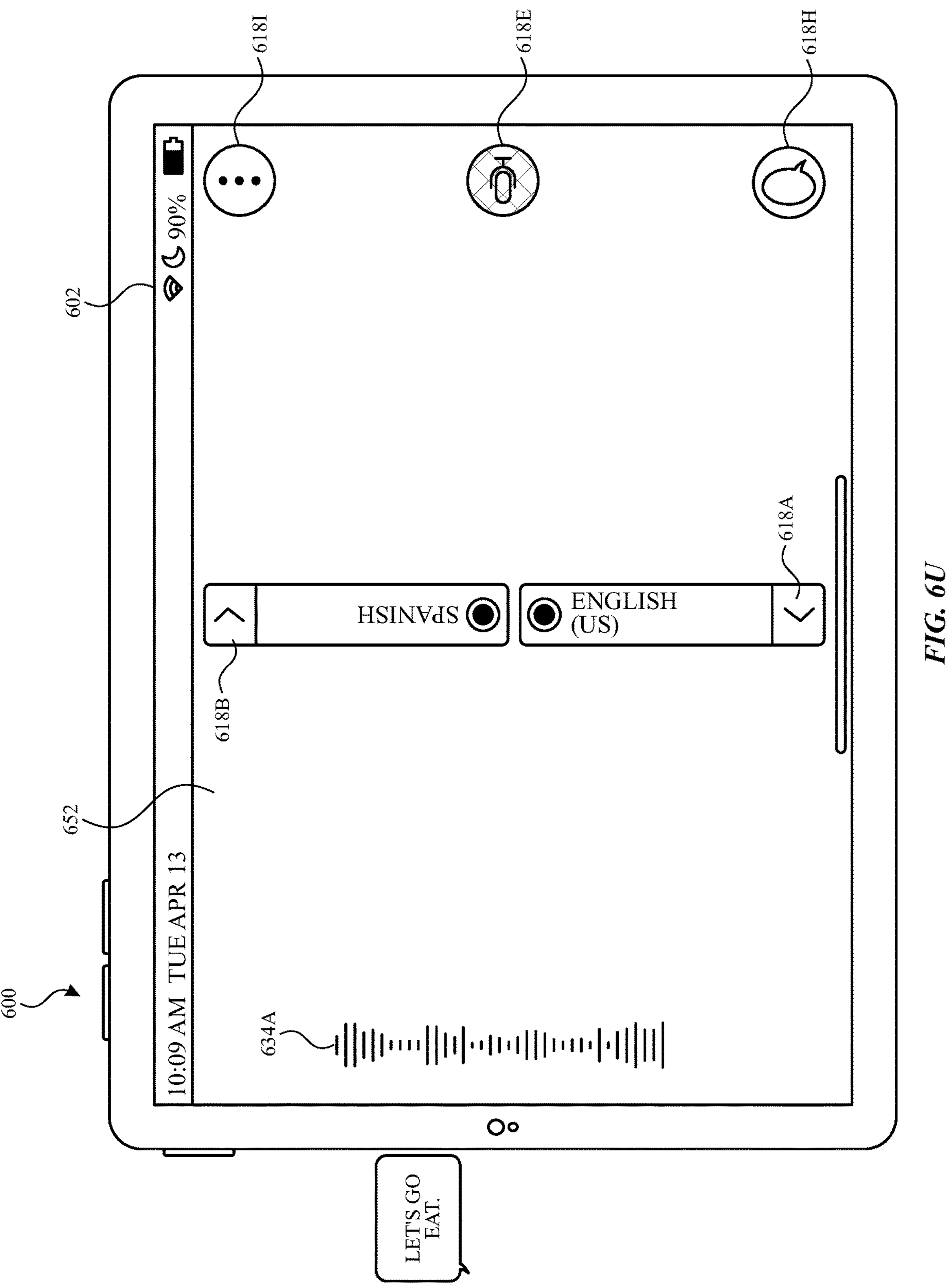

At FIG. 6U, in response to user input 658, electronic device 600 initiates a listening mode and displays indication 634A (indicative of electronic device 600 being in the listening mode). In the embodiment depicted in FIG. 6U, audio input option 618E is visually de-emphasized (e.g., grayed out). In some embodiments, audio input option 618E is also replaced with indication 634A. In some embodiments, although audio input option 618D corresponding to the first language was selected, because automatic detection is enabled, electronic device 600 is configured to detect audio inputs in either the first language or the second language and automatically determine whether an audio input is in the first language or in the second language. At FIG. 6U, while electronic device 600 is in the listening mode, electronic device 600 receives audio input of a user saying "Let's go eat."

Figure 6V:
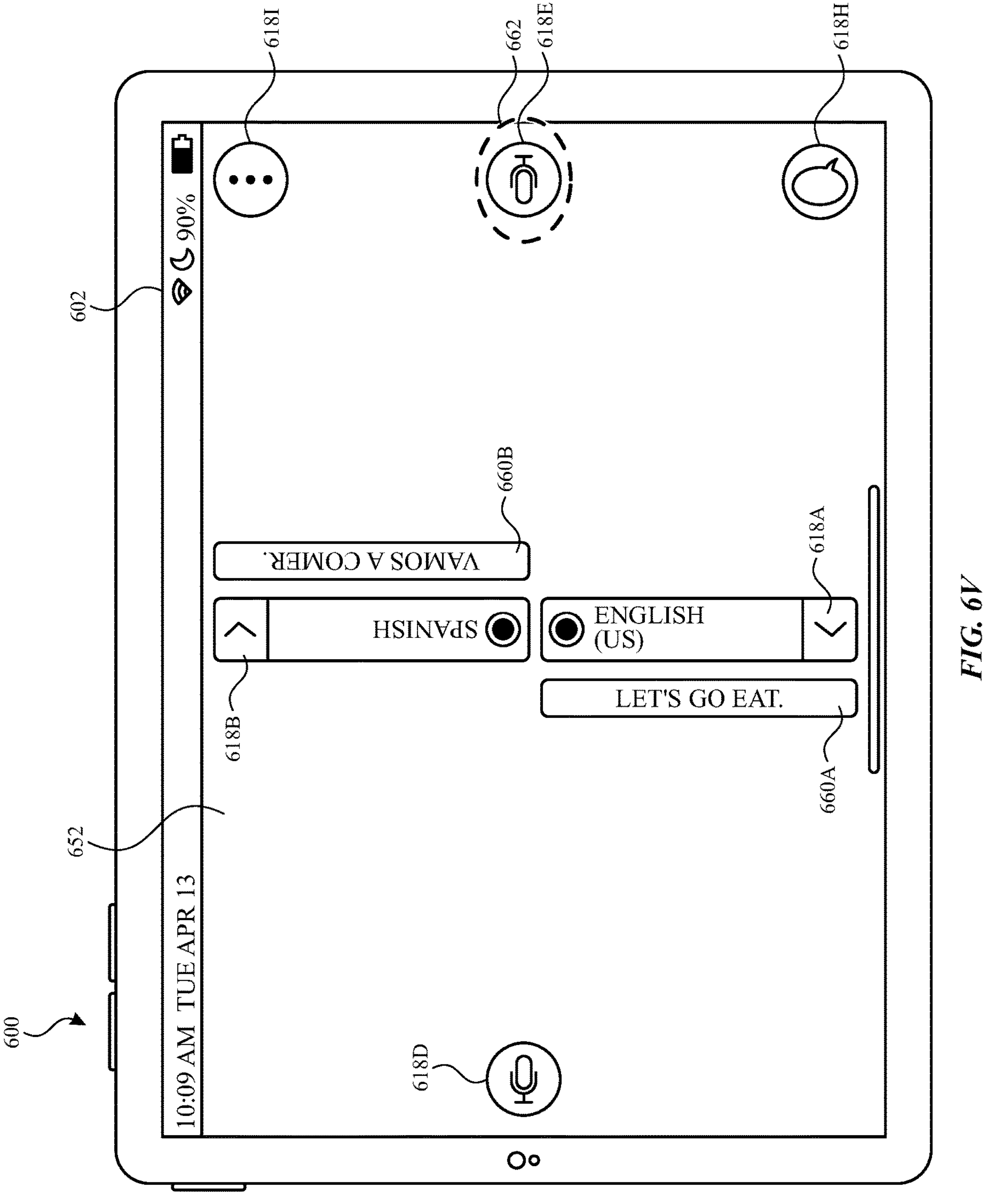

At FIG. 6V, in response to receiving the audio input, electronic device 600 determines that the audio input is in the first language, and displays transcription 660A in the first language in the first orientation in the first region, and also displays translation 660B corresponding to transcription 660A in the second language in the second orientation in the second region. Furthermore, in FIG. 6V, because continuous listening is disabled, electronic device 600 automatically determines that the audio input is completed, and exits the listening mode, ceases display of indication 634A, and re-displays audio input option 618D. At FIG. 6V, electronic device 600 detects user input 662 corresponding to selection of audio input option 618E.

Figure 6W:
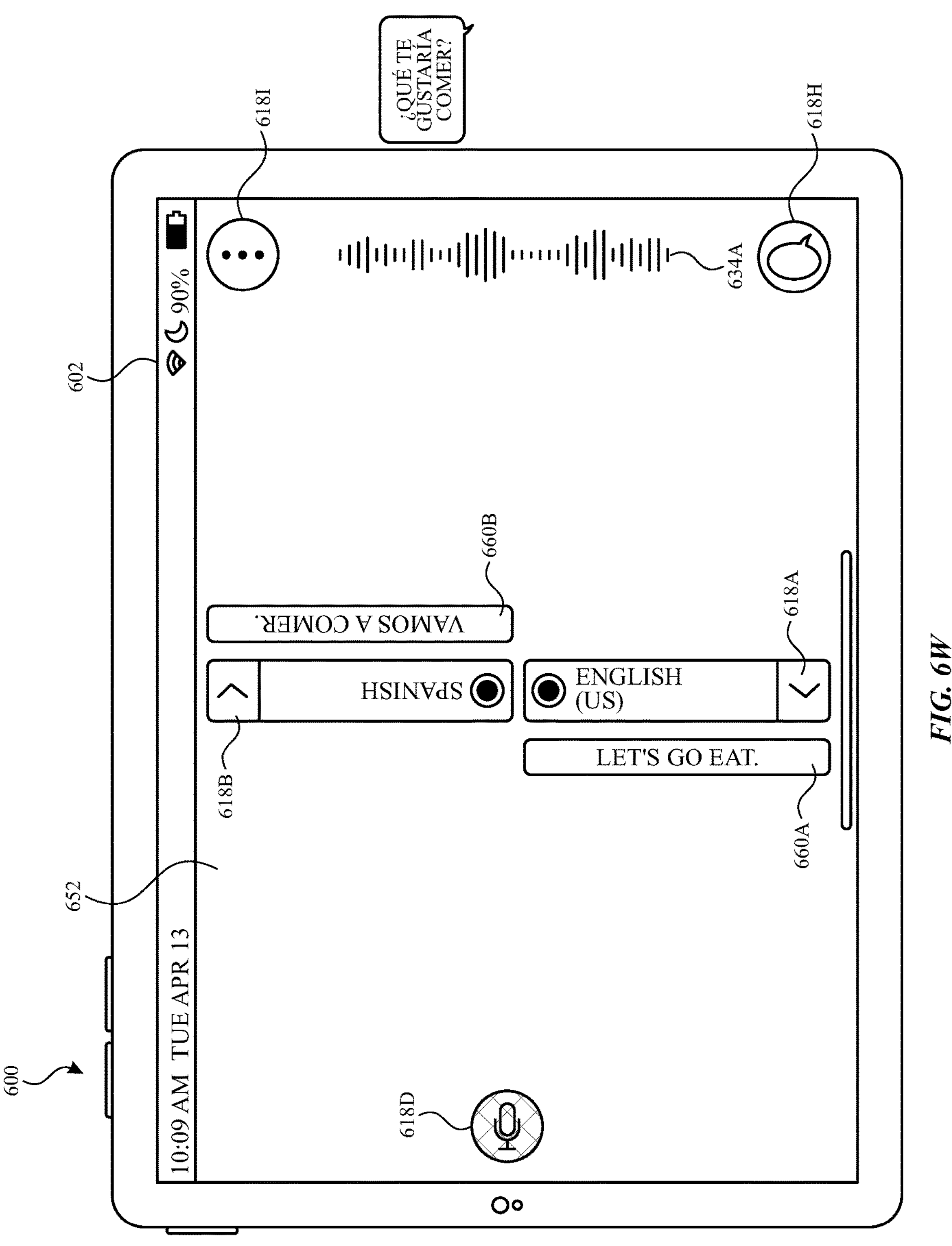

At FIG. 6W, in response to user input 662, electronic device 600 enters the listening mode and displays indication 634A. While in the listening mode, electronic device 600 receives audio input of a user saying "¿Quë to gustaria comer?"

Figure 6X:
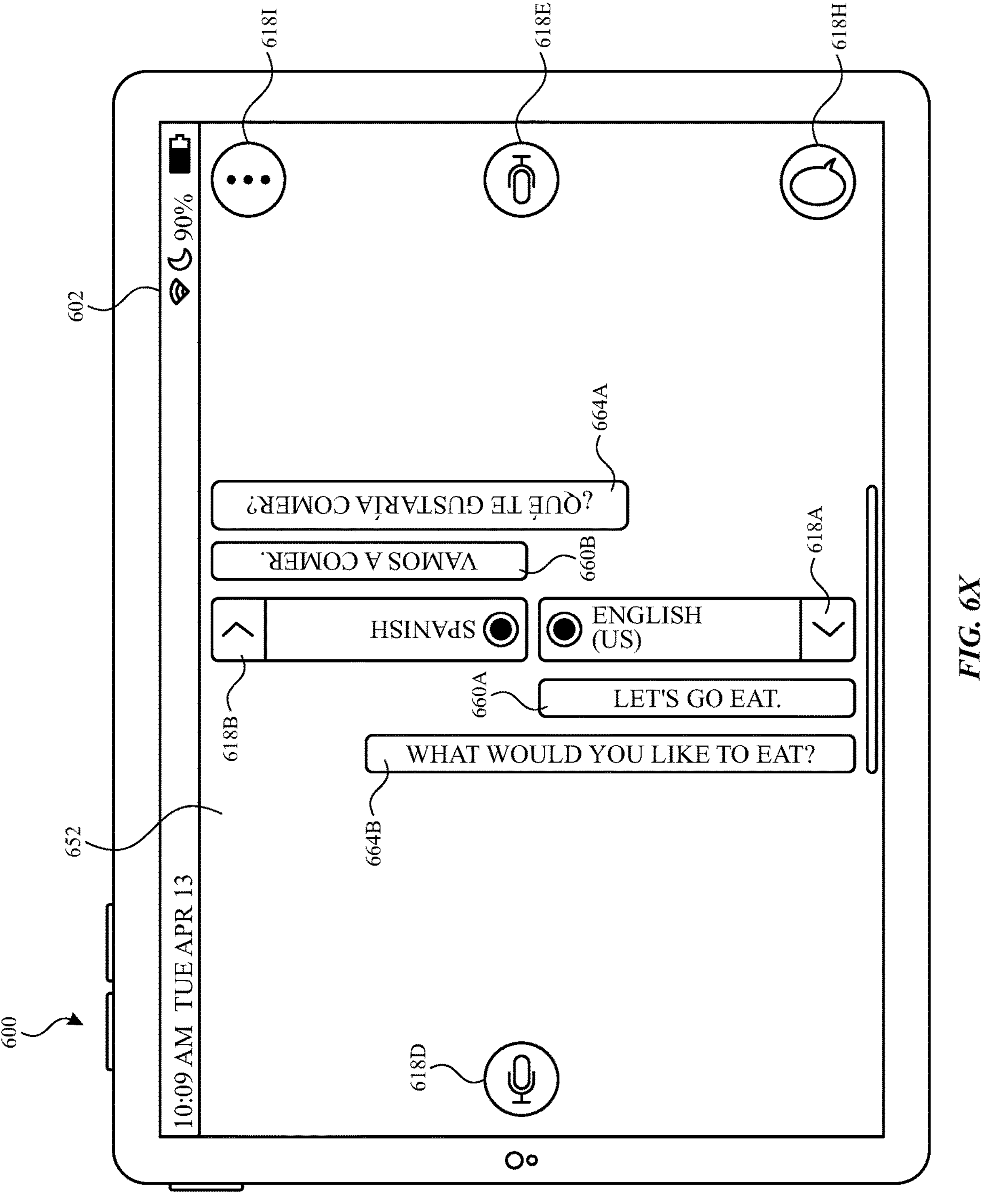

At FIG. 6X, in response to receiving the audio input, electronic device 600 determines that the audio input is in the second language, and displays transcription 664A in the second language in the second orientation in the second region, and also displays translation 664B corresponding to transcription 664A in the first language in the first orientation in the first region.

Figure 6Y:
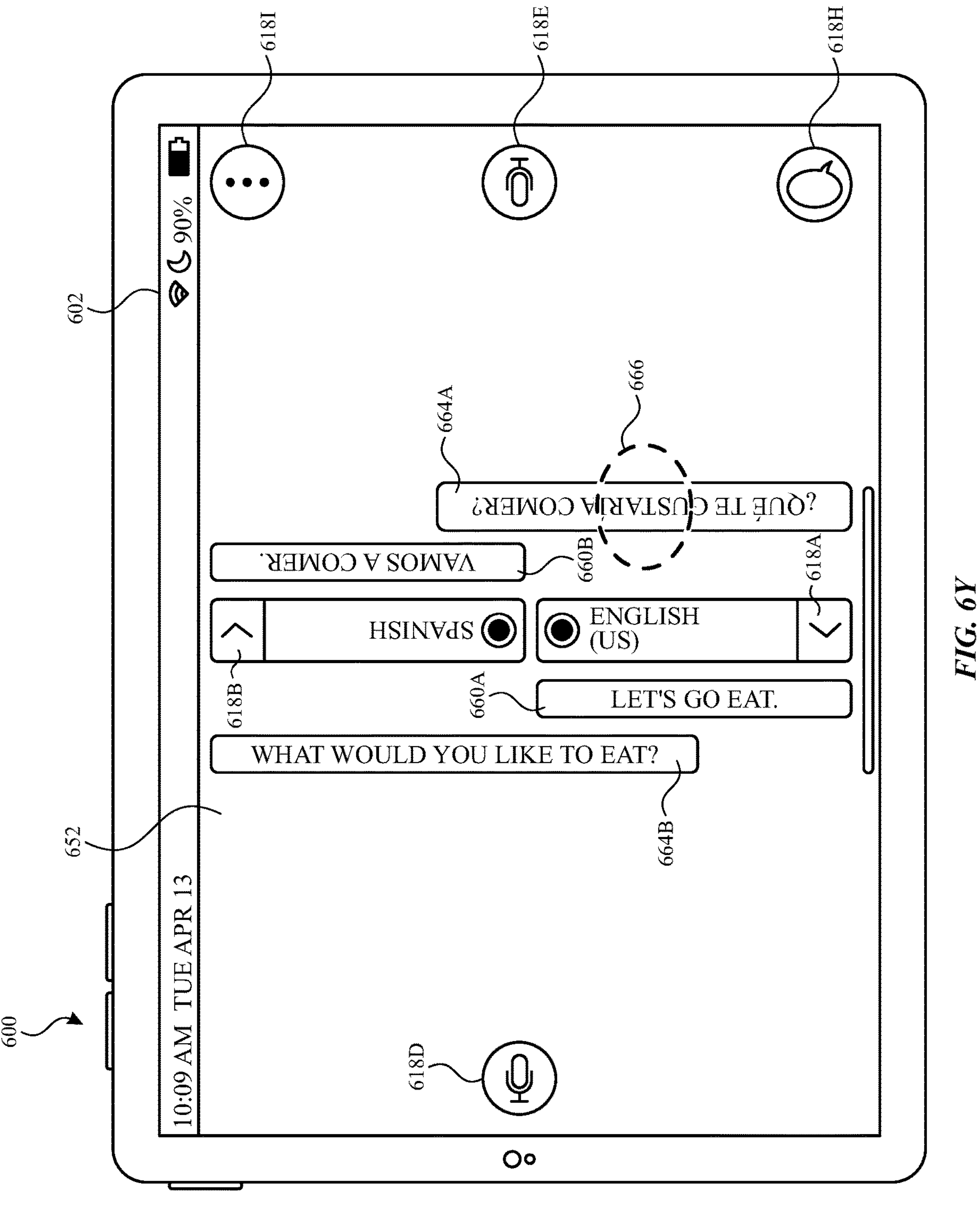

FIG. 6Y displays an alternative embodiment of FIG. 6X. In FIG. 6X, transcriptions and translations in the second language are displayed in the second region aligned to the top, and transcriptions and translations in the first language are all displayed in the first region aligned to the bottom. In the embodiment shown in FIG. 6Y, transcriptions and translations are distinguished by aligning transcriptions to one side, and translations to the other side, while still maintaining separate regions for the first language and the second language. For example, in FIG. 6Y, transcription 660A in the first language is displayed in the first region (e.g., the left region) aligned to the bottom, and translation 664B in the first language is also displayed in the first region, but aligned to the top. Similarly, in FIG. 6Y, translation 660B in the second language is displayed in the second region (e.g., the right region) and aligned to the top, and transcription 664A is also displayed in the second region, but aligned to the bottom. In this way, users can distinguish between which statements in the first region and/or the second region are transcriptions and which statements are translations. At FIG. 6Y, electronic device 600 detects user input 666 corresponding to selection of transcription 664A.

Figure 6Z:
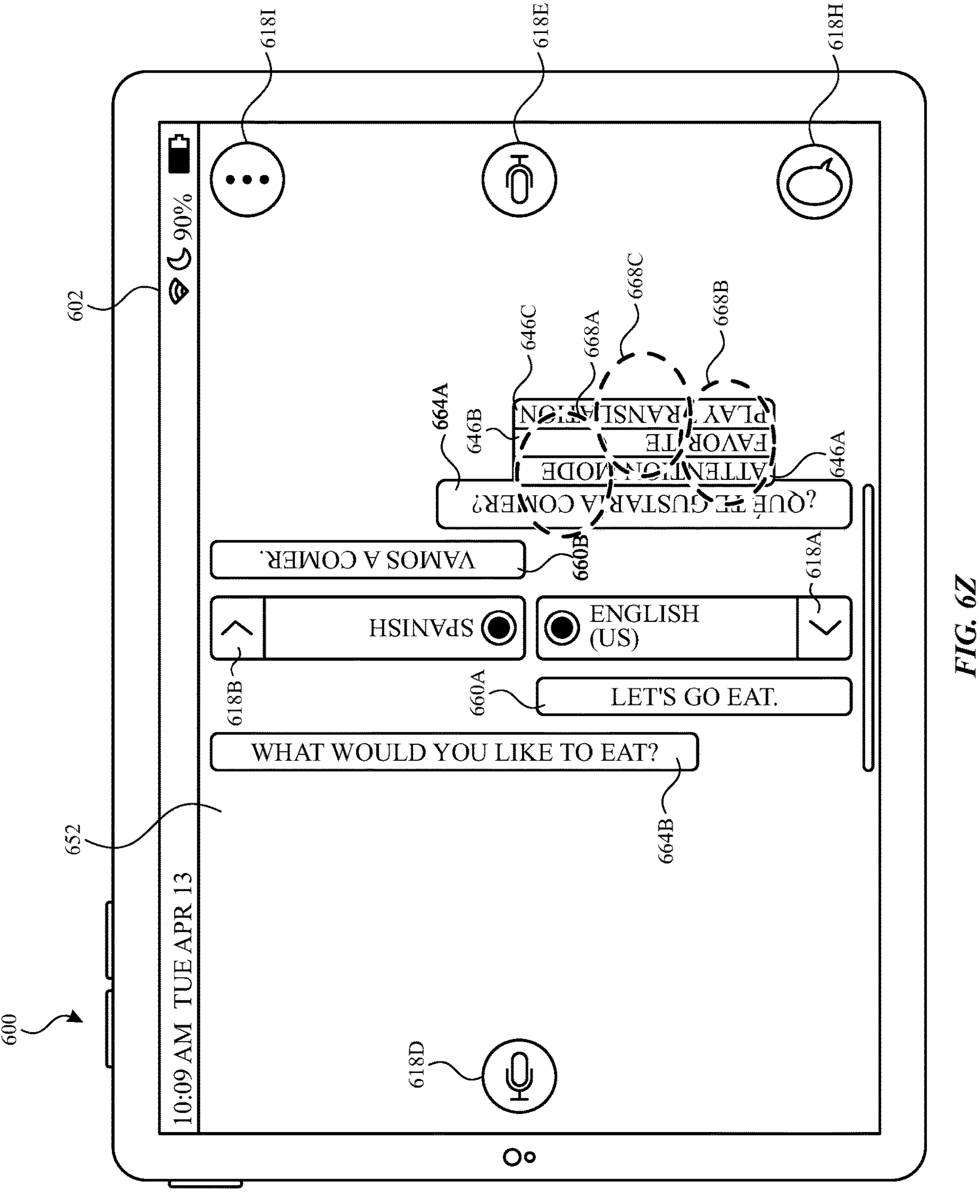
Figure 6A:
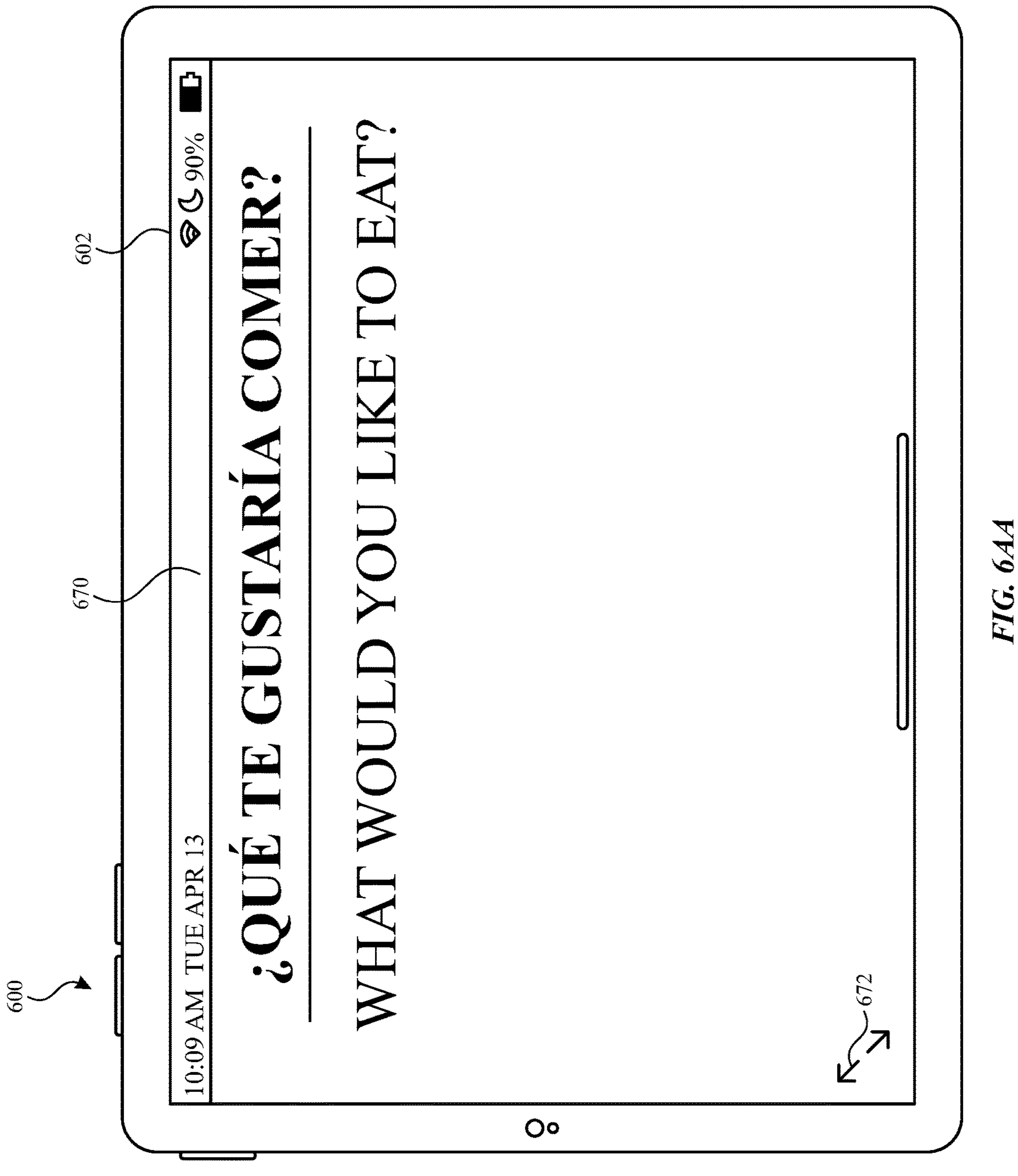
Figure 6A:
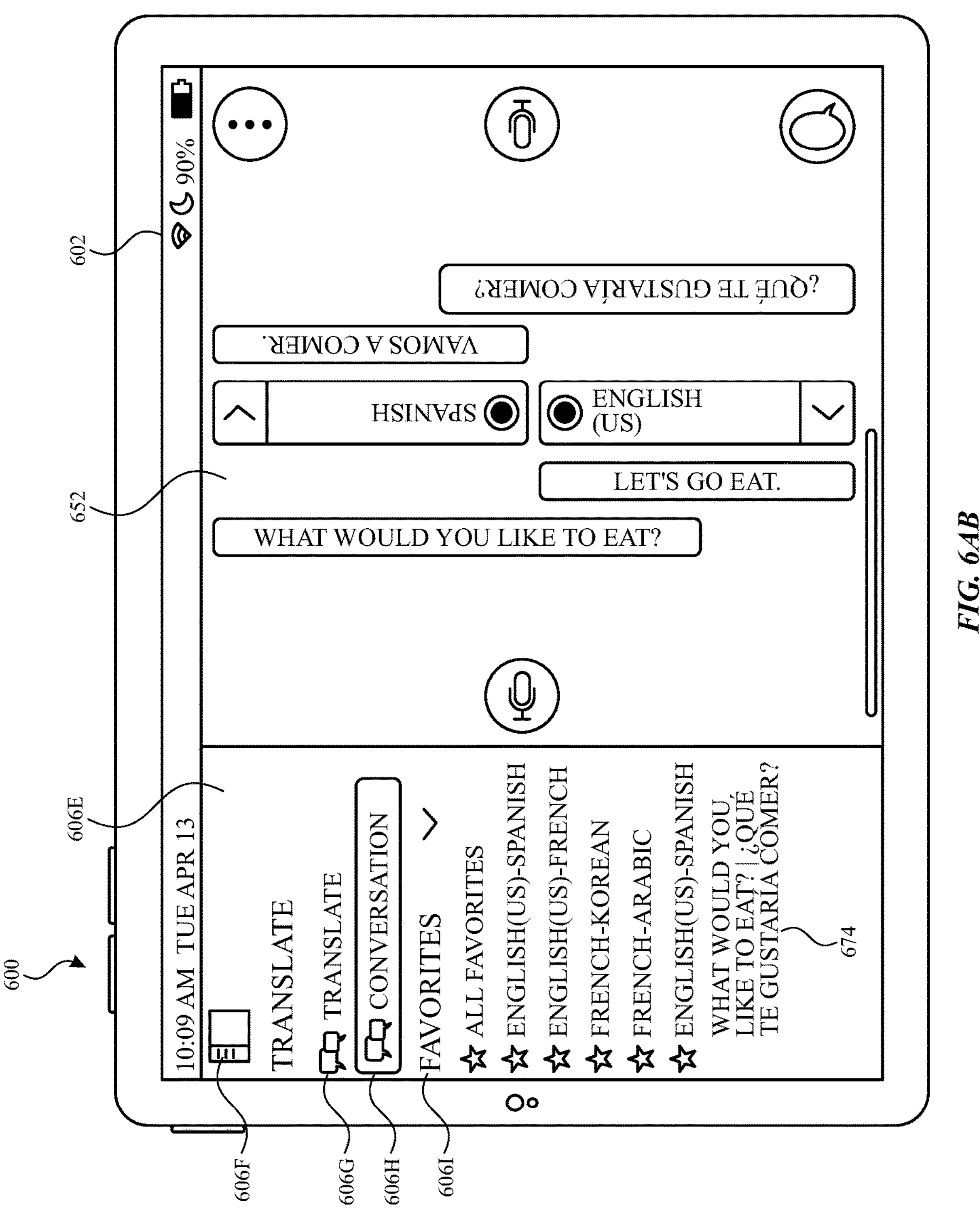
Figure 6A:
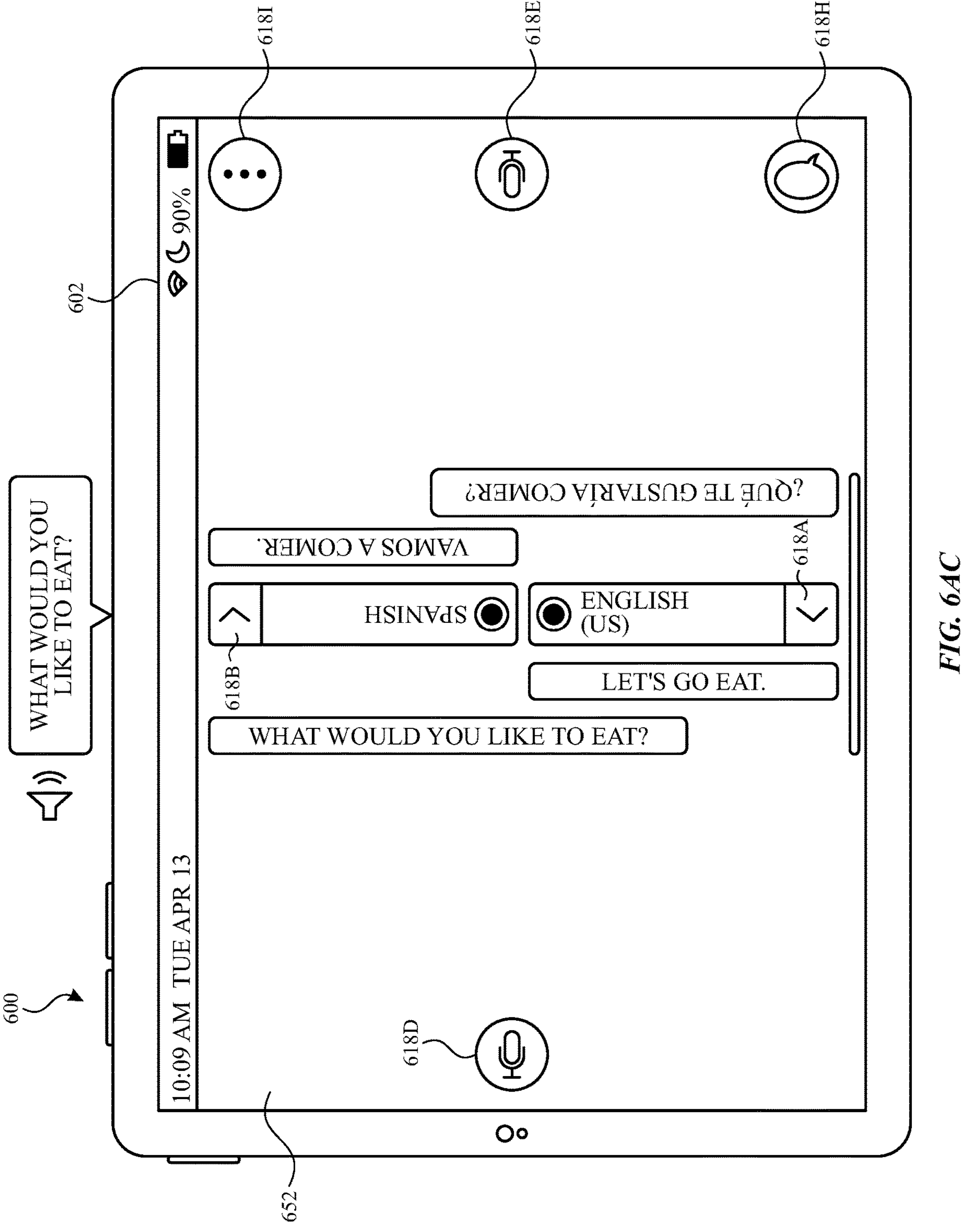

At FIG. 6Z, in response to user input 666, electronic device 600 displays options 646A, 646B, and 646C. At FIG.

6Z, electronic device detects user input 668A corresponding to selection of option 646A, user input 668B corresponding to selection of option 646B, and user input 668C corresponding to selection of option 646C. Each of these user inputs will be discussed in turn below.

At FIG. 6AA, in response to user input 668A of FIG. 6Z corresponding to selection of option 646A, electronic device 600 displays transcription 664A in the second language and corresponding translation 664B in the first language in attention mode user interface 670. Attention mode user interface 670 also includes option 672 that is selectable to return to face-to-face conversation user interface 652.

At FIG. 6AB, in response to user input 668B of FIG. 6Z corresponding to selection of option 646B, electronic device 600 adds representation 674 of transcription/translation pair 664A/664B to a set of favorite translations (e.g., as shown in favorites section 6061 of navigation panel 606E).

At FIG. 6AC, in response to user input 668C of FIG. 6Z corresponding to selection of option 646C, electronic device 600 output an audio output (e.g., via one or more speakers) of translation 664B corresponding to transcription 664A.

FIG. 7A is a flow diagram illustrating a method for displaying translated content using a computer system in accordance with some embodiments. Method 700 is performed at a computer system (e.g., 100, 300, or 500) (e.g., a smart phone, a laptop computer, and/or a tablet) that is in communication with a display generation component (e.g., a display controller; a touch-sensitive display system; and/or a display (e.g., integrated and/or connected)) and one or more input devices (e.g., a touch-sensitive surface (e.g., a touch-sensitive display); a mouse; a keyboard; a camera; and/or a microphone). Some operations in method 700 are, optionally, combined, the orders of some operations are, optionally, changed, and some operations are, optionally, omitted.

As described below, method 700 provides an intuitive way for displaying translated content. The method reduces the cognitive burden on a user for displaying translated content, thereby creating a more efficient human-machine interface. For battery-operated computing devices, enabling a user to display translated content faster and more efficiently conserves power and increases the time between battery charges.

The computer system displays (702), via the display generation component, a translation user interface (e.g., 616), wherein a first region of the translation user interface corresponds to a first language (e.g., left side of user interface 616) and a second region of the translation user interface different from the first region corresponds to a second language different from the first language (e.g., right side of user interface 616). In some embodiments, the first region and the second region are non-overlapping regions. In some embodiments, the first region is a left side or a right side of the translation user interface and the second region is the other of the left or the right side of the translation user interface. In some embodiments, the first region includes a plurality of transcription/translation pairs corresponding to previous inputs received in the first language. In some embodiments, the second region includes a plurality of transcription/translation pairs corresponding to previous inputs received in the second language. In some embodiments, transcription/translation pairs are visually separated (e.g., there is a horizontal boundary between them) (e.g., with the transcription on top/above the translation and the translation on bottom/below the transcription). In some embodiments, transcription/translation pairs are displayed in a sub-region of its respective region (e.g., surrounded by a boundary). In some embodiments, each region (e.g., the first region and/or the second region) includes an indication/selectable element that indicates the language associated with that region and/or allows a user to select and/or change the language associated with the respective region.

While displaying the translation user interface (e.g., 616) (704), the computer system receives (706), via the one or more input devices, an input (e.g., audio inputs in FIG. 6K, 6L, or 6M) (e.g., an audio input, a text input, a written input, a touch input, and/or a different input) (e.g., an input comprising one or more words (e.g., spoken words, typed words, textual words, and/or written words)). In response (708) to receiving the input: in accordance with a determination that the input is in the first language (710), the computer system concurrently displays (712), via the display generation component, in the first region of the translation user interface: a transcription of the input in the first language (e.g., 636A, 640A), and a translation of the input in the second language (e.g., 636B, 640B). In some embodiments, the transcription of the input in the first language and the translation of the input in the second language are concurrently displayed in the first region of the translation user interface without displaying the transcription of the input in the first language or the translation of the input in the second language in the second region of the translation user interface. In some embodiments, each transcription/translation pair is visually separated (e.g., there is a horizontal boundary between them) (e.g., with the transcription on top/above the translation and the translation on bottom/below the transcription). In some embodiments, each transcription/translation pair is displayed in a sub-region of its respective region (e.g., each transcription/translation pair is surrounded by a boundary corresponding uniquely to the transcription/translation pair).

In response (708) to receiving the input: in accordance with a determination that the input is in the second language (714), the computer system concurrently displays (716), via the display generation component, in the second region of the translation user interface: a transcription of the input in the second language (e.g., 638A), and a translation of the input in the first language (e.g., 638B). In some embodiments, the transcription of the input in the second language and the translation of the input in the first language are concurrently displayed in the second region of the translation user interface without displaying the transcription of the input in the second language or the translation of the input in the first language in the first region of the translation user interface. In some embodiments, each transcription/translation pair is visually separated (e.g., there is a horizontal boundary between them) (e.g., with the transcription on top/above the translation and the translation on bottom/below the transcription). In some embodiments, each transcription/translation pair is displayed in a sub-region of its respective region (e.g., each transcription/translation pair is surrounded by a boundary corresponding uniquely to the transcription/translation pair). Displaying a transcription of the input in the first language and a translation of the input in the second language in the first region of the translation user interface in accordance with a determination that the input is in the first language provides the user with feedback about the current state of the device (e.g., that the device has determined that the input is in the first language). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the input is an audio input (e.g., audio inputs in FIGS. 6K, 6L, and/or 6M). In some embodiments, the translation user interface (e.g., 616) comprises an audio input selectable object (e.g., 618J) that is selectable to engage or disengage a listening mode of the computer system (e.g., 600), wherein when the listening mode of the computer system is engaged, the computer system is configured to receive an audio input, and when the listening mode of the computer system is disengaged, the computer system is not configured to receive an audio input. In some embodiments, engaging the listening mode of the computer system includes activating one or more microphones of the computer system to receive an audio input) (in some embodiments, when the listening mode of the computer system is engaged, the translation user interface displays an indication that the listening mode of the computer system is engaged. In some embodiments, when the listening mode of the computer system is disengaged, the translation user interface includes the audio input selectable object; and when the listening mode of the computer system is engaged, the translation user interface does not include the audio input selectable object). In some embodiments, while displaying the translation user interface and the listening mode of the computer system is disengaged, and prior to receiving the audio input, the computer system detects, via the one or more input devices, one or more user inputs (e.g., 632) corresponding to selection of the audio input selectable object (e.g., 618J). In some embodiments, in response to detecting the one or more user inputs corresponding to selection of the audio input selectable object, the computer system engages the listening mode of the computer system (e.g., activating one or more microphones of the computer system to receive an audio input) (in some embodiments, displaying, within the translation user interface, an indication that the listening mode of the computer system is engaged), wherein receiving the audio input is performed while the listening mode of the computer system is engaged. Displaying an audio input selectable object that is selectable to engage a listening mode of the computer system enables a user to quickly and easily enable the listening mode of the computer system. Otherwise, additional inputs would be required to enable the listening mode of the computer system. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after receiving the audio input (e.g., audio inputs in FIGS. 6K, 6L, 6M) (and, optionally, after displaying the transcription of the input in the first language or the second language and the translation of the input in the second language or the first language): in accordance with a determination that a continuous listening setting (e.g., 628B) is enabled, the computer system (e.g., 600) maintains the listening mode of the computer system in the engaged state until one or more user inputs (e.g., 642) (e.g., one or more tap inputs and/or non-tap inputs) (e.g., one or more touchscreen inputs) are received indicative of a request to disengage the listening mode of the computer system; and in accordance with a determination that the continuous listening setting (e.g., 628D) is disabled, the computer system automatically disengages the listening mode of the computer system after receiving the audio input (e.g., without further user input) (e.g., based on a determination that the audio input is completed (e.g., based on a determination that a threshold period of time has passed without receiving any audio input and/or based on a determination that a threshold period of time has passed without receiving intelligible, detectable, and/or transcribable audio input)). Automatically maintaining the listening mode of the computer system in the engaged state if the continuous listening setting is enabled allows a user to provide audio inputs without requiring additional input (e.g., additional touchscreen input). Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the input is an audio input (e.g., audio inputs in FIG. 6K, 6L, or 6M), and displaying the translation user interface (e.g., 616) comprises: in accordance with a determination that an automatic language detection setting (e.g., 628C) is disabled, concurrently displaying: a first audio input selectable object (e.g., 618D) corresponding to the first language that is selectable to engage a first language listening mode of the computer system in which the computer system is configured to receive an audio input in the first language (e.g., is configured to transcribe an audio input in the first language) (in some embodiments, when the first language listening mode of the computer system is engaged, the computer system is not configured to receive an audio input in any language other than the first language (e.g., is not configured to transcribe an audio input in any language other than the first language)); and a second audio input selectable object (e.g., 618E) corresponding to the second language that is selectable to engage a second language listening mode of the computer system in which the computer system is configured to receive an audio input in the second language (e.g., is configured to transcribe an audio input in the second language). In some embodiments, when the second language listening mode of the computer system is engaged, the computer system is not configured to receive an audio input in any language other than the second language (e.g., not configured to transcribe an audio input in any language other than the second language).

In some embodiments, the input is an audio input (e.g., audio inputs in FIGS. 6K, 6L, and/or 6M), and displaying the translation user interface (e.g., 616) comprises: in accordance with a determination that the automatic language detection setting (e.g., 628C) is enabled, displaying a single audio input selectable object (e.g., 618J) (e.g., without displaying a second audio input selectable object) that is selectable to engage a general listening mode of the computer system in which the computer system is configured to receive an audio input in a plurality of languages (e.g., is configured to transcribe audio inputs in the plurality of languages).

In some embodiments, engaging the first language listening mode, the second language listening mode, and/or the general listening mode of the computer system includes activating one or more microphones of the computer system to receive an audio input. In some embodiments, when a listening mode of the computer system (e.g., the first language listening mode, the second language listening mode, and/or the general listening mode) is engaged, the translation user interface displays an indication that a listening mode of the computer system is engaged.

In some embodiments, when a listening mode of the computer system (e.g., the first language listening mode, the second language listening mode, and/or the general listening mode) is disengaged, the translation user interface includes one or more audio input selectable objects; and when a listening mode of the computer system is engaged, the translation user interface does not include any audio input selectable objects.

In some embodiments, when the first language listening mode of the computer system is disengaged, the translation user interface includes the first audio input selectable object, and when the first language listening mode of the computer system is engaged, the translation user interface does not include the first audio input selectable object. In some embodiments, when the second language listening mode of the computer system is disengaged, the translation user interface includes the second audio input selectable object, and when the second language listening mode of the computer system is engaged, the translation user interface does not include the second audio input selectable object. In some embodiments, when the general listening mode of the computer system is disengaged, the translation user interface includes the single audio input selectable object, and when the general listening mode of the computer system is engaged, the translation user interface does not include the single audio input selectable object.

Displaying two audio input selectable objects if the automatic language detection setting is disabled, and displaying a single audio input selectable object if the automatic language detecting setting is enabled, provides the user with feedback about the current state of the device (e.g., whether the automatic language detecting setting is enabled or disabled). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, when the automatic language detection setting (e.g., 628C) is enabled and the general listening mode of the computer system is engaged (e.g., FIGS. 6K-6N), the computer system (e.g., 600) is configured to receive an audio input in the first language and/or in the second language (e.g., in some embodiments, when the general listening mode of the computer system is engaged, the computer system is configured to receive an audio input, automatically determine whether the audio input is in the first language or the second language, and transcribe the audio input based on the determination of whether the audio input is in the first language or the second language). Providing an automatic language detecting setting allows a user to provide audio inputs in a plurality of languages without requiring additional user inputs. Otherwise, additional user inputs would be required to switch between different languages. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the translation of the input in the second language (e.g., 636B, 640B), the computer system detects, via the one or more input devices, one or more user inputs (e.g., 644) (e.g., one or more tap inputs and/or one or more non-tap inputs) corresponding to selection of the translation of the input in the second language. In some embodiments, in response to detecting the one or more user inputs corresponding to selection of the translation of the input in the second language, the computer system displays, via the display generation component, one or more selectable options (e.g., 646A, 646B, 646C) pertaining to the translation of the input in the second language. In some embodiments, the one or more selectable options includes an attention mode option that is selectable to cause display of the translation of the input in the second language at a larger size (e.g., in a full-screen user interface). In some embodiments, the one or more selectable options includes a favorite option that is selectable to cause the translation of the input in the second language to be added to a set of favorite translations. In some embodiments, the one or more selectable options includes a play option that is selectable to cause an audio output corresponding to the translation of the input in the second language (e.g., cause the computer system to output an audio output in which the translation of the input in the second language is read aloud). Displaying the one or more options pertaining to the translation of the input in the second language allows a user to quickly and easily take one or more actions with respect to the translation of the input in the second language with fewer inputs. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to receiving the input: in accordance with a determination that the input is in the first language and in accordance with a determination that an autoplay setting (e.g., 628A) is enabled, the computer system (e.g., 600) outputs an audio output of the translation of the input in the second language (e.g., 636B, 640B) (e.g., in response to receiving the input and without further user input). In some embodiments, in response to receiving the input: in accordance with a determination that the input is in the first language and in accordance with a determination that the autoplay setting (e.g., 628A) is disabled, the computer system (e.g., 600) foregoes outputting the audio output of the translation of the input in the second language. Automatically outputting an audio output of the translation of the input in the second language allows a user to hear the audio output of the translation without further user inputs. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 600) displays, via the display generation component, a display mode option (e.g., 618H) that is selectable to initiate a process for switching the translation user interface between a first display mode (e.g., side-by-side conversation user interface 616) and a second display mode (e.g., face-to-face conversation user interface 652). In some embodiments, in the first display mode (e.g., a side-by-side display mode): the first region of the translation user interface (e.g., 616) displays transcriptions in the first language and translations in the second language in a first orientation, and the second region of the translation user interface displays transcriptions in the second language and translations in the first language in the first orientation. In some embodiments, in the second display mode (e.g., a face-to-face display mode): a third region of the translation user interface (e.g., 652) (e.g., different from and/or the same as the first region and/or the second region) displays transcriptions in the first language (e.g., 660A) and translations in the first language in a second orientation (e.g., 664B) (e.g., different from the first orientation or the same as the first orientation); and a fourth region of the translation user interface (e.g., 652) (e.g., different from and/or the same as the first region and/or the second region), different from the third region, displays transcriptions in the second language (e.g., 664A) and translations in the second language (e.g., 660B) in a third orientation different from the second orientation (e.g., upside down relative to the second orientation). Providing a display mode option allows a user to quickly and easily switch between the first display mode and the second display mode with fewer inputs. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the input is a text input (e.g., 618G) (e.g., an input received via a keyboard (e.g., a physical keyboard and/or a virtual keyboard)). Providing an option for a user to provide a text input may be preferable and/or easier in certain circumstances, and allows a user to provide an input with fewer inputs. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the input is a handwriting input (e.g., 618F) (e.g., an input that comprises one or more handwritten letters). Providing an option for a user to provide a handwriting input may be preferable and/or easier in certain circumstances, and allows a user to provide an input with fewer inputs. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 700 (e.g., FIG. 7A) are also applicable in an analogous manner to the methods described below. For example, methods 750 and 900 optionally include one or more of the characteristics of the various methods described above with reference to method 700. For example, the various features recited in methods 700, 750, and 900 can be incorporated into a translation application. For brevity, these details are not repeated below.

FIG. 7B is a flow diagram illustrating a method for displaying translated content using a computer system in accordance with some embodiments. Method 750 is performed at a computer system (e.g., 100, 300, 500) (e.g., a smart phone, a laptop computer, and/or a tablet) that is in communication with a display generation component (e.g., a display controller; a touch-sensitive display system; and/or a display (e.g., integrated and/or connected)) and one or more input devices (e.g., a touch-sensitive surface (e.g., a touch-sensitive display); a mouse; a keyboard; a camera; and/or a microphone). Some operations in method 750 are, optionally, combined, the orders of some operations are, optionally, changed, and some operations are, optionally, omitted.

As described below, method 750 provides an intuitive way for displaying translated content. The method reduces the cognitive burden on a user for displaying translated content, thereby creating a more efficient human-machine interface. For battery-operated computing devices, enabling a user to display translated content faster and more efficiently conserves power and increases the time between battery charges.

The computer system (e.g., 600) displays (752), via the display generation component, a translation user interface (e.g., 652), wherein a first region of the translation user interface corresponds to a first language (e.g., a left portion of user interface 652 in FIG. 6R) and a second region of the translation user interface different from the first region corresponds to a second language different from the first language (e.g., a right portion of user interface 652 in FIG. 6R). In some embodiments, the first region and the second region are non-overlapping regions. In some embodiments, the first region is a left side or a right side of the translation user interface and the second region is the other of the left or the right side of the translation user interface. In some embodiments, the first region is a top portion or a bottom portion of the translation user interface and the second region is the other of the top portion or the bottom portion of the translation user interface. In some embodiments, the first region includes a plurality of transcriptions and/or translations corresponding to previous transcriptions and/or translations in the first language. In some embodiments, the second region includes a plurality of transcriptions and/or translations corresponding to previous transcriptions and/or translations in the second language. In some embodiments, each transcription in the first region has a corresponding translation in the second region (e.g., without displaying a corresponding translation in the first region), and each transcription in the second region has a corresponding translation in the first region (e.g., without displaying a corresponding translation in the second region).

While displaying (754) the translation user interface (e.g., 652), the computer system (e.g., 600) receives (756), via the one or more input devices, an input (e.g., audio inputs in FIGS. 6U, 6W) (e.g., an audio input, a text input, a written input, a touch input, and/or a different input) (e.g., an input comprising one or more words (e.g., spoken words, typed words, textual words, and/or written words)). In response (758) to receiving the input and in accordance with a determination (760) that the input is in the first language (e.g., FIG. 6U), the computer system concurrently displays (762), via the display generation component: a transcription of the input in the first language (e.g., 660A) in the first region (and, optionally, without displaying a translation of the input in the second language in the first region), wherein the transcription of the input in the first language is displayed in the first region in a first orientation, and a translation of the input in the second language (e.g., 660B) in the second region (and, optionally, without displaying a transcription of the input in the first language in the second region), wherein the translation of the input in the second language is displayed in the second region in a second orientation different from the first orientation (e.g., a second orientation opposite to the first orientation and/or a second orientation that is upside-down relative to the first orientation). In response (758) to receiving the input and in accordance with (764) a determination that the input is in the second language (e.g., FIG. 6W), the computer system concurrently displays (766), via the display generation component: a transcription of the input in the second language (e.g., 664A) in the second region (and, optionally, without displaying a translation of the input in the first language in the second region), wherein the transcription of the input in the second language is displayed in the second region in the second orientation, and a translation of the input in the first language (e.g., 664B) in the first region (and, optionally, without displaying a transcription of the input in the second language in the first region), wherein the translation of the input in the first language is displayed in the first region in the first orientation. In some embodiments, the first region includes a first sub-region that is associated with transcriptions in the first language and a second sub-region different from the first sub-region that is associated with translations in the first language, and the second region includes a third sub-region (e.g., different from the first and second sub-regions) that is associated with transcriptions in the second language and a fourth sub-region (e.g., different from the first, second, and third sub-regions) that is associated with translations in the second language. In some embodiments, the transcription of the input in the first language is displayed in the first sub-region, and the translation of the input in the second language is displayed in the fourth sub-region. In some embodiments, the transcription of the input in the second language is displayed in the third sub-region, and the translation of the input in the first language is displayed in the second sub-region.

In some embodiments, the input is an audio input (e.g., audio inputs in FIGS. 6U, 6W) and the translation user interface (e.g., 652) comprises an audio input selectable object (e.g., 618D, 618E) that is selectable to engage a listening mode of the computer system, wherein when the listening mode of the computer system is engaged, the computer system is configured to receive an audio input, and when the listening mode of the computer system is disengaged, the computer system is not configured to receive an audio input (in some embodiments, engaging the listening mode of the computer system includes activating one or more microphones of the computer system to receive an audio input) (in some embodiments, when the listening mode of the computer system is engaged, the translation user interface displays an indication that the listening mode of the computer system is engaged) (in some embodiments, when the listening mode of the computer system is disengaged, the translation user interface includes the audio input selectable object; and when the listening mode of the computer system is engaged, the translation user interface does not include the audio input selectable object). In some embodiments, while displaying the translation user interface (e.g., 652) and the listening mode of the computer system is disengaged, and prior to receiving the audio input, the computer system detects, via the one or more input devices, one or more user inputs (e.g., 658, 662) corresponding to selection of the audio input selectable object (e.g., 618D, 618E). In some embodiments, in response to detecting the one or more user inputs corresponding to selection of the audio input selectable object, the computer system engages the listening mode of the computer system (e.g., activating one or more microphones of the computer system to receive an audio input) (in some embodiments, displaying, within the translation user interface, an indication that the listening mode of the computer system is engaged), wherein receiving the audio input is performed while the listening mode of the computer system is engaged. Displaying an audio input selectable object that is selectable to engage a listening mode of the computer system enables a user to quickly and easily enable the listening mode of the computer system. Otherwise, additional inputs would be required to enable the listening mode of the computer system. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after receiving the audio input (and, optionally, after displaying the transcription of the input in the first language or the second language and the translation of the input in the second language or the first language): in accordance with a determination that a continuous listening setting (e.g., 628B) is enabled, the computer system maintains the listening mode of the computer system in the engaged state until one or more user inputs (e.g., 642) (e.g., one or more tap inputs and/or non-tap inputs) (e.g., one or more touchscreen inputs) are received indicative of a request to disengage the listening mode of the computer system; and in accordance with a determination that the continuous listening setting (e.g., 628B) is disabled, the computer system automatically disengages the listening mode of the computer system after receiving the audio input (e.g., FIGS. 6U-6X) (e.g., without further user input) (e.g., based on a determination that the audio input is completed (e.g., based on a determination that a threshold period of time has passed without receiving any audio input and/or based on a determination that a threshold period of time has passed without receiving intelligible, detectable, and/or transcribable audio input)). Automatically maintaining the listening mode of the computer system in the engaged state if the continuous listening setting is enabled allows a user to provide audio inputs without requiring additional input (e.g., additional touchscreen input). Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to receiving the audio input, the computer system (e.g., 600) determines (e.g., automatically, without further user input) whether the audio input is in the first language or in the second language. Automatically determining whether the audio input is in the first language or in the second language allows a user to provide audio inputs in a plurality of languages without requiring additional user inputs. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the translation of the input in the second language (e.g., 640B, 660B, 664B), the computer system detects, via the one or more input devices, one or more user inputs (e.g., 644, 666) (e.g., one or more tap inputs and/or one or more non-tap inputs) corresponding to selection of the translation of the input in the second language. In some embodiments, in response to detecting the one or more user inputs corresponding to selection of the translation of the input in the second language, the computer system displays, via the display generation component, one or more selectable options (e.g., 646A, 646B, 646C) pertaining to the translation of the input in the second language. In some embodiments, the one or more selectable options includes an attention mode option that is selectable to cause display of the translation of the input in the second language at a larger size (e.g., in a full-screen user interface). In some embodiments, the one or more selectable options includes a favorite option that is selectable to cause the translation of the input in the second language to be added to a set of favorite translations. In some embodiments, the one or more selectable options includes a play option that is selectable to cause an audio output corresponding to the translation of the input in the second language (e.g., cause the computer system to output an audio output in which the translation of the input in the second language is read aloud). Displaying the one or more options pertaining to the translation of the input in the second language allows a user to quickly and easily take one or more actions with respect to the translation of the input in the second language with fewer inputs. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to receiving the input: in accordance with a determination that the input is in the first language and in accordance with a determination that an autoplay setting (e.g., 628A) is enabled, the computer system (e.g., 600) outputs an audio output of the translation of the input in the second language (e.g., in response to receiving the input and without further user input); and in accordance with a determination that the input is in the first language and in accordance with a determination that the autoplay setting (e.g., 628A) is disabled, the computer system foregoes outputting the audio output of the translation of the input in the second language. Automatically outputting an audio output of the translation of the input in the second language allows a user to hear the audio output of the translation without further user inputs. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system displays, via the display generation component, a display mode option (e.g., 618H) that is selectable to initiate a process for switching the translation user interface between a first display mode (e.g., face-to-face conversation user interface 652) and a second display mode (e.g., side-by-side conversation user interface 616). In some embodiments, in the first display mode (e.g., a face-to-face display mode): the first region of the translation user interface (e.g., 652) (e.g., different from and/or the same as the first region and/or the second region) displays transcriptions in the first language (e.g., 660A) and translations in the first language (e.g., 664B) in the first orientation; and the second region of the translation user interface (e.g., 652) displays transcriptions in the second language (e.g., 664A) and translations in the second language (e.g., 660B) in the second orientation different from the first orientation (e.g., upside-down relative to the first orientation). In some embodiments, in the second display mode (e.g., a side-by-side display mode): a third region of the translation user interface (e.g., 616) (e.g., different from the first and/or second region and/or the same as the first and/or region) displays transcriptions in the first language (e.g., 636A, 640A) and translations in the second language (e.g., 636B, 640B) in a third orientation (e.g., the same or different from the first orientation and/or the second orientation), and a fourth region of the translation user interface (e.g., 616) different from the third region of the translation user interface (e.g., different from the first and/or second region and/or the same as the first and/or region) displays transcriptions in the second language (e.g., 638A) and translations in the first language (e.g., 638B) in the third orientation. Providing a display mode option allows a user to quickly and easily switch between the first display mode and the second display mode with fewer inputs. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the input is a text input (e.g., 618G) (e.g., an input received via a keyboard (e.g., a physical keyboard and/or a virtual keyboard)). Providing an option for a user to provide a text input may be preferable and/or easier in certain circumstances, and allows a user to provide an input with fewer inputs. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the input is a handwriting input (e.g., 618F) (e.g., an input that comprises one or more handwritten letters). Providing an option for a user to provide a handwriting input may be preferable and/or easier in certain circumstances, and allows a user to provide an input with fewer inputs. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second orientation is upside-down relative to the first orientation (e.g., FIGS. 6V-6Z). Displaying content intended for a first user (e.g., in a first language) in a first orientation, and content intended for a second user (e.g., in a second language) in a second orientation, enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the translation user interface (e.g., 652) comprises concurrently displaying: a first audio input selectable object (e.g., 618D) that is selectable to engage a listening mode of the computer system, wherein the first audio input selectable object is displayed in the first orientation, and further wherein when the listening mode of the computer system is engaged, the computer system is configured to receive an audio input, and when the listening mode of the computer system is disengaged, the computer system is not configured to receive an audio input; and a second audio input selectable object (e.g., 618E) that is selectable to engage the listening mode of the computer system, wherein the second audio input selectable object is displayed in the second orientation. Displaying content intended for a first user (e.g., the first audio input selectable object) in a first orientation, and content intended for a second user (e.g., the second audio input selectable object) in a second orientation, enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, engaging the listening mode of the computer system includes activating one or more microphones of the computer system to receive an audio input. In some embodiments, when the listening mode of the computer system is engaged, the translation user interface displays an indication that the listening mode of the computer system is engaged. In some embodiments, when the listening mode of the computer system is disengaged, the translation user interface includes the audio input selectable object; and when the listening mode of the computer system is engaged, the translation user interface does not include the audio input selectable object.

In some embodiments, displaying the translation user interface (e.g., 652) comprises, concurrently displaying: a first language switcher object (e.g., 618A) that is selectable to initiate a process for changing the first language to a third language (e.g., to a different language selected from a plurality of languages), wherein the first language switcher object is displayed in the first orientation; and a second language switcher object (e.g., 618B) that is selectable to initiate a process for changing the second language to a fourth language (e.g., to a different language selected from a plurality of languages), wherein the second language switcher object is displayed in the second orientation. Displaying content intended for a first user (e.g., the first language switcher object) in a first orientation, and content intended for a second user (e.g., the second language switcher object) in a second orientation, enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 750 (e.g., FIG. 7B) are also applicable in an analogous manner to the methods described above and/or below. For example, methods 700 and 900 optionally include one or more of the characteristics of the various methods described above with reference to method 700. For example, the various features recited in methods 700, 750, and 900 can be incorporated into a translation application. For brevity, these details are not repeated below.

FIGS. 8A-8U illustrate exemplary user interfaces for displaying translated content, in accordance with some embodiments. The user interfaces in these figures are used to illustrate the processes described below, including the processes in FIG. 9.

FIG. 8A depicts electronic device 800, which is a smartphone with touch-sensitive display 802. In some embodiments, electronic device 800 includes one or more features of devices 100, 300, and/or 500. Electronic device 800 depicts user interface 804, which includes a set of text 806. At FIG. 8A, electronic device 800 detects user input 808, which is a drag user input corresponding to selection of a subset of set of text 806.

At FIG. 8B, in response to user input 808, electronic device 800 displays selected text 810, and displays options 812A, 812B, 812C, and 812D. Option 812A is selectable to translate selected text 810 to a different language. Option 812B is selectable to copy selected text 810. Option 812C is selectable to look up a dictionary definition of selected text 810. Option 812D is selectable to share selected text 810 (e.g., with one or more external devices) via one or more communications mediums. In some embodiments, option 812A is displayed in accordance with a determination that a translate-selected-text option is enabled on electronic device 800. In some embodiments, fi the translate-selected-text option is disabled on electronic device 800, electronic device 800 does not display option 812A. At FIG. 8B, electronic device 800 detects user input 814 corresponding to selection of option 812A.

Figures 8C, 8D:
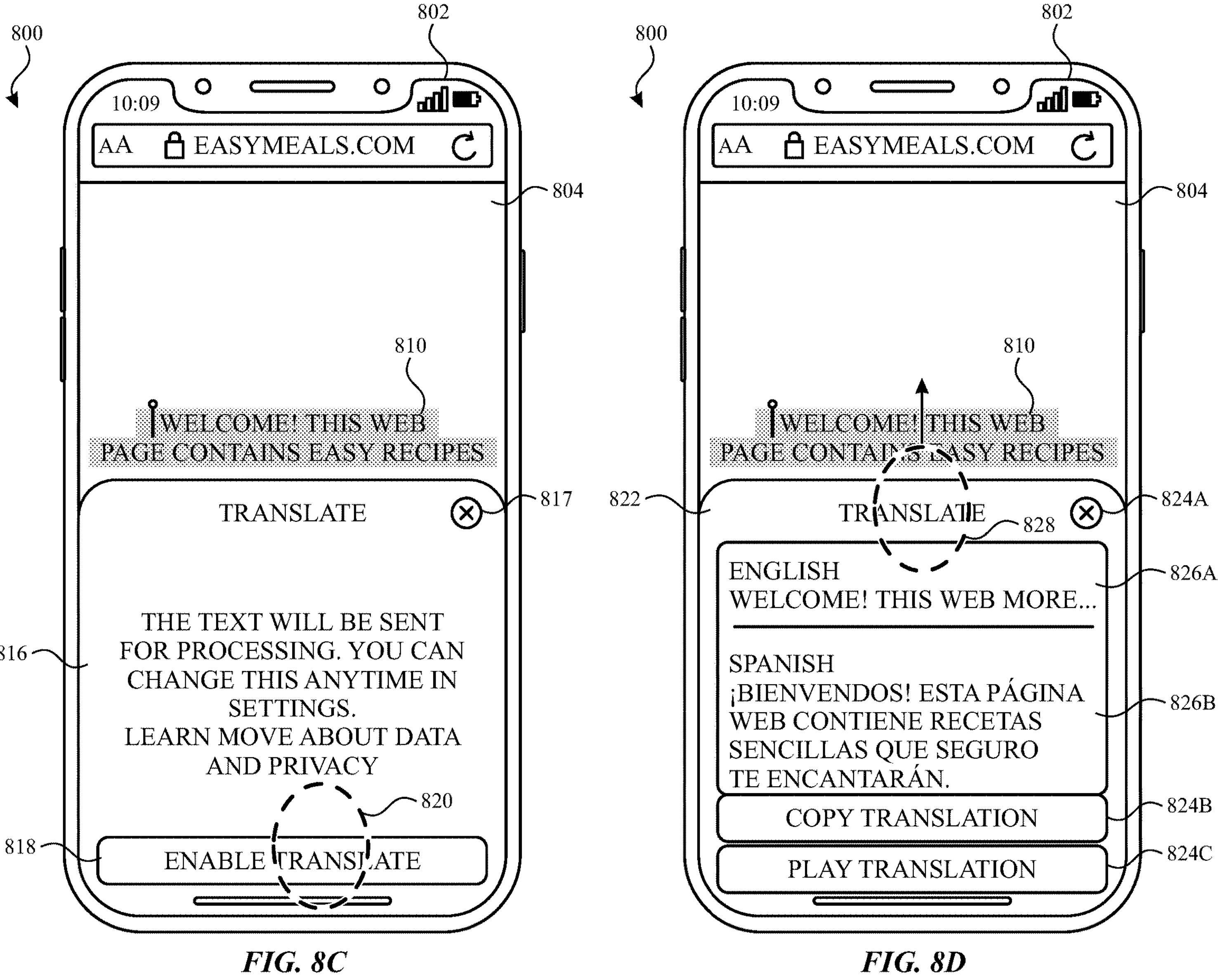

FIG. 8C depicts a first example scenario in response to user input 814. In some embodiments, electronic device 800 includes an on-device translation setting. If the on-device translation setting is enabled, language translations are performed entirely on electronic device 800 without transmitting information (e.g., without transmitting selected text 810) to another electronic device. In some embodiments, if the on-device translation setting is disabled, language translations are performed at a remote electronic device, and information (e.g., selected text 810) is transmitted to the remote electronic device. In FIG. 8C, the on-device translation setting is disabled, and a determination is made that a user of electronic device 800 has not previously consented to transmission of translation information to an external device. Accordingly, at FIG. 8C, in response to user input 814, electronic device 800 displays user interface 816, which notifies the user that selected text 810 will be transmitted to an external device for translation. User interface 816 includes option 817 that is selectable to cancel translation of selected text 810 and cease displaying user interface 816. User interface 816 also includes option 818 that is selectable to approve transmission of transmission information to an external device. At FIG. 8C, electronic device 800 detects user input 820 corresponding to selection of option 818.

At FIG. 8D, in response to user input 820, electronic device 800 transmits selected text 810 to an external device, and receives a translation of selected 810 in a different language. At FIG. 8D, electronic device 800 displays translation user interface 822 which displays transcription 826A of selected text 810 in its original language (e.g., English), and a translation 826B of selected text 810 in a different language (e.g., Spanish). Translation user interface 822 also includes option 824A that is selectable to close translation user interface 822, option 824B that is selectable to copy the translation of selected text 810, and option 824C that is selectable to cause electronic device 800 to output an audio output of the translation of selected text 810. At FIG. 8D, electronic device 800 detects user input 828, which is a swipe up gesture. User input 828 will be discussed in greater detail below with reference to FIG. 8G.

Figures 8E, 8F:
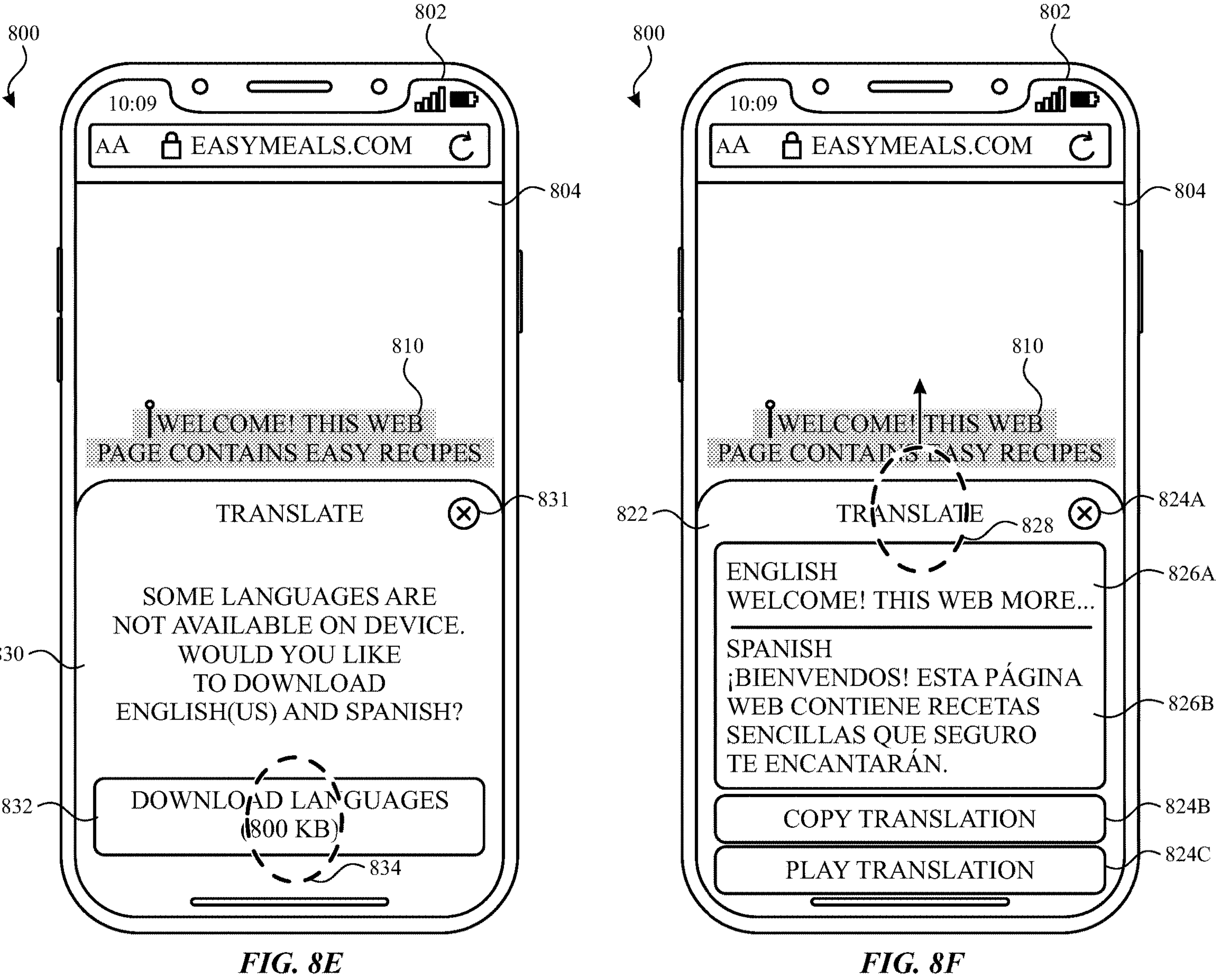

FIG. 8E depicts a second example scenario in response to user input 814 of FIG. 8B. In FIG. 8E, the on-device translation setting is enabled, and a determination is made that the necessary languages for the translation (e.g., English and Spanish) are not downloaded to electronic device 800 (e.g., an English language file and a Spanish language file are not downloaded to electronic device 800). Accordingly, in response to user input 814, electronic device 800 displays user interface 830 which notifies the user that English (US) and Spanish are not downloaded to electronic device 800. User interface 830 includes option 831 that is selectable to cancel translation and close user interface 830, and option 832 that is selectable to download the languages to electronic device 800. At FIG. 8E, electronic device 800 detects user input 834 corresponding to selection of option 832.

At FIG. 8F, in response to user input 834, electronic device 800 downloads the two languages (English (US) and Spanish), and displays translation user interface 822, which is identical to translation user interface 822 of FIG. 8D.

In some embodiments, if the on-device translation setting was disabled, and the user had previously consented to transmission of translation information, electronic device 800 would display translation user interface 822 in response to user input 814. In some embodiments, if the on-device translation setting was enabled, and the necessary languages (e.g., the necessary language files) were already downloaded to electronic device 800, electronic device 800 would also display translation user interface 822 in response to user input 814.

At FIG. 8F, similar to FIG. 8D, electronic device 800 detects user input 828, a swipe up gesture on user interface 822.

Figures 8G, 8H:
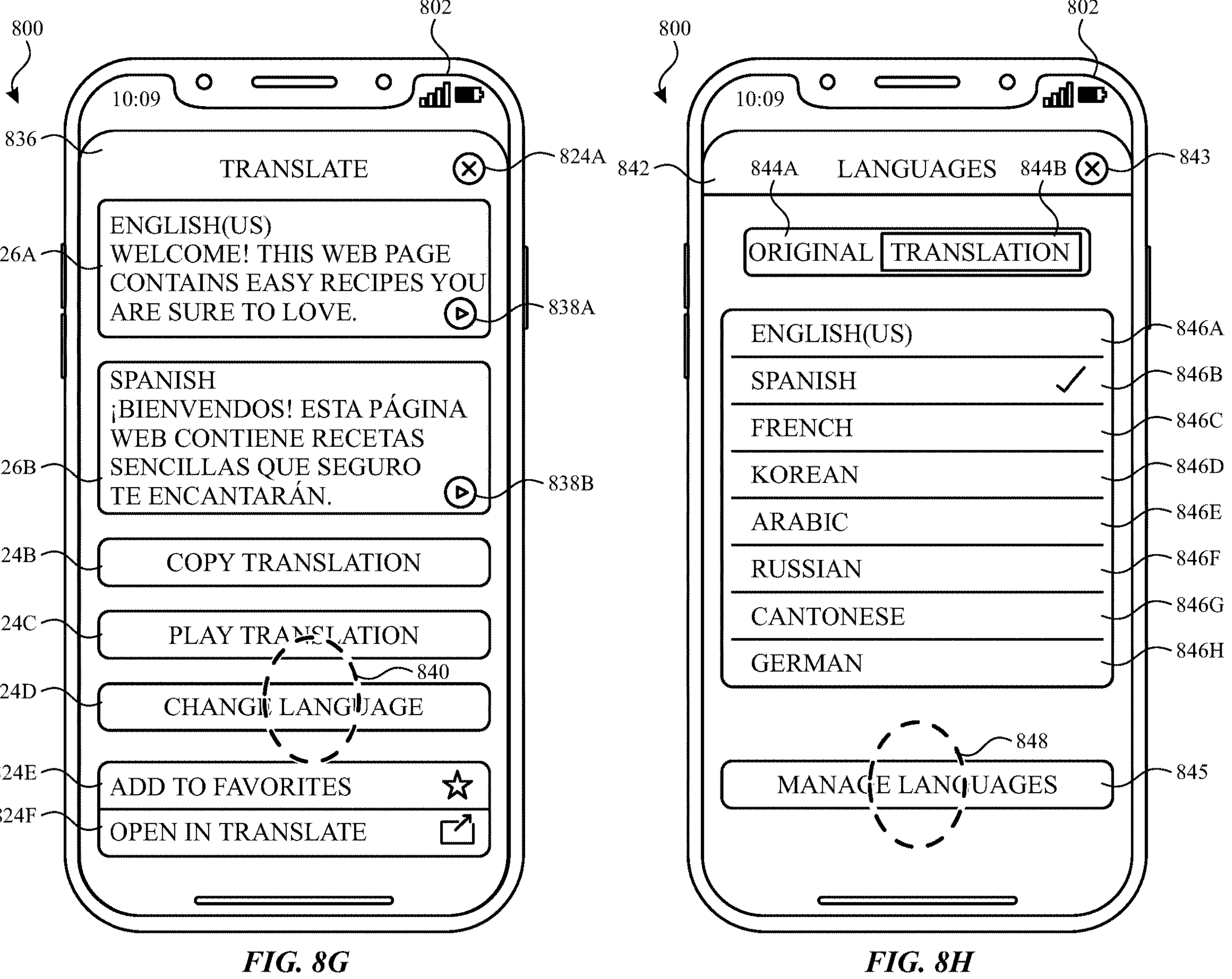

At FIG. 8G, in response to user input 828, electronic device 800 displays expanded translation user interface 836. Expanded translation user interface 836 includes transcription 826A and translation 826B, close option 824A, copy translation option 824B, and play translation option 824C, which are identical to translation option 822. However, expanded translation user interface 836 also includes options 824D, 824E, 824F, 838A, and 838B, which were not displayed in translation user interface 822. Option 838A is selectable to cause electronic device 800 to output an audio output of transcription 826A, and option 838B is selectable to cause electronic device 800 to output an audio output of translation 826B. Option 824D is selectable to change the original input language and/or the translation language. Option 824E is selectable to add translation/transcription paid 826A/826B to a set of favorite translations (e.g., FIG. 6AB). Option 824F is selectable to open transcription 826A and/or translation 826B in a standalone translation application (e.g., translation user interface 604 of FIG. 6A). In some embodiments, if a standalone translation application is not installed on electronic device 800, selection of option 824F causes electronic device 800 to display a notification that the translation application is not installed on electronic device 800. At FIG. 8G, electronic device 800 detects user input 840 corresponding to selection of option 824D.

At FIG. 8H, in response to user input 840, electronic device 800 displays change language user interface 842. Change language user interface 842 includes close option 843 that is selectable to cease display of change language user interface 842. Change language user interface 842 also includes option 844A and 844B. Option 844A is selectable to change the original input language, and option 844B is selectable to change the translation language. In FIG. 8H, option 844B is currently selected such that the user can change the translation language. Change language user interface 842 also includes language options 846A-846H which correspond to respective languages, and selection of a respective option 846A-846H changes the translation language to the selected language. In some embodiments, if the on-device translation setting is enabled, change language user interface 842 only includes language options that are downloaded to electronic device 800. Change language user interface 842 also includes option 845 that is selectable to open a manage languages user interface. At FIG. 8H, electronic device 800 detects user input 848 corresponding to selection of option 845.

Figures 8I, 8J:
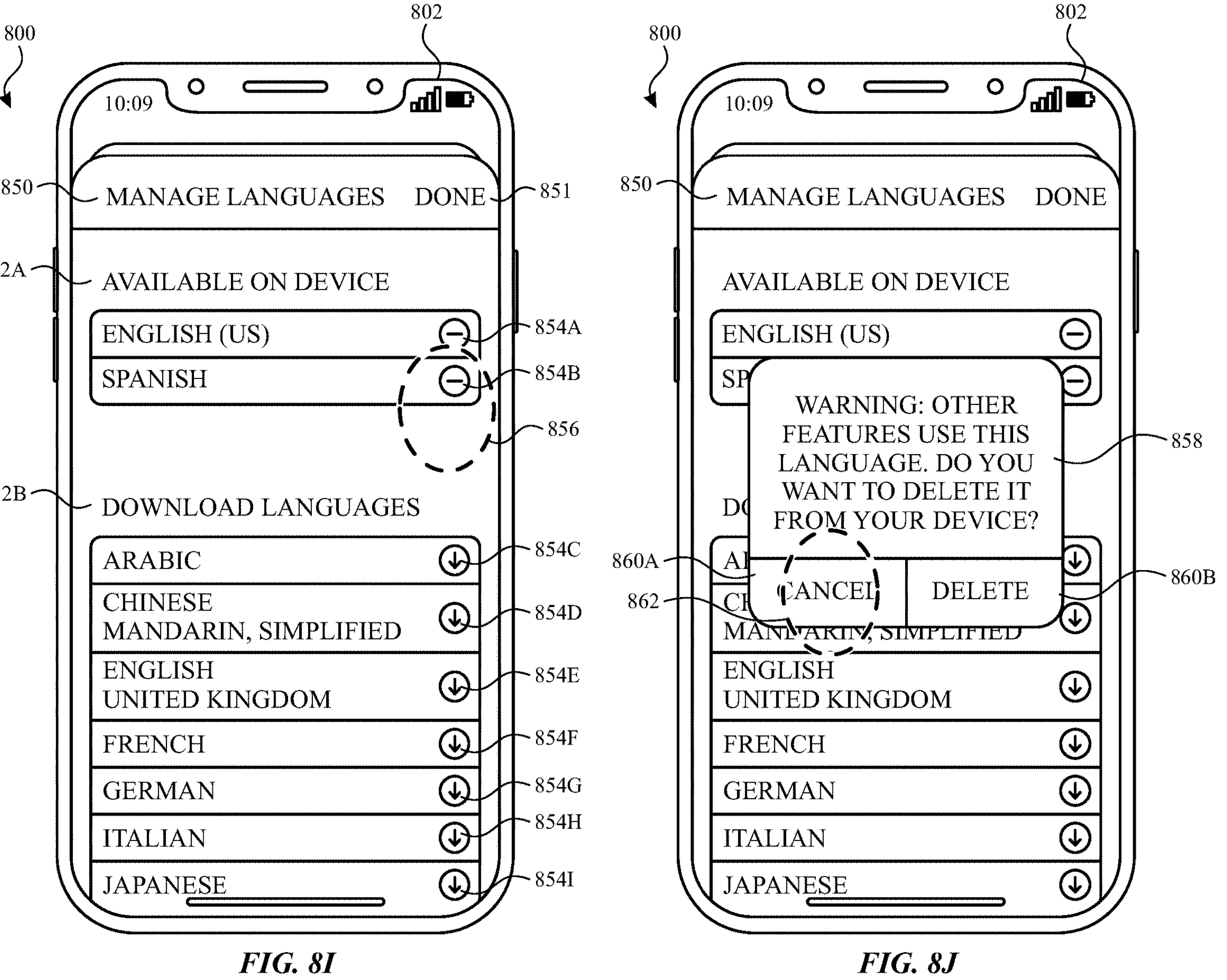

At FIG. 8I, in response to user input 848, electronic device 800 displays user interface 850. User interface 850 includes option 851 that is selectable to cease display of user interface 850 and return to user interface 842. User interface 850 includes downloaded languages section 852A which identifies languages that are downloaded to electronic device 800, and other languages section 852B that identifies other languages that are available for download but are not yet downloaded to electronic device 800. Options 854A, 854B are selectable to remove downloaded languages from electronic device 800, and options 854C-854I are selectable to download languages to electronic device 800. At FIG. 8I, electronic device 800 detects user input 856 corresponding to selection of option 854B (e.g., a request to remove Spanish from electronic device 800).

At FIG. 8J, in response to user input 856, electronic device 800 determines that the Spanish language downloaded to electronic device 800 (e.g., a Spanish language file downloaded to electronic device 800) is used by one or more other features on electronic device 800 (e.g., one or more other features other than a Translate application and/or a translate feature) (e.g., used by a maps feature, a weather feature, an audio feature, etc.). At FIG. 8J, in accordance with the determination that the Spanish language is used by one or more other features of electronic device 800, electronic device 800 displays notification 858, and options 860A and 860B. Option 860A is selectable to cancel deletion of the Spanish language from electronic device 800, and option 860B is selectable to proceed with deletion of the Spanish language from electronic device 800. At FIG. 8J, electronic device 800 detects user input 862 corresponding to selection of option 860A.

Figures 8K, 8L:
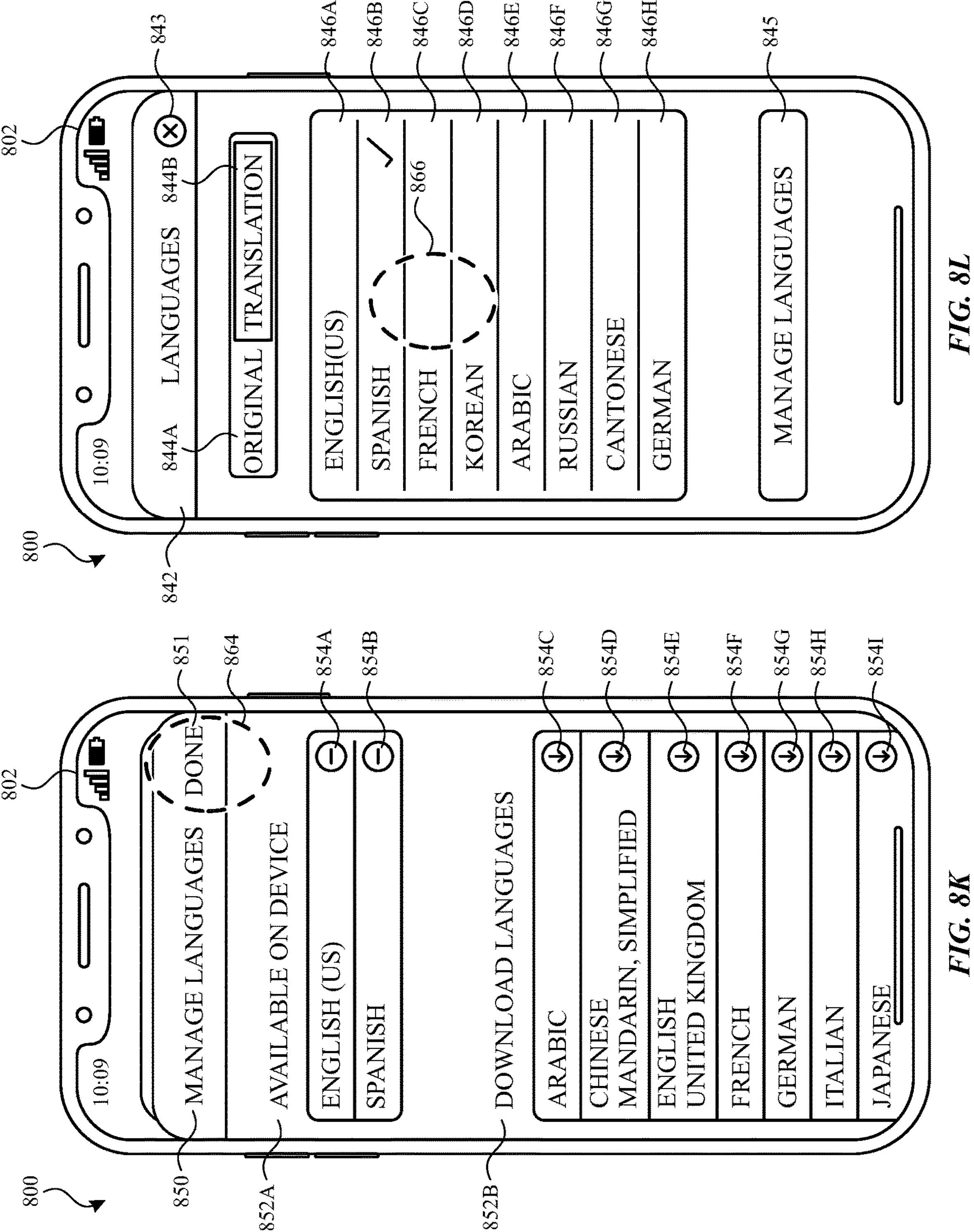

At FIG. 8K, in response to user input 862, electronic device 800 ceases displaying notification 858 and options 860A, 860B, and re-displays user interface 850. At FIG. 8K, electronic device 800 detects user input 864 corresponding to selection of option 851.

At FIG. 8L, in response to user input 864, electronic device 800 ceases displaying user interface 850 and displays user interface 842. At FIG. 8L, electronic device 800 detects user input 866 corresponding to selection of French language option 846C.

Figures 8M, 8N:
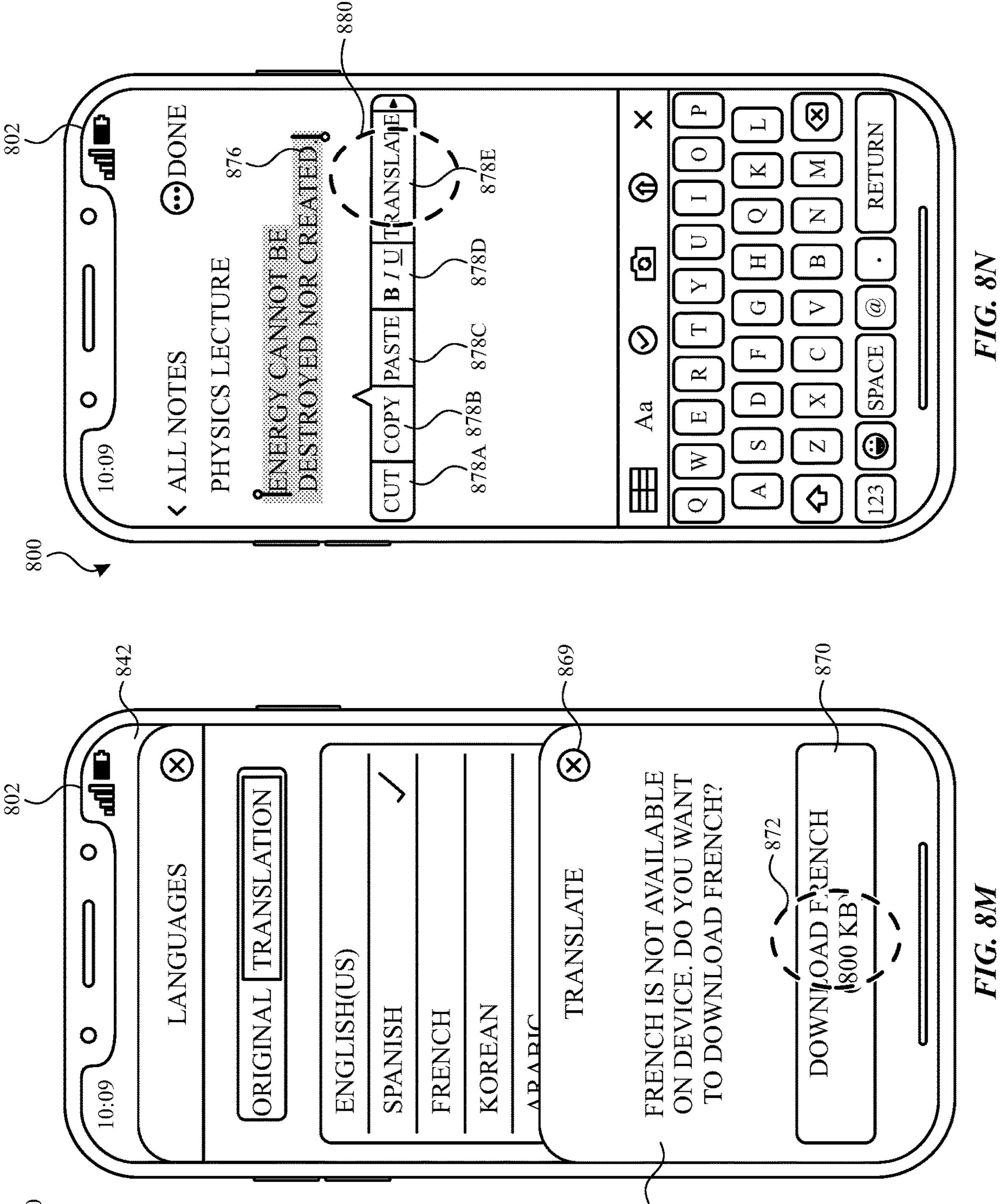

At FIG. 8M, in response to user input 866, and in accordance with a determination that the on-device translation setting is enabled, and that the French language is not downloaded to electronic device 800, electronic device 800 displays notification 868. Notification 868 includes option 869 that is selectable to close notification 868, and forgo selecting French for the translation language, and option 870 that is selectable to download the French language (e.g., a French language file) to electronic device 800. At FIG. 8M, electronic device 800 detects user input 872 corresponding to selection of option 870. In response to user input 872, electronic device downloads the French language to electronic device 800 and changes the translation language from Spanish to French.

FIG. 8N depicts a scenario in which a user has selected text 876 that is editable (e.g., editable by the user). Whereas in FIG. 8B, selected text 810 was not editable by the user, selected text 876 in FIG. 8N is editable by the user. In response to selection of selected text 876 (e.g., in response to a user input selecting selected text 876), electronic device 800 displays options 878A-878E. Option 878A is selectable to cut selected text 876. Option 878B is selectable to copy selected text 876. Option 878C is selectable to replace selected text 876 with pasted text that is already copied to a clipboard. Option 878D is selectable to change formatting of selected text 876. Option 878E is selectable to translate selected text 876 to a different language. At FIG. 8N, electronic device 800 detects user input 880 corresponding to selection of option 878F.

At FIG. 8O, in response to user input 880, electronic device 800 displays translation user interface 822, which was discussed above. However, in accordance with a determination that selected text 876 is editable text, translation user interface 822 includes additional option 824D that is selectable to replace selected text 876 with translation 826B.

FIG. 8P depicts an example scenario in which selected text 884 is in a language for which translation is not supported. In FIG. 8P, a user has selected text 884, and selected a translate option (e.g., option 878E of FIG. 8N), but electronic device 800 has determined that selected text 884 is in Hindi, which is not supported for translation. Accordingly, electronic device 800 displays notification 886 notifying the user that selected text 884 is in Hindi, which is not supported for translation. Notification 886 includes option 887 that is selectable to close notification 886 and forgo translation selected text 884. Notification 886 also includes language options 888A-888D. If electronic device 800 has incorrectly identified the language of selected text 884, a user can select one of language options 888A-888D to identify the correct language of selected text 884, such that if the correct language is supported for translation, electronic device 800 can translate selected text 884.

Figures 8Q, 8R:
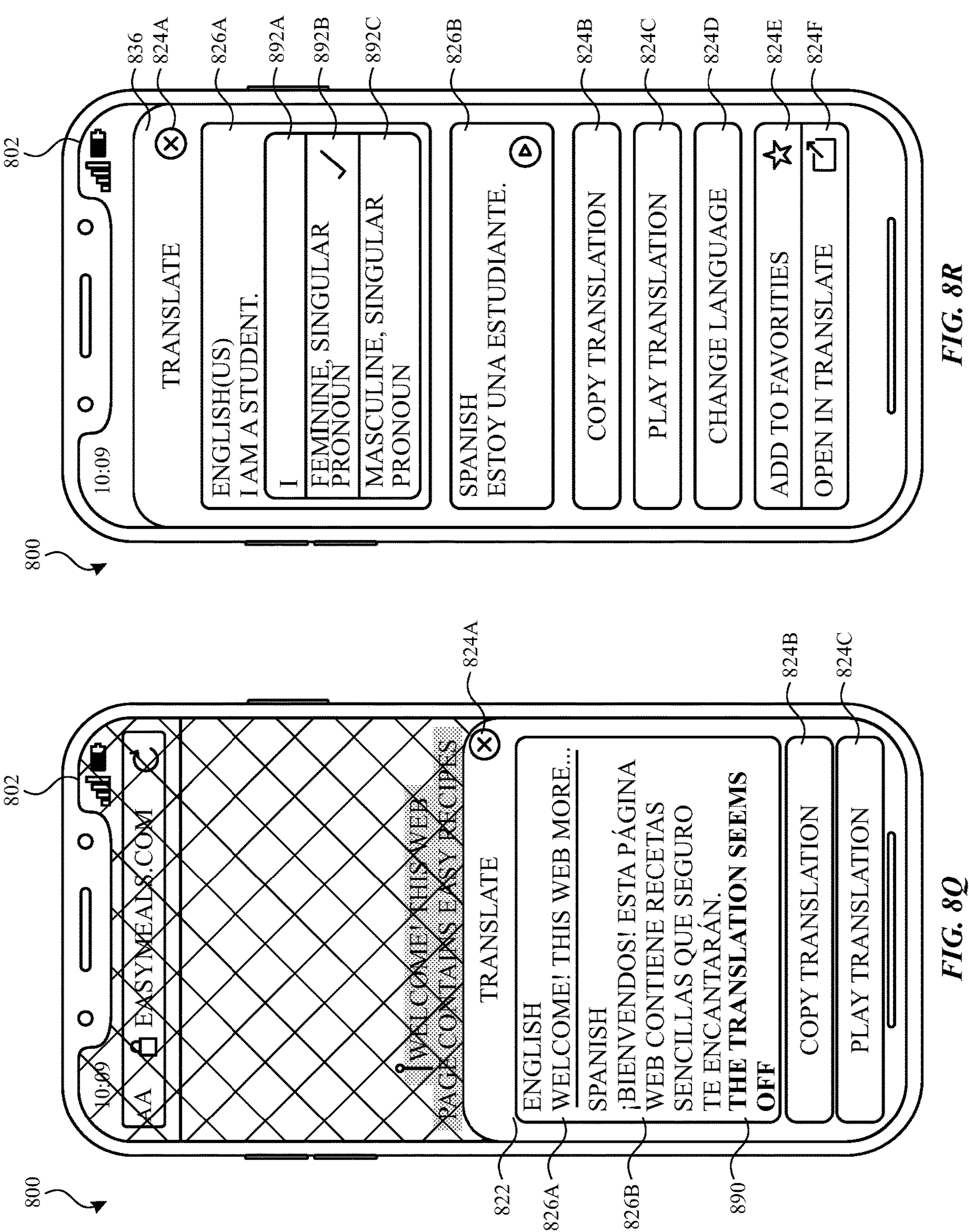

FIG. 8Q depicts an example scenario in which electronic device 800 has translated selected text, but determines that translation 826B does not satisfy a confidence threshold. For example, a determination can be made (e.g., based on one or more machine learning models), that translation 826B of transcription 826A does not satisfy a threshold confidence score or level. In accordance with this determination, electronic device 800 displays indication 890, which indicates that translation 826B does not meet a set of confidence criteria.

FIG. 8R depicts an example scenario in which electronic device 800 has translated selected text 826A (e.g., translation 826B), but clarification is required for one or more words in selected text 826A. In FIG. 8R, in order to provide an accurate translation, electronic device 800 requires clarification as to whether the word "I" refers to the feminine singular pronouns, or the masculine singular pronoun. In accordance with a determination that clarification is required for one or more words in selected text 826A, electronic device 800 displays indication 892A, which identifies the one or more words that require clarification, and disambiguation options 892B, 892C. A user can select one of disambiguation options 892B, 892C to provide electronic device 800 with greater clarity as to the unclear terms, and electronic device 800 modifies translation 826B based on the user's selection.

Figure 8S:
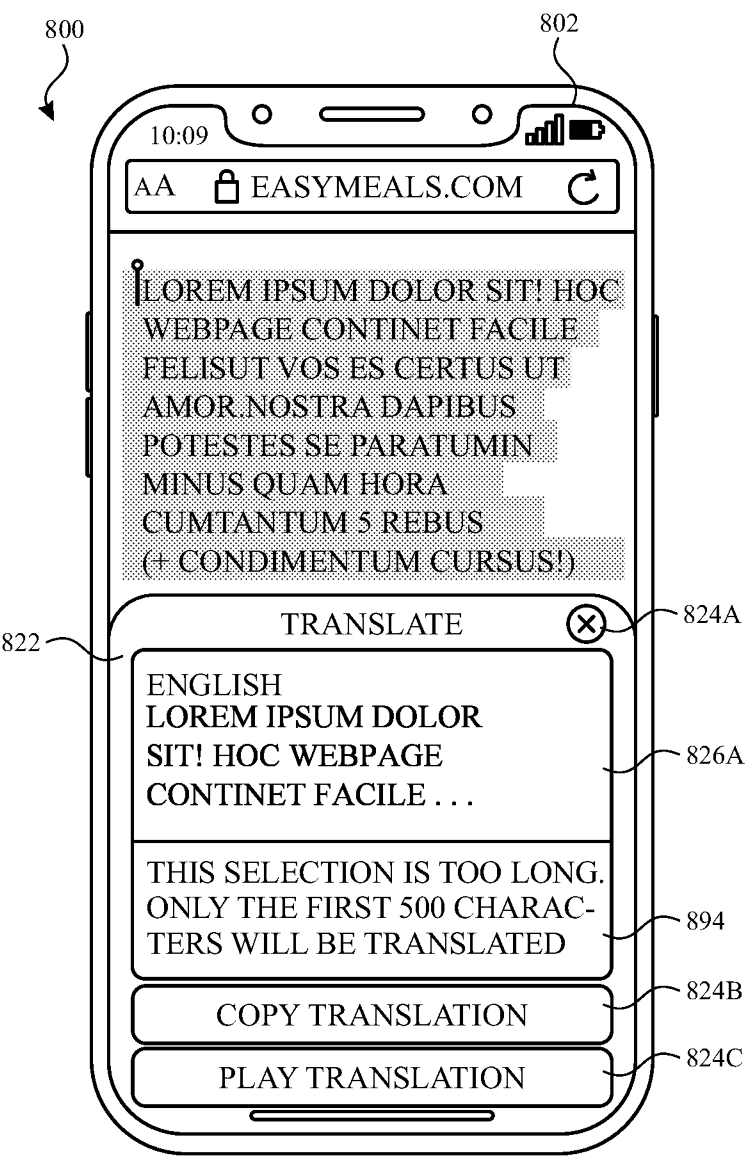

FIG. 8S depicts an example scenario in which electronic device 800 has determined that selected text 826A exceeds a length limit (e.g., a character limit). Accordingly, electronic device 800 displays indication 894 notifying the user that the selected text exceeds the length limit, and only a subset of the selected text (e.g., only the first 500 characters) will be translated.

Figure 8T:
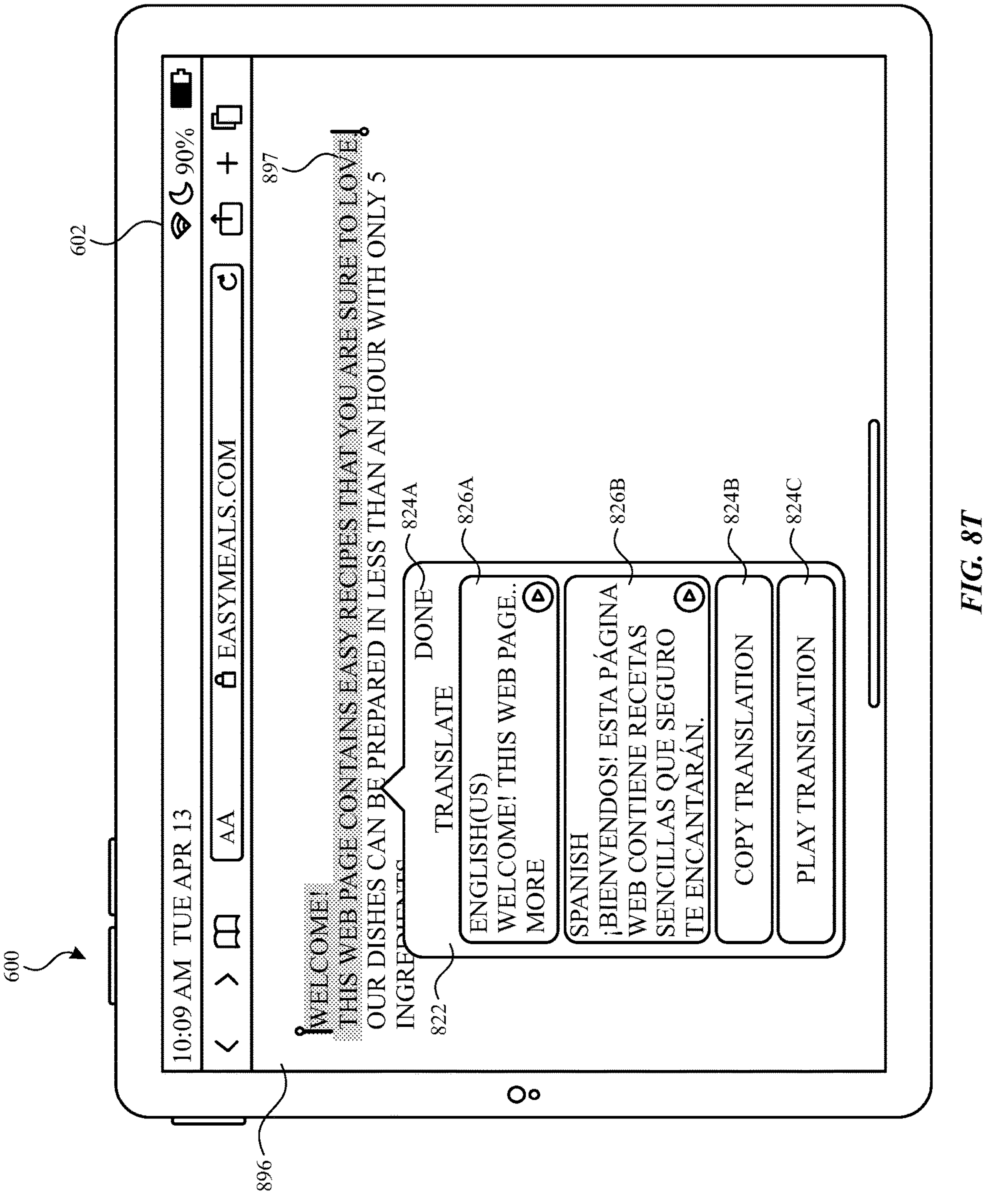
Figure 8U:
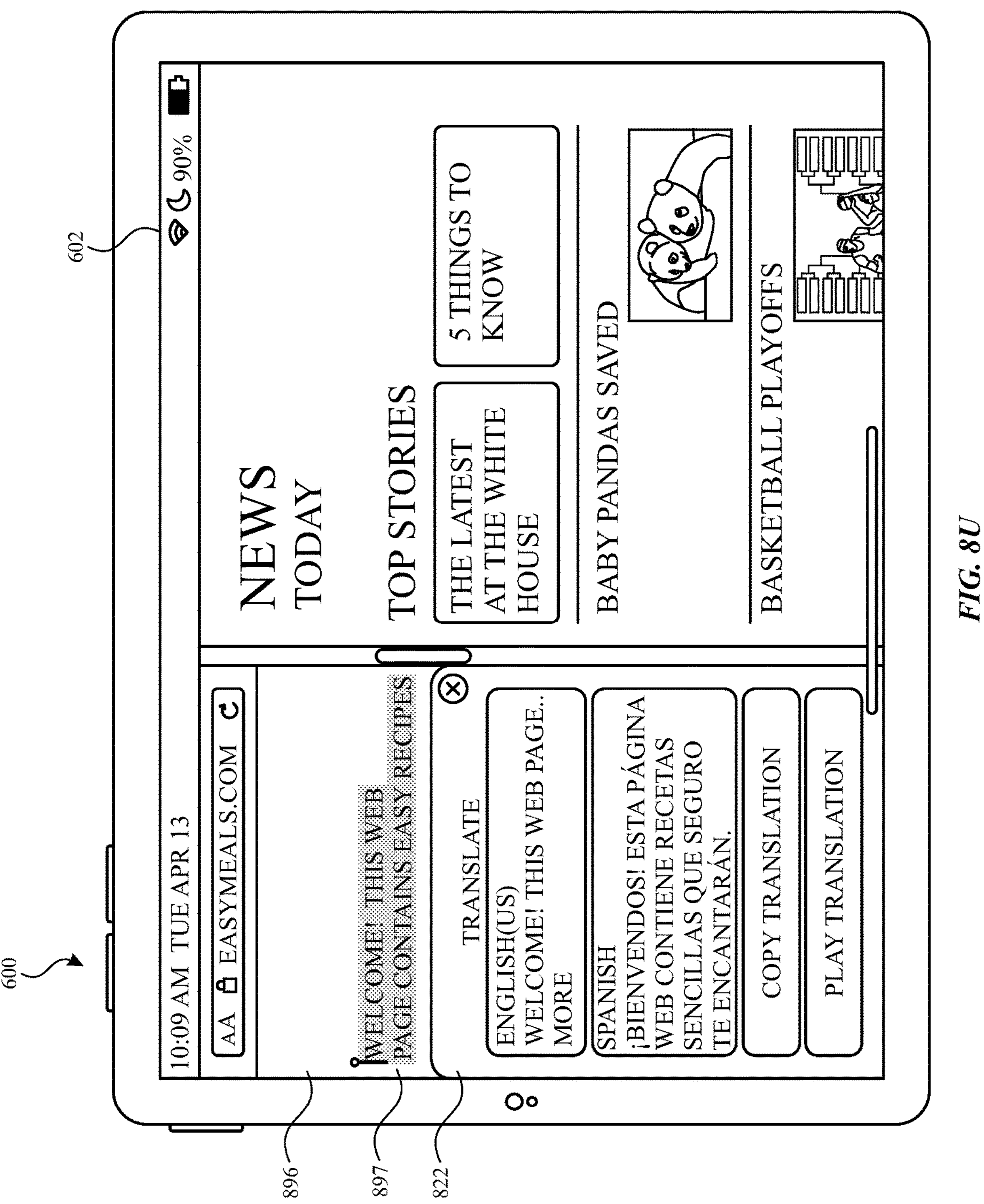

FIGS. 8T-8U depict an example embodiment in which translation user interface 822 is displayed differently based on how much of display 602 is occupied by a user interface. In FIG. 8T, electronic device 600 displays user interface 896, which includes a set of text, and a user has selected text 897, and opted to translate selected text 897. In FIG. 8T, in accordance with a determination that user interface 896 occupies a threshold amount of display 602 (e.g., more than half of display 602), electronic device 600 displays translation user interface 822 as a pop-up menu. In FIG. 8U, user interface 896 occupies less than the threshold amount of display 602 (e.g., less than half of display 602). Accordingly, electronic device 600 displays translation user interface 822 in a different manner (e.g., as a half-sheet overlay).

FIG. 9 is a flow diagram illustrating a method for displaying translated content using a computer system in accordance with some embodiments. Method 900 is performed at a computer system (e.g., 100, 300, 500) (e.g., a smart phone, a laptop computer, a smart watch, and/or a tablet) that is in communication with a display generation component (e.g., a display controller; a touch-sensitive display system; and/or a display (e.g., integrated and/or connected)) and one or more input devices (e.g., a touch-sensitive surface (e.g., a touch-sensitive display); a mouse; a keyboard; a camera; and/or a microphone). Some operations in method 900 are, optionally, combined, the orders of some operations are, optionally, changed, and some operations are, optionally, omitted.

As described below, method 900 provides an intuitive way for displaying translated content. The method reduces the cognitive burden on a user for displaying translated content, thereby creating a more efficient human-machine interface. For battery-operated computing devices, enabling a user to display translated content faster and more efficiently conserves power and increases the time between battery charges.

The computer system (e.g., 600, 800) displays (902), via the display generation component, a first user interface (e.g., 804) comprising a set of text (e.g., 806) in a first language. While displaying (904) the first user interface, the computer system receives (906), via the one or more input devices, a first selection of text (e.g., 810) from the set of text (e.g., via a click and drag gesture, a tap and drag gesture, and/or a non-gesture input). In response to receiving (908) the first selection of text (e.g., without any additional user input beyond the selection of text), the computer system displays (910), via the display generation component, a translation option (e.g., 814) that is selectable to display a translation (e.g., 826B) of the first selection of text. While displaying (912) the translation option (e.g., 814) (e.g., while the first selection of text continues to be selected), the computer system detects (914), via the one or more input devices, a selection input (e.g., 814) (e.g., a tap input, a click input, a single input, and/or a different input) corresponding to selection of the translation option. In response to detecting (916) the selection input, the computer system displays (918), via the display generation component, a translation user interface (e.g., 822), overlaid on the first user interface, that includes a translation (e.g., 826B) of the first selection of text (e.g., 810) in a second language different from the first language (e.g., a predefined second language and/or a user-defined second language). In some embodiments, the translation user interface partially overlays (e.g., partially covers, and/or does not fully cover) the first user interface. In some embodiments, the translation of the first selection of text is displayed in the second language while maintaining display of at least a portion of the set of text and/or the first selection of text. Automatically displaying a translation option in response to receiving a selection of text allows a user to quickly and easily translate selected text without further inputs. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the translation user interface (e.g., 822) includes displaying a play option (e.g., 824C) that is selectable to cause an audio output of the translation of the first selection of text in the second language (e.g., an audio output in which the translation of the first selection of text in the second language is spoken aloud). Displaying a play option that is selectable to cause an audio output of the translation of the first selection of text in the second language allows a user to quickly and easily play audio of a translation, thereby reducing the number of inputs needed for playing audio of a translation. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the translation user interface including displaying the play option, the computer system detects, via the one or more input devices, a second selection input corresponding to selection of the play option; and in response to detecting the second selection input, outputs an audio output of the translation of the first selection of text in the second language.

In some embodiments, while displaying the translation user interface (e.g., 822), the computer system (e.g., 600, 800) detects, via the one or more input devices, a set of one or more inputs (e.g., 828) (e.g., one or more tap inputs, one or more swipe inputs, and/or one or more other inputs). In some embodiments, in response to detecting the set of one or more inputs, the computer system displays, via the display generation component, an expanded translation user interface (e.g., 836) (in some embodiments, replacing display of the translation user interface with the expanded translation user interface and/or expanding the translation user interface into the expanded translation user interface) that includes the translation (e.g., 826B) of the first selection of text in the second language, and a first set of one or more selectable options (e.g., 824B, 824C, 824D, 824E, 824F) that are selectable to perform one or more actions with the translation of the first selection of text in the second language (in some embodiments, the first set of one or more selectable options are not part of the translation user interface). Displaying an expanded translation user interface in response to a set of inputs provides the user with feedback about the current state of the device (e.g., that the device has detected the set of inputs). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first set of one or more selectable options includes a play original text option that is selectable to cause the first selection of text to be spoken aloud in the first language. In some embodiments, the first set of one or more selectable options includes a copy translations option that is selectable to copy the translation of the first selection of text in the second language. In some embodiments, the first set of one or more selectable options includes a change language option that is selectable to initiate a process for changing the second language to a third language different from the first language and the second language (e.g., change the translation of the first selection of text in the second language to a translation of the first selection of text in the third language). In some embodiments, the first set of one or more selectable options includes an add to favorites options that is selectable to add the translation of the first selection of text in the second language to a set of favorite translations. In some embodiments, the first set of one or more selectable options includes an open-in-translation-application option that is selectable to display the translation of the first selection of text in the second language in a translation application.

In some embodiments, the first set of one or more selectable options includes a change language option (e.g., 824D) that is selectable to initiate a process for changing the second language to a third language different from the first language and the second language (e.g., change the translation of the first selection of text in the second language to a translation of the first selection of text in the third language). In some embodiments, while displaying the first set of one or more selectable options (e.g., 824B-824F), including the change language option (e.g., 824D), the computer system detects, via the one or more input devices, one or more inputs (e.g., 840) (e.g., one or more tap inputs and/or non-tap inputs) corresponding to selection of the change language option.

In some embodiments, in response to detecting the one or more inputs (e.g., 840) corresponding to selection of the change language option and in accordance with a determination that an on-device translation setting is disabled, the computer system displays, via the display generation component, a plurality of language options (e.g., 846A-846H, 854A-854I). In some embodiments, in response to detecting the one or more inputs corresponding to selection of the change language option and in accordance with a determination that the on-device translation setting is enabled, the computer system: displays, via the display generation component, a first subset of the plurality of language options that are representative of languages that are available locally on the computer system (e.g., 846A, 846B) (e.g., downloaded to the computer system); and foregoes displaying a second subset of the plurality of language options that are representative of languages that are not available locally on the computer system (e.g., 846C-846H) (e.g., not downloaded to the computer system). Displaying a first subset of language options that are available locally on the computer system and forgoing displaying a second subset of language options that are not available locally on the computer system in accordance with a determination that an on-device translation setting is enabled provides the user with feedback about the current state of the device (e.g., that the first subset of language options are available locally on the device). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first set of one or more selectable options includes an open-in-translation-application option (824F) that is selectable to display the translation of the first selection of text in the second language in a translation application. In some embodiments while displaying the first set of one or more selectable options, including the open-in-translation-application option, the computer system detects, via the one or more input devices, one or more inputs (e.g., one or more tap inputs and/or one or more non-tap inputs) corresponding to selection of the open-in-translation-application option. In some embodiments, in response to detecting the one or more inputs corresponding to selection of the open-in-translation-application option: in accordance with a determination that the translation application is installed on the computer system, the computer system displays, via the display generation component, the translation of the first selection of text in the second language within the translation application (e.g., 604) (e.g., within a user interface generated by the translation application); and in accordance with a determination that the translation application is not installed on the computer system, the computer system displays, via the display generation component, an indication that the translation application is not installed on the computer system (e.g., without displaying the translation of the first selection of text in the second language within the translation application). Displaying an indication that the translation application is not installed on the computer system in accordance with a determination that the translation application is not installed on the computer system provides the user with feedback about the current state of the device (e.g., that the translation application is not installed on the device). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that the first selection of text (e.g., 876) is a selection of editable text (e.g., FIG. 8N) (e.g., text that can be edited by the user and/or text that has been entered by the user), the translation user interface (e.g., 822) includes (e.g., displays) a replace-with-translation option (e.g., 824D) that is selectable to replace the first selection of text in the first language with the translation of the first selection of text in the second language. In some embodiments, in accordance with a determination that the first selection of text is a selection of non-editable text (e.g., 810, FIG. 8B) (e.g., text that cannot be edited by the user and/or text that has not been entered by the user), the translation user interface (e.g., 822) does not include (e.g., does not display) the replace-with-translation option (e.g., FIG. 8F). Displaying a replace-with-translation option that is selectable to replace the first selection of text in the first language with the translation of the first selection of text in the second language allows a user to quickly and easily replace a set of text with its translation, thereby reducing the number of inputs needed to perform this operation. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 600, 800) displays, via the display generation component, a second user interface (e.g., 804) comprising a second set of text (e.g., 806) in a third language. In some embodiments, while displaying the second user interface, the computer system receives, via the one or more input devices, a second selection of text (e.g., 810) from the second set of text (e.g., via a click and drag gesture, a tap and drag gesture, and/or a non-gesture input); and in response to receiving the second selection of text (e.g., without any additional user input beyond the selection of text), the computer system displays, via the display generation component, a translation option (e.g., 814) that is selectable to display a translation of the second selection of text. In some embodiments, while displaying the translation option (e.g., while the second selection of text continues to be selected), the computer system detects, via the one or more input devices, a second selection input (e.g., 814) (e.g., a tap input, a click input, a single input, and/or a different input) corresponding to selection of the translation option. In some embodiments, in response to detecting the second selection input: in accordance with a determination that an on-device translation setting is enabled, the computer system initiates a process to translate the second selection of text locally on the computer system (e.g., using two or more languages downloaded locally to the computer system) without transmitting the second selection of text to an external computer system (e.g., a server or the cloud) (e.g., FIGS. 8E-8F); and in accordance with a determination that the on-device translation setting is disabled, the computer system initiates a process to transmit the second selection of text to an external computer system for translation (e.g., FIGS. 8C-8D). Providing an on-device translation setting that can be enabled to cause translations to occur locally on the computer system without transmitting information to an external computer system provides security and can prevent unauthorized users from gaining access to sensitive information. Providing improved security enhances the operability of the device and makes the user-device interface more efficient and/or secure (e.g., by restricting unauthorized access) which, additionally, reduces power usage and improves battery life of the device by limiting the performance of restricted operations.

In some embodiments, the translation option (e.g., 814) is selectable to display a translation of the second selection of text (e.g., 810) in a fourth language different from the third language. In some embodiments, in response to detecting the second selection input and in accordance with a determination that the on-device translation setting is enabled, and the third language and/or the fourth language is not downloaded to the computer system (e.g., FIG. 8E) (e.g., is not available and/or stored locally on the computer system), the computer system displays an indication (e.g., 830) that the third language and/or the fourth language is not downloaded to the computer system. Displaying an indication that the third language and/or the fourth language is not downloaded to the computer system provides the user with feedback about the current state of the device (e.g., that the third language and/or the fourth language are not downloaded to the computer system). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system displays, concurrently with the indication that the third language and/or the fourth language is not loaded to the computer system, a download option that is selectable to download the third language and/or the fourth language to the computer system. In some embodiments, in response to detecting the second selection input: in accordance with a determination that the on-device translation setting is enabled, and that the third language and the fourth language are downloaded to the computer system, the computer system displays a translation user interface, overlaid on the second user interface, that includes a translation of the second selection of text in the fourth language.

In some embodiments, in response to detecting the second selection input (e.g., 814) and in accordance with a determination that the on-device translation setting is disabled, and that a user of the computer system has not previously consented to transmitting text for translation to an external computer system (e.g., FIG. 8C) (e.g., has not previously consented to "over-the-air" translation), the computer system displays, via the di splay generation component, a notification (e.g., 816) including a message that the second selection of text will be transmitted to an external computer system for translation. Displaying a notification explaining that content will be transmitted to an external computer system for translation provides security and can prevent unintended transmission of sensitive content. Providing improved security enhances the operability of the device and makes the user-device interface more efficient and/or secure (e.g., by restricting unauthorized access) which, additionally, reduces power usage and improves battery life of the device by limiting the performance of restricted operations. In some embodiments, the notification explaining that the second selection of text will be transmitted to an external computer system for translation is not displayed if the on-device translation setting is enabled (e.g., is never displayed if the on-device translation setting is enabled).

In some embodiments, subsequent to displaying the translation user interface (e.g., 822), the computer system detects, via the one or more input devices, one or more deletion inputs (e.g., 856) (e.g., one or more tap inputs and/or one or more non-tap inputs) corresponding to a request to delete a fifth language (e.g., 854B, Spanish) from the computer system (e.g., 800) (e.g., delete a language that has been downloaded to and/or stored on the computer system). In some embodiments, in response to detecting the one or more deletion inputs: in accordance with a determination that the fifth language is not utilized by one or more features of the computer system (e.g., one or more features other than a translation feature), the computer system deletes the fifth language from the computer system; and in accordance with a determination that the fifth language is utilized by one or more features of the computer system (e.g., FIG. 8J) (e.g., one or more features other than the translation feature), the computer system displays, via the display generation component, an indication (e.g., 858) that the fifth language is utilized by one or more features of the computer system without deleting the fifth language from the computer system (e.g., forgoing deleting the fifth language from the computer system until one or more confirmation user inputs confirming deletion of the fifth language are received after displaying the indication that the fifth language is utilized by one or more features of the computer system). Displaying an indication that the fifth language is utilized by one or more features of the computer system provides the user with feedback about the current state of the device (e.g., that the fifth language is utilized by one or more features of the computer system). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with the determination that the fifth language is utilized by one or more features of the computer system, the computer system displays (e.g., concurrently with the indication that the fifth language is utilized by one or more features of the computer system) a confirmation option that is selectable to cause the fifth language to be deleted from the computer system; and a cancel option that is selectable to cancel deletion of the fifth language from the computer system.

In some embodiments, the computer system (e.g., 600, 800) displays, via the display generation component, a third user interface (e.g., 804) comprising a third set of text (e.g., 806) in a sixth language. In some embodiments, while displaying the third user interface, the computer system receives, via the one or more input devices, a third selection of text (e.g., 810) from the third set of text (e.g., via a click and drag gesture, a tap and drag gesture, and/or a non-gesture input). In some embodiments, in response to receiving the third selection of text (e.g., without any additional user input beyond the selection of text): in accordance with a determination that a translate selected text setting is enabled, the computer system displays, via the display generation component, a translation option (e.g., 812A) that is selectable to display a translation of the third selection of text (e.g., in a seventh language different from the sixth language); and in accordance with a determination that the translate selected text setting is disabled, the computer system foregoes displaying the translation option that is selectable to display the translation of the third selection of text. Automatically displaying a translation option based on a translated selected text setting being enabled, and in response to receiving a selection of text allows a user to quickly and easily translate selected text without further inputs. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system displays, via the display generation component, a fourth user interface (e.g., FIG. 8P) comprising a fourth set of text (e.g., FIG. 8P). In some embodiments, while displaying the fourth user interface, the computer system receives, via the one or more input devices, a fourth selection of text (e.g., 884) from the fourth set of text (e.g., via a click and drag gesture, a tap and drag gesture, and/or a non-gesture input); and in response to receiving the fourth selection of text (e.g., without any additional user input beyond the selection of text), the computer system displays, via the display generation component, a translation option (e.g., 812A) that is selectable to display a translation of fourth second selection of text. In some embodiments, while displaying the translation option (e.g., while the fourth selection of text continues to be selected), the computer system detects, via the one or more input devices, a fourth selection input (e.g., 814) (e.g., a tap input, a click input, a single input, and/or a different input) corresponding to selection of the translation option. In some embodiments, in response to detecting the fourth selection input: in accordance with a determination that the fourth selection of text is in an eighth language, and that the eighth language is not a supported language (e.g., FIG. 8P) (e.g., is not a supported language for a translation feature), the computer system displays, via the display generation component an indication (e.g., 886) that the eighth language is not a supported language and one or more language options (e.g., 888A-888D) that are selectable to indicate that the fourth selection of text is not in the eighth language (e.g., a first language option that is selectable to indicate that the fourth selection of text is in a ninth language different from the eighth language; and/or a second language option that is selectable to indicate that the fourth selection of text is in a tenth language different from the eighth and ninth languages). Displaying an indication that the fifth language is utilized by one or more features of the computer system provides the user with feedback about the current state of the device (e.g., that the fifth language is utilized by one or more features of the computer system). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting the fourth selection input, and in accordance with a determination that the fourth selection of text is in an eleventh language, and that the eleventh language is a supported language, the computer system displays, via the display generation component, a translation user interface, overlaid on the third user interface, that includes a translation of the fourth selection of text in a twelfth language different from the eleventh language.

In some embodiments, displaying the translation user interface (e.g., 822, 836) includes, in accordance with a determination that the translation of the first selection of text in the second language does not satisfy a confidence threshold (e.g., FIG. 8Q) (e.g., a confidence score associated with the translation does not satisfy a confidence score threshold), displaying (e.g., concurrently with the translation of the first selection of text in the second language), via the display generation component, an indication (e.g., 890) that the translation of the first selection of text in the second language does not satisfy the confidence threshold. Displaying an indication that the translation of the first selection of text in the second language does not satisfy the confidence threshold provides the user with feedback about the current state of the device (e.g., that the translation of the first selection of text in the second language does not satisfy the confidence threshold). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the translation user interface further comprises: in accordance with a determination that the translation of the first selection of text in the second language does satisfy the confidence threshold, forgo displaying the indication that the translation of the first selection of text in the second language does not satisfy the confidence threshold (e.g., display the translation of the first selection of text in the second language without displaying the indication that the translation of the first selection of text in the second language does not satisfy the confidence threshold).

In some embodiments, displaying the translation user interface (e.g., 822, 836) includes: in accordance with a determination that a first word (e.g., 892A) of the first selection of text (e.g., 826A) requires clarification (e.g., in accordance with a determination that first word has a plurality of possible translations), concurrently displaying (e.g., concurrently with the translation of the first selection of text in the second language), via the display generation component: a first disambiguation option (e.g., 892B) corresponding to a first translation of the first word, and a second disambiguation option (e.g., 892C) corresponding to a second translation of the first word. Displaying the first and second disambiguation options in accordance with a determination that the first word requires clarification provides the user with feedback about the current state of the device (e.g., that the device has determined that the first word requires clarification, and that the device has identified multiple potential translations for the first word). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first disambiguation option corresponds to a first gender option for the first word, and the second disambiguation option corresponds to a second gender option for the first word.

In some embodiments, displaying the translation user interface further comprises: in accordance with a determination that the first selection of text does not include any words that require further clarification (e.g., in accordance with a determination that the first selection of text does not include any words that have a plurality of possible translations), forgoing displaying the first disambiguation option and the second disambiguation option.

In some embodiments, displaying the translation user interface (e.g., 822, 836) includes: in accordance with a determination that a displayed size of the first user interface (e.g., 896) satisfies a size threshold (e.g., FIG. 8T) (e.g., occupies greater than a threshold amount of the display generation component (e.g., a threshold percentage and/or a threshold portion of the display generation component)), displaying the translation user interface (e.g., 822, 836) in a first manner (e.g., FIG. 8T) (e.g., as a popover user interface element); and in accordance with a determination that the displayed size of the first user interface (e.g., 896) does not satisfy the size threshold (e.g., does not occupy greater than the threshold amount of the display generation component), displaying the translation user interface (e.g., 822) in a second manner different from the first manner (e.g., FIG. 8U) (e.g., a half-sheet overlay). Displaying the translation user interface in a first manner when the first user interface occupies greater than a threshold amount of the display generation component, and displaying the translation user interface in a second manner when the first user interface does not occupy greater than the threshold amount of the display generation component, enhances the operability of the device by ensuring that the translation user interface is displayed in an optimal manner. This makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system displays, via the display generation component, a fifth user interface (e.g., 804) comprising a fifth set of text (e.g., 806) in a thirteenth language. In some embodiments, while displaying the fifth user interface, the computer system receives, via the one or more input devices, a fifth selection of text (e.g., 810) from the fifth set of text (e.g., via a click and drag gesture, a tap and drag gesture, and/or a non-gesture input). In some embodiments, in response to receiving the fifth selection of text (e.g., without any additional user input beyond the selection of text), the computer system displays, via the display generation component, a translation option (e.g., 812A) that is selectable to display a translation of fifth second selection of text. In some embodiments, while displaying the translation option (e.g., while the fifth selection of text continues to be selected), the computer system detects, via the one or more input devices, a fifth selection input (e.g., 814) (e.g., a tap input, a click input, a single input, and/or a different input) corresponding to selection of the translation option. In some embodiments, in response to detecting the fifth selection input, and in accordance with a determination that the fifth selection of text exceeds a length threshold (e.g., FIG. 8S) (e.g., a maximum number of characters and/or words), the computer system displays, via the display generation component, an indication (e.g., 894) that the fifth selection of text exceeds the length threshold. Displaying an indication that the fifth selection of text exceeds the length threshold provides the user with feedback about the current state of the device (e.g., that the fifth selection of text exceeds the length threshold). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting the fifth selection input: in accordance with the determination that the fifth selection of text exceeds the length threshold, the computer system displays (e.g., concurrently with the indication that the fifth selection of text exceeds the length threshold), a translation of a subset of the fifth selection of text in a fourteenth language different from the thirteenth language; and in accordance with a determination that the fifth selection of text does not exceed the length threshold, the computer system displays a translation of the fifth selection of text in the fourteenth language.

Note that details of the processes described above with respect to method 900 (e.g., FIG. 9) are also applicable in an analogous manner to the methods described above. For example, methods 700 and 750 optionally include one or more of the characteristics of the various methods described above with reference to method 900. For example, the features recited in methods 700, 750, and 900 can be incorporated into a translation application. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve translation services. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to delivery targeted translation services. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of translation services, the present technology can be configured to allow users to select to "opt in" or "opt out" of participation in the collection of personal information data during registration for services or anytime thereafter. In another example, users can select not to transmit translation content to an external computer system (e.g., by enabling an on-device translation setting). In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be translated by inferring preferences based on non-personal information data or a bare minimum amount of personal information, such as the content being requested by the device associated with a user, other non-personal information available to the translation services, or publicly available information.

What is claimed is:

1. A computer system configured to communicate with a display generation component and one or more input devices, comprising:

one or more processors; and memory storing one or more programs configured to be executed by the one or more processors, the one or more programs including instructions for:

displaying, via the display generation component, a translation user interface, wherein a first region of the translation user interface corresponds to a first language and a second region of the translation user interface different from the first region corresponds to a second language different from the first language, wherein displaying the translation user interface comprises:

in accordance with a determination that an automatic language detection setting is disabled, concurrently displaying:

a first audio input selectable object corresponding to the first language that is selectable to engage a first language listening mode of the computer system in which the computer system is configured to receive an audio input in the first language; and a second audio input selectable object corresponding to the second language that is selectable to engage a second language listening mode of the computer system in which the computer system is configured to receive an audio input in the second language; and in accordance with a determination that the automatic language detection setting is enabled, displaying a single audio input selectable object that is selectable to engage a general listening mode of the computer system in which the computer system is configured to receive an audio input in a plurality of languages;

while displaying the translation user interface, receiving, via the one or more input devices, an input, wherein the input is an audio input; and in response to receiving the input:

in accordance with a determination that the input is in the first language, concurrently displaying, via the display generation component, in the first region of the translation user interface:

a transcription of the input in the first language, and a translation of the input in the second language; and in accordance with a determination that the input is in the second language, concurrently displaying, via the display generation component, in the second region of the translation user interface:

a transcription of the input in the second language, and a translation of the input in the first language.

2. The computer system of claim 1, wherein:

the translation user interface comprises an audio input selectable object that is selectable to engage or disengage a listening mode of the computer system, wherein when the listening mode of the computer system is engaged, the computer system is configured to receive an audio input, and when the listening mode of the computer system is disengaged, the computer system is not configured to receive an audio input; and the one or more programs further include instructions for:

while displaying the translation user interface and the listening mode of the computer system is disengaged, and prior to receiving the audio input, detecting, via the one or more input devices, one or more user inputs corresponding to selection of the audio input selectable object; and in response to detecting the one or more user inputs corresponding to selection of the audio input selectable object, engaging the listening mode of the computer system, wherein:

receiving the audio input is performed while the listening mode of the computer system is engaged.

3. The computer system of claim 2, the one or more programs further including instructions for:

after receiving the audio input:

in accordance with a determination that a continuous listening setting is enabled, maintaining the listening mode of the computer system in the engaged state until one or more user inputs are received indicative of a request to disengage the listening mode of the computer system; and in accordance with a determination that the continuous listening setting is disabled, automatically disengaging the listening mode of the computer system after receiving the audio input.

4. The computer system of claim 1, wherein:

when the automatic language detection setting is enabled and the general listening mode of the computer system is engaged, the computer system is configured to receive an audio input in the first language and/or in the second language.

5. The computer system of claim 1, the one or more programs further including instructions for:

in response to receiving the input:

in accordance with a determination that the input is in the first language:

in accordance with a determination that an autoplay setting is enabled, outputting an audio output of the translation of the input in the second language; and in accordance with a determination that the autoplay setting is disabled, forgoing outputting the audio output of the translation of the input in the second language.

6. The computer system of claim 1, the one or more programs further including instructions for:

displaying, via the display generation component, a display mode option that is selectable to initiate a process for switching the translation user interface between a first display mode and a second display mode, wherein:

in the first display mode:

the first region of the translation user interface displays transcriptions in the first language and translations in the second language in a first orientation, and the second region of the translation user interface displays transcriptions in the second language and translations in the first language in the first orientation; and in the second display mode:

a third region of the translation user interface displays transcriptions in the first language and translations in the first language in a second orientation; and a fourth region of the translation user interface different from the third region displays transcriptions in the second language and translations in the second language in a third orientation different from the second orientation.

7. A non-transitory computer-readable storage medium storing one or more programs configured to be executed by one or more processors of a computer system that is in communication with a display generation component and one or more input devices, the one or more programs including instructions for:

displaying, via the display generation component, a translation user interface, wherein a first region of the translation user interface corresponds to a first language and a second region of the translation user interface different from the first region corresponds to a second language different from the first language, wherein displaying the translation user interface comprises:

in accordance with a determination that an automatic language detection setting is disabled, concurrently displaying:

a first audio input selectable object corresponding to the first language that is selectable to engage a first language listening mode of the computer system in which the computer system is configured to receive an audio input in the first language; and a second audio input selectable object corresponding to the second language that is selectable to engage a second language listening mode of the computer system in which the computer system is configured to receive an audio input in the second language; and in accordance with a determination that the automatic language detection setting is enabled, displaying a single audio input selectable object that is selectable to engage a general listening mode of the computer system in which the computer system is configured to receive an audio input in a plurality of languages;

while displaying the translation user interface, receiving, via the one or more input devices, an input, wherein the input is an audio input; and in response to receiving the input:

in accordance with a determination that the input is in the first language, concurrently displaying, via the display generation component, in the first region of the translation user interface:

a transcription of the input in the first language, and a translation of the input in the second language; and in accordance with a determination that the input is in the second language, concurrently displaying, via the display generation component, in the second region of the translation user interface:

a transcription of the input in the second language, and a translation of the input in the first language.

8. The non-transitory computer-readable storage medium of claim 7, wherein:

the translation user interface comprises an audio input selectable object that is selectable to engage or disengage a listening mode of the computer system, wherein when the listening mode of the computer system is engaged, the computer system is configured to receive an audio input, and when the listening mode of the computer system is disengaged, the computer system is not configured to receive an audio input; and the one or more programs further include instructions for:

while displaying the translation user interface and the listening mode of the computer system is disengaged, and prior to receiving the audio input, detecting, via the one or more input devices, one or more user inputs corresponding to selection of the audio input selectable object; and in response to detecting the one or more user inputs corresponding to selection of the audio input selectable object, engaging the listening mode of the computer system, wherein:

receiving the audio input is performed while the listening mode of the computer system is engaged.

9. The non-transitory computer-readable storage medium of claim 8, the one or more programs further including instructions for:

after receiving the audio input:

in accordance with a determination that a continuous listening setting is enabled, maintaining the listening mode of the computer system in the engaged state until one or more user inputs are received indicative of a request to disengage the listening mode of the computer system; and in accordance with a determination that the continuous listening setting is disabled, automatically disengaging the listening mode of the computer system after receiving the audio input.

10. The non-transitory computer-readable storage medium of claim 7, wherein:

when the automatic language detection setting is enabled and the general listening mode of the computer system is engaged, the computer system is configured to receive an audio input in the first language and/or in the second language.

11. The non-transitory computer-readable storage medium of claim 7, the one or more programs further including instructions for:

in response to receiving the input:

in accordance with a determination that the input is in the first language:

in accordance with a determination that an autoplay setting is enabled, outputting an audio output of the translation of the input in the second language; and in accordance with a determination that the autoplay setting is disabled, forgoing outputting the audio output of the translation of the input in the second language.

12. The non-transitory computer-readable storage medium of claim 7, the one or more programs further including instructions for:

displaying, via the display generation component, a display mode option that is selectable to initiate a process for switching the translation user interface between a first display mode and a second display mode, wherein:

in the first display mode:

the first region of the translation user interface displays transcriptions in the first language and translations in the second language in a first orientation, and the second region of the translation user interface displays transcriptions in the second language and translations in the first language in the first orientation; and in the second display mode:

a third region of the translation user interface displays transcriptions in the first language and translations in the first language in a second orientation; and a fourth region of the translation user interface different from the third region displays transcriptions in the second language and translations in the second language in a third orientation different from the second orientation.

13. A method, comprising:

at a computer system that is in communication with a display generation component and one or more input devices:

displaying, via the display generation component, a translation user interface, wherein a first region of the translation user interface corresponds to a first language and a second region of the translation user interface different from the first region corresponds to a second language different from the first language, wherein displaying the translation user interface comprises:

in accordance with a determination that an automatic language detection setting is disabled, concurrently displaying:

a first audio input selectable object corresponding to the first language that is selectable to engage a first language listening mode of the computer system in which the computer system is configured to receive an audio input in the first language; and a second audio input selectable object corresponding to the second language that is selectable to engage a second language listening mode of the computer system in which the computer system is configured to receive an audio input in the second language; and in accordance with a determination that the automatic language detection setting is enabled, displaying a single audio input selectable object that is selectable to engage a general listening mode of the computer system in which the computer system is configured to receive an audio input in a plurality of languages;

while displaying the translation user interface, receiving, via the one or more input devices, an input, wherein the input is an audio input; and in response to receiving the input:

in accordance with a determination that the input is in the first language, concurrently displaying, via the display generation component, in the first region of the translation user interface:

a transcription of the input in the first language, and a translation of the input in the second language; and in accordance with a determination that the input is in the second language, concurrently displaying, via the display generation component, in the second region of the translation user interface:

a transcription of the input in the second language, and a translation of the input in the first language.

14. The method of claim 13, wherein:

the translation user interface comprises an audio input selectable object that is selectable to engage or disengage a listening mode of the computer system, wherein when the listening mode of the computer system is engaged, the computer system is configured to receive an audio input, and when the listening mode of the computer system is disengaged, the computer system is not configured to receive an audio input; and the method further comprises:

while displaying the translation user interface and the listening mode of the computer system is disengaged, and prior to receiving the audio input, detecting, via the one or more input devices, one or more user inputs corresponding to selection of the audio input selectable object; and in response to detecting the one or more user inputs corresponding to selection of the audio input selectable object, engaging the listening mode of the computer system, wherein:

receiving the audio input is performed while the listening mode of the computer system is engaged.

15. The method of claim 14, further comprising:

after receiving the audio input:

in accordance with a determination that a continuous listening setting is enabled, maintaining the listening mode of the computer system in the engaged state until one or more user inputs are received indicative of a request to disengage the listening mode of the computer system; and in accordance with a determination that the continuous listening setting is disabled, automatically disengaging the listening mode of the computer system after receiving the audio input.

16. The method of claim 13, wherein:

when the automatic language detection setting is enabled and the general listening mode of the computer system is engaged, the computer system is configured to receive an audio input in the first language and/or in the second language.

17. The method of claim 13, further comprising:

in response to receiving the input:

in accordance with a determination that the input is in the first language:

in accordance with a determination that an autoplay setting is enabled, outputting an audio output of the translation of the input in the second language; and in accordance with a determination that the autoplay setting is disabled, forgoing outputting the audio output of the translation of the input in the second language.

18. The method of claim 13, further comprising:

displaying, via the display generation component, a display mode option that is selectable to initiate a process for switching the translation user interface between a first display mode and a second display mode, wherein:

in the first display mode:

the first region of the translation user interface displays transcriptions in the first language and translations in the second language in a first orientation, and the second region of the translation user interface displays transcriptions in the second language and translations in the first language in the first orientation; and in the second display mode:

a third region of the translation user interface displays transcriptions in the first language and translations in the first language in a second orientation; and a fourth region of the translation user interface different from the third region displays transcriptions in the second language and translations in the second language in a third orientation different from the second orientation.

19. The computer system of claim 1, the one or more programs further including instructions for:

while displaying the translation of the input in the second language, detecting, via the one or more input devices, one or more user inputs corresponding to selection of the translation of the input in the second language; and in response to detecting the one or more user inputs corresponding to selection of the translation of the input in the second language, displaying, via the display generation component, one or more selectable options pertaining to the translation of the input in the second language.

20. The non-transitory computer-readable storage medium of claim 7, the one or more programs further including instructions for:

while displaying the translation of the input in the second language, detecting, via the one or more input devices, one or more user inputs corresponding to selection of the translation of the input in the second language; and in response to detecting the one or more user inputs corresponding to selection of the translation of the input in the second language, displaying, via the display generation component, one or more selectable options pertaining to the translation of the input in the second language.

21. The method of claim 13, further comprising:

while displaying the translation of the input in the second language, detecting, via the one or more input devices, one or more user inputs corresponding to selection of the translation of the input in the second language; and in response to detecting the one or more user inputs corresponding to selection of the translation of the input in the second language, displaying, via the display generation component, one or more selectable options pertaining to the translation of the input in the second language.

* * * * *